(12) United States Patent
Dyer et al.

(10) Patent No.: US 9,810,572 B2
(45) Date of Patent: Nov. 7, 2017

(54) FOOD PRODUCT SCALE

(71) Applicants: Debra L. Dyer, Vandalia, OH (US);
Robert S. Davis, Tipp City, OH (US);
James E. Highley, Jr., Eaton, OH (US); Jill M. Broering, Troy, OH (US);
Fredrick D. Knoop, Troy, OH (US);
Randy L. Blankley, Jr., Kettering, OH (US); John A. Dusing, Mason, OH (US)

(72) Inventors: Debra L. Dyer, Vandalia, OH (US);
Robert S. Davis, Tipp City, OH (US);
James E. Highley, Jr., Eaton, OH (US); Jill M. Broering, Troy, OH (US);
Fredrick D. Knoop, Troy, OH (US);
Randy L. Blankley, Jr., Kettering, OH (US); John A. Dusing, Mason, OH (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 279 days.

(21) Appl. No.: 14/322,281

(22) Filed: Jul. 2, 2014

(65) Prior Publication Data
US 2015/0074581 A1 Mar. 12, 2015

Related U.S. Application Data

(62) Division of application No. 14/319,511, filed on Jun. 30, 2014, now Pat. No. 9,377,345.

(Continued)

(51) Int. Cl.
*G01G 23/37* (2006.01)
*G06F 3/041* (2006.01)
(Continued)

(52) U.S. Cl.
CPC ..... *G01G 23/3721* (2013.01); *G01G 19/4144* (2013.01); *G01G 23/36* (2013.01); *G06F 3/041* (2013.01); *G06F 3/0481* (2013.01); *G06F 3/0482* (2013.01); *G06F 3/0484* (2013.01); *G06F 3/0486* (2013.01);
(Continued)

(58) Field of Classification Search
CPC . G01G 19/4144; G01G 23/36; G01G 23/3721
See application file for complete search history.

(56) References Cited

U.S. PATENT DOCUMENTS 5,053,758 A 10/1991 Cornett et al.
5,140,678 A 8/1992 Torres
(Continued)

OTHER PUBLICATIONS

List of Patents or Patent Applications Treated as Related, 1 page.
(Continued)

*Primary Examiner* — Natalie Huls
(74) *Attorney, Agent, or Firm* — Thompson Hine LLP

(57) ABSTRACT

A scale includes a weigh station for receiving items to be weighed, an operator interface configured to display information associated with scale operations and a controller operably coupled to the operator interface to effect display of information. The operator interface may be in the form of a touch-screen display that is used to facilitate ease of use and scale adjustment.

7 Claims, 45 Drawing Sheets

Related U.S. Application Data

(60) Provisional application No. 61/898,061, filed on Oct. 31, 2013, provisional application No. 61/876,613, filed on Sep. 11, 2013.

(51) Int. Cl.
  *G01G 19/414* (2006.01)
  *G06F 3/0481* (2013.01)
  *G06Q 10/08* (2012.01)
  *G06F 3/0484* (2013.01)
  *G06F 3/0486* (2013.01)
  *G06F 3/0482* (2013.01)
  *G06F 3/0488* (2013.01)
  *G01G 23/36* (2006.01)

(52) U.S. Cl.
  CPC ........ *G06F 3/0488* (2013.01); *G06F 3/04817* (2013.01); *G06F 3/04842* (2013.01); *G06Q 10/087* (2013.01)

(56) References Cited

U.S. PATENT DOCUMENTS

| | | | |
|---|---|---|---|
| 5,141,065 A * | 8/1992 | Maxwell | G01G 13/32 177/210 R |
| 5,384,910 A | 1/1995 | Torres | |
| 5,666,866 A | 9/1997 | Huang et al. | |
| 5,832,417 A * | 11/1998 | Petrucelli | G01G 23/01 177/25.13 |
| 6,407,351 B1 | 6/2002 | Meyer et al. | |
| 6,884,946 B2 * | 4/2005 | Miller | G01G 19/4144 177/25.13 |
| 6,937,742 B2 | 8/2005 | Roberts et al. | |
| 6,966,037 B2 | 11/2005 | Fredriksson et al. | |
| 6,982,388 B2 | 1/2006 | Kasinoff | |
| 7,026,556 B1 | 4/2006 | Schuller | |
| 7,041,915 B2 | 5/2006 | Kasinoff | |
| 7,051,944 B2 | 5/2006 | Weisz et al. | |
| 7,099,038 B2 | 8/2006 | Schuller | |
| 7,103,851 B1 | 9/2006 | Jaeger | |
| 7,293,241 B1 | 11/2007 | Tornqvist et al. | |
| 7,444,001 B2 | 10/2008 | Roberts et al. | |
| 7,453,442 B1 | 11/2008 | Poynter | |
| 7,493,336 B2 | 2/2009 | Noonan | |
| 7,564,469 B2 | 7/2009 | Cohen | |
| 7,587,335 B2 | 9/2009 | Schuller et al. | |
| 7,597,254 B2 * | 10/2009 | Miller | G01G 23/3728 235/378 |
| 7,612,302 B2 | 11/2009 | Tamkin | |
| 7,680,298 B2 | 3/2010 | Roberts et al. | |
| 7,821,274 B2 | 10/2010 | Philipp et al. | |
| 7,821,502 B2 | 10/2010 | Hristov | |
| 7,831,932 B2 | 11/2010 | Josephsoon et al. | |
| 7,861,188 B2 | 12/2010 | Josephsoon et al. | |
| 7,872,201 B1 | 1/2011 | Whitney | |
| 7,875,813 B2 * | 1/2011 | Hackathorne | G06Q 50/12 177/25.13 |
| 7,877,705 B2 | 1/2011 | Chambers et al. | |
| 7,880,727 B2 | 2/2011 | Abanami et al. | |
| 7,886,230 B2 | 2/2011 | Monnier et al. | |
| 7,932,898 B2 | 4/2011 | Philipp et al. | |
| 7,986,152 B2 | 7/2011 | Philipp et al. | |
| 8,078,471 B2 | 12/2011 | Geisel et al. | |
| 8,085,977 B2 | 12/2011 | Roberts et al. | |
| 8,094,130 B2 | 1/2012 | Griffin et al. | |
| 8,108,788 B2 | 1/2012 | Tornqvist et al. | |
| 8,264,471 B2 | 9/2012 | Martensson | |
| 8,304,668 B2 | 11/2012 | Collins et al. | |
| 8,355,944 B2 | 1/2013 | Young | |
| 8,555,776 B2 | 10/2013 | Murphy et al. | |
| 8,600,819 B2 | 12/2013 | Schuller et al. | |
| 9,377,345 B2 * | 6/2016 | Dyer | G01G 23/3721 |
| 2002/0184043 A1 | 12/2002 | Lavorgna et al. | |
| 2002/0191007 A1 * | 12/2002 | Fujii | G01G 23/36 345/690 |
| 2003/0037965 A1 | 2/2003 | Bennard | |
| 2003/0168259 A1 | 9/2003 | Miller | |
| 2003/0168260 A1 | 9/2003 | Muyal | |
| 2004/0125081 A1 | 7/2004 | Hayakawa | |
| 2004/0211600 A1 | 10/2004 | Schuller | |
| 2005/0134578 A1 | 6/2005 | Chambers et al. | |
| 2005/0283404 A1 | 12/2005 | Young | |
| 2007/0043621 A1 | 2/2007 | Collins | |
| 2007/0158335 A1 | 7/2007 | Mansbery | |
| 2007/0236472 A1 | 10/2007 | Bentsen et al. | |
| 2007/0260524 A1 | 11/2007 | Young | |
| 2008/0016467 A1 | 1/2008 | Chambers et al. | |
| 2008/0128177 A1 * | 6/2008 | Monnier | G01G 19/4144 177/1 |
| 2008/0165116 A1 * | 7/2008 | Herz | G09G 3/3406 345/102 |
| 2008/0178116 A1 | 7/2008 | Kim | |
| 2008/0191012 A1 * | 8/2008 | Monnier | G01G 19/4144 235/385 |
| 2008/0218535 A1 * | 9/2008 | Forstall | G06F 1/3203 345/690 |
| 2008/0235872 A1 | 10/2008 | Newkirk et al. | |
| 2008/0245581 A1 * | 10/2008 | Tamkin | G01G 19/4144 177/25.15 |
| 2008/0276203 A1 | 11/2008 | Santinato et al. | |
| 2009/0309616 A1 | 12/2009 | Klinghult et al. | |
| 2009/0326833 A1 | 12/2009 | Ryhanen et al. | |
| 2009/0327879 A1 | 12/2009 | Ferragut, II et al. | |
| 2010/0000801 A1 * | 1/2010 | Smith | G01G 19/4144 177/25.15 |
| 2010/0070388 A1 | 3/2010 | Spindler | |
| 2010/0084200 A1 | 4/2010 | Juan-Castellanos | |
| 2010/0185483 A1 * | 7/2010 | Collins | G01G 19/4144 177/25.15 |
| 2010/0275149 A1 | 10/2010 | Vuong et al. | |
| 2010/0307839 A1 | 12/2010 | Bradley | |
| 2010/0325166 A1 | 12/2010 | Rubin et al. | |
| 2010/0325564 A1 | 12/2010 | Mital et al. | |
| 2010/0325578 A1 | 12/2010 | Mital et al. | |
| 2010/0333027 A1 | 12/2010 | Martensson et al. | |
| 2011/0011936 A1 | 1/2011 | Morandi | |
| 2011/0037781 A1 * | 2/2011 | Kangas | G09G 3/3406 345/690 |
| 2011/0050396 A1 | 3/2011 | Chaves | |
| 2011/0062143 A1 | 3/2011 | Satanek | |
| 2011/0071928 A1 | 3/2011 | Young | |
| 2011/0126135 A1 | 5/2011 | Chambers et al. | |
| 2011/0151072 A1 | 6/2011 | Anderson et al. | |
| 2011/0214067 A1 | 9/2011 | Tanaka | |
| 2012/0013450 A1 | 1/2012 | Lee et al. | |
| 2012/0030632 A1 | 2/2012 | McRae et al. | |
| 2012/0044172 A1 | 2/2012 | Ohki et al. | |
| 2012/0050152 A1 * | 3/2012 | Salminen | G09G 3/3406 345/156 |
| 2012/0062470 A1 * | 3/2012 | Chang | G06F 1/3262 345/173 |
| 2012/0062516 A1 | 3/2012 | Chen et al. | |
| 2012/0081299 A1 | 4/2012 | Xiao et al. | |
| 2012/0174041 A1 | 7/2012 | Queru | |
| 2012/0174043 A1 | 7/2012 | Queru | |
| 2012/0210268 A1 | 8/2012 | Hilbrink et al. | |
| 2012/0315963 A1 * | 12/2012 | Pratt | H04W 52/0264 455/574 |
| 2013/0041785 A1 | 2/2013 | Young | |
| 2013/0082956 A1 | 4/2013 | Yajima | |
| 2013/0092145 A1 | 4/2013 | Murphy et al. | |
| 2013/0092680 A1 | 4/2013 | Cartwright et al. | |
| 2013/0092682 A1 | 4/2013 | Mills et al. | |
| 2013/0119138 A1 | 5/2013 | Winkel | |
| 2013/0126248 A1 | 5/2013 | Yamaguchi et al. | |
| 2014/0006990 A1 | 1/2014 | Harada et al. | |
| 2014/0075368 A1 | 3/2014 | Kim et al. | |
| 2014/0094224 A1 * | 4/2014 | Lozovoy | H04M 1/22 455/566 |
| 2014/0124274 A1 | 5/2014 | Zerhusen et al. | |
| 2014/0304124 A1 | 10/2014 | Amelmann | |

(56) References Cited

U.S. PATENT DOCUMENTS

| | | |
|---|---|---|
| 2014/0313156 A1 | 10/2014 | Tenuta |
| 2014/0375578 A1 | 12/2014 | Ogino et al. |
| 2015/0067582 A1 | 3/2015 | Donnelly et al. |
| 2015/0068818 A1 | 3/2015 | Dyer et al. |
| 2015/0074581 A1 | 3/2015 | Dyer et al. |
| 2015/0256763 A1 | 9/2015 | Niemi |
| 2015/0317620 A1 | 11/2015 | Morandi |

OTHER PUBLICATIONS

PCT, Invitation to Pay Additional Fees and, Where Applicable, Protest Fee, PCT/US2014/053642, dated Jan. 26, 2015, 9 pages.

PCT, International Search Report and the Written Opinion of the International Searching Authority, PCT/US2014/053642, dated Apr. 1, 2015, 19 pages.

PCT, International Preliminary Report on Patentability, International Application No. PCT/US2014/053642; dated Mar. 15, 2016, 13 pages.

\* cited by examiner

FOOD PRODUCT SCALE

CROSS-REFERENCES

This application is a divisional of U.S. application Ser. No. 14/319,511, filed Jun. 30, 2014, which in turn claims the benefit if U.S. Provisional Application Ser. Nos. 61/898,061, filed Oct. 31, 2013 and 61/876,613, filed Sep. 11, 2013.

TECHNICAL FIELD

This application relates generally to scales used for weighing food product in supermarkets, groceries and other stores, and, more particularly, to a scale including advantageous interface configurations and functionality.

BACKGROUND

In typical commercial food product scale applications the scale is used to weigh food products and determines prices for the food products, and an associated printer prints a label for application to the food product. An operator enters a product number, such as a PLU (price look-up) number, for the product being weighed and the scale accesses its database, or accesses a remote database, for pricing information on the product. The total price for the item is then determined based upon its weight.

Operators and consumers have grown to expect more dynamic functionality and operations from devices. It would be desirable to provide a scale facilitating such functionality and operations.

SUMMARY

In one aspect, a scale includes a weigh station for receiving items to be weighed, an operator interface configured to display information associated with scale operations and a controller operably coupled to the operator interface to effect display of information thereon. The controller is configured such that multiple primary interface screen views are made available for operator use, wherein each of the primary interface screen views includes: (i) a plurality of fixed features that are common among all the primary interface screen views, each fixed feature residing in a common location in each of the primary interface screen views; and (ii) other features that are not common with the other primary interface screen views.

In one example, one of the plurality of fixed features is a group of adjacent screen view icons, each screen view icon associated with one of the plurality of primary interface screen views in a one-to-one correspondence. The controller is configured such that each screen view icon is displayed in either a present state or background state, and the state of each screen view icon is automatically adjusted upon transition from one primary interface screen view to another primary interface screen view such that only the screen view icon associated with the primary interface screen view that is being displayed is displayed in the present state.

In another example, the controller is configured such that one of the plurality of primary interface screen views is designated as a home interface screen view, and one of the plurality of fixed features is a home view icon that when triggered causes the home interface screen view to be displayed. In such example, the controller may be configured such that designation of the home interface screen view can be changed as between a first of the primary interface screen views and a second of the primary interface screen views. In such example, the controller may also be configured such that three or more primary interface screen views are provided, and at least one of the primary interface screen views cannot be designated as the home interface screen view.

In another aspect, a method is provided for configuring a scale including a weigh station for receiving items to be weighed, an operator interface configured to display information associated with scale operations and a controller operably coupled to the operator interface to effect display of information thereon. The method includes the steps of: defining a plurality of fixed features that are useful to operator operation of the scale; and making multiple primary interface screen views available for operator use, wherein each of the primary interface screen views includes each of the fixed features thereon to create a degree of commonality between the primary interface screen views, each fixed feature residing in a common location in each of the primary interface screen views.

In a further aspect, a method is provided for establishing a scale interface system for a food product weighing and pricing scale including a weigh station for receiving items to be weighed, an operator interface configured to display information associated with scale operations, an associated label printer for printing labels for weighed items, and a controller operably coupled to the operator interface to effect display of information thereon. The method involves: identifying a set of critical interface features; incorporating the critical features into at least a first interface screen view and a second interface screen view that are presentable to operators via the operator interface in a manner that enables operators to switch between the first interface screen view and the second interface screen view; identifying a first set of primary features for the first interface screen view, the first set of primary features focused on a primary function of the first interface screen view; incorporating the first set of primary features into the first interface screen view; identifying a second set of primary features for the second interface screen view, the second set of primary features focused on a primary function of the second interface screen view; and incorporating the second set of primary features into the second interface screen view.

In another aspect, a scale includes a weigh station for receiving items to be weighed, an operator interface configured to display information associated with scale operations, the operator interface comprising a touch-sensitive display, and a controller operably coupled to the operator interface to effect display of information thereon. The controller is configured to make available multiple interface screen views for use by the operator, and to enable a user to transition from one interface screen view to another interface screen view via a swiping operation. The touch-sensitive display includes a viewing area and a touch-sensitive member with a primary portion that overlies the viewing area and a secondary portion that is external of the viewing area, and swiping operations can be achieved using the secondary portion of the touch-sensitive member.

In a further aspect, a method is provided for enabling operator transition between viewable screens of a scale operator interface, where the scale includes a weigh station for receiving items to be weighed, and an operator interface configured to display information associated with scale operations, the operator interface comprising a touch-sensitive display. The method involves: making available multiple primary interface screen views for use by the operator, displaying one of the multiple primary interface screen views on a viewing area of the display, and detecting a swiping operation on a surface of the display in order to transition from the one primary interface screen view to a different primary interface screen view.

In another aspect, a scale includes a weigh station for receiving items to be weighed, an operator interface configured to display information associated with scale operations and a controller operably coupled to the operator interface to effect display of information thereon. The controller is configured to present an item weigh primary interface screen view for weighing operations and at which identity data regarding a given item to be weighed can be entered by an operator and retrieved item information for the given item responsively displayed in at least one product-related display field on the item weigh primary interface screen view. The item weigh primary interface screen view is one of multiple primary interface screen views available to an operator, and the operator is able to interact with the operator interface to move between the multiple primary interface screen views. The controller is configured such that item information retrieved and displayed on the item weigh primary interface screen view remains populated when an operator transitions from the item weigh primary interface screen view to another primary interface screen view and back again.

In another aspect, a scale includes a weigh station for receiving items to be weighed, an operator interface configured to display information associated with scale operations and a controller operably coupled to the operator interface to effect display of information thereon. The controller is configured to present an item weigh primary interface screen view for weighing operations and at which identity data regarding a given item to be weighed can be entered by an operator and item information for the given item responsively retrieved and displayed. The item weigh primary interface screen view includes a selectable menu icon, where selection of the menu icon triggers display of an menu interface window over the item weigh primary interface screen view and through which an operator can access supplemental information. The controller is configured such that item information retrieved and displayed on the item weigh primary interface screen view remains populated when an operator temporarily accesses and then closes the menu interface window.

In another aspect, a method is provided for facilitating user access to information during performance of a weighing operation using a scale that includes a weigh station for receiving items to be weighed, an operator interface configured to display information associated with scale operations, the operator interface including a touch-sensitive display. The method involves the steps of: receiving identity data regarding a given item to be weighed; displaying on an item weigh primary interface screen view of the interface retrieved item information for the given item in at least one product-related display field on the item weigh primary interface screen view; transitioning from display of the item weigh primary interface screen view to one of a different primary interface screen view or a menu interface window displayed over the item weigh primary interface screen view; and transitioning back to display of the item weigh primary interface screen view, with the retrieved item information for the given item continuing to be displayed in the product-related display field, enabling operator completion of the weighing operation.

In another aspect, a scale includes a weigh station for receiving items to be weighed, an operator interface configured to display information associated with scale operations and a controller operably coupled to the operator interface to effect display of information. The controller is configured to present an item weigh primary interface screen view for weighing operations and at which identity data regarding a given item to be weighed can be entered by an operator and item information for the given item responsively retrieved and displayed. The controller is further configured to enable adjustment of the item weigh primary interface screen view by dragging and dropping at least one grouping of displayed fields and/or icons in order to shift the grouping from a first location on the item weigh primary interface screen view to a second location on the item weigh primary interface screen view. Upon such a shift, the controller effects automated adjustment of locations of other parts of the item weigh primary interface screen view to accommodate the shift of the grouping.

In another aspect, a scale includes a weigh station for receiving items to be weighed, an operator interface configured to display information associated with scale operations and a controller operably coupled to the operator interface to effect display of information. The controller is configured to present an item weigh primary interface screen view for weighing operations and at which identity data regarding a given item to be weighed can be entered by an operator and item information for the given item responsively retrieved and displayed. The controller is further configured to enable adjustment of the item weigh primary interface screen view as between a left-handed view and a right-handed view.

In another aspect, a scale includes a weigh station for receiving items to be weighed, an operator interface configured to display information associated with scale operations and a controller operably coupled to the operator interface to effect display of information. The controller is configured to present an item weigh primary interface screen view for weighing operations and at which identity data regarding a given item to be weighed can be entered by an operator and item information for the given item responsively retrieved and displayed. The primary interface screen view includes at least a first dynamic content area and a second dynamic content area adjacent the first dynamic content area. The controller is further configured to enable display of the first dynamic content area to be hidden or turned off and in such case the controller is configured to effect automatic adjustment of a display size of the second dynamic content area to fill space previously taken by the first dynamic content area.

In another aspect, a scale includes a weigh station for receiving items to be weighed and an operator interface configured to display information associated with scale operations. The operator interface includes a touch-sensitive display. A controller is operably coupled to the operator interface to effect display of information thereon. The controller is further configured to vary brightness of the touch-sensitive display in order to extend operating life of the touch-sensitive display. In particular, the controller is configured to effect a normal brightness setting during operator interaction with the touch-sensitive display and a dimmed brightness setting that is implemented after a set time period without operator interaction with the touch-sensitive display. During the dimmed brightness setting, one or more selectable icons or fields on the touch-sensitive display remain live and ready for operator selection.

In another aspect, a method is provided for operating a scale including a weigh station for receiving items to be weighed, an operator interface configured to display information associated with scale operations, the operator interface including a touch-sensitive display. The method includes the steps of: utilizing a first brightness setting for operation of the touch-sensitive display; automatically transitioning to utilization of a second brightness setting for operation of the touch-sensitive display, the second brightness setting being lower than the first brightness setting for improving operating life of the touch-sensitive display; and during utilization of the second brightness setting, continuing to monitor a touch-sensitive surface of the touch-sensitive display for operator selection of one or more displayed icons or fields and, upon operator selection of a given displayed icon or field, capturing the selection.

In another aspect, a method is provided for operating a scale including a weigh station for receiving items to be weighed, an operator interface configured to display information associated with scale operations, the operator interface including a touch-sensitive display. The method includes the steps of: utilizing a first brightness setting for operation of the touch-sensitive display; automatically transitioning to utilization a second brightness setting for operation of the touch-sensitive display, the second brightness setting being lower than the first brightness setting for improving operating life of the touch-sensitive display; and during utilization of the second brightness setting, automatically transitioning back to the first brightness setting for operation of the touch-sensitive display upon the occurrence of either (i) operator contact with a touch-sensitive surface of the touch-sensitive display or (ii) a load cell of the weighing station outputting a weight signal indicative of item placement on the weighing station for weighing.

In another aspect, a scale includes a weigh station for receiving items to be weighed, an operator interface configured to display information associated with scale operations and a customer interface for displaying information to a customer. A controller is operably coupled to the operator interface to effect display of information thereon and operably coupled to the customer interface to effect display of information thereon. The controller is configured to play one of a plurality of customer information videos on the customer interface when the scale is not being used to weigh and price items. The controller is further configured such that upon operator initiation of an item weigh and price operation during display of a specific video of the plurality of customer information videos, display of the specific video is stopped and item weigh and price information is displayed on the customer interface, and upon completion of the item weigh and price operation display of a different video of the plurality of customer information videos is automatically initiated on the customer interface.

In another aspect, a scale includes a weigh station for receiving items to be weighed, an operator interface configured to display information associated with scale operations and a customer interface for displaying information to a customer. A controller is operably coupled to the operator interface to effect display of information thereon and operably coupled to the customer interface to effect display of information thereon. The controller is configured to play a plurality of customer information videos on the customer interface in a defined sequence established by a playlist that can be modified via the operator interface.

In another aspect, a method is provided for providing customers with information via a scale that includes a weigh station for receiving items to be weighed, an operator interface configured to display information associated with scale operations, and a customer interface for displaying information to a customer. The method involves: displaying one of a plurality of customer information videos on the customer interface when the scale is not being used to weigh and price items, upon operator initiation of an item weigh and price operation during display of a specific video of the plurality of customer information videos, display of the first video is stopped and item weigh and price information is displayed on the customer interface, and upon completion of the item weigh and price operation, display of a different video of the plurality of customer information videos is automatically initiated on the customer interface.

In another aspect, a method is provided for operating a scale including a weigh station for receiving items to be weighed and an operator interface configured to display information associated with scale operations. The method involves: presenting an interface screen view that includes (i) multiple fields useful for performing item weigh and price operations and (ii) a plurality of alert icons, each alert icon associated with a particular notification type; and for each alert icon of the plurality, selectively displaying the alert icon in either (i) an active state in the event the notification type associated with the alert icon exists or (ii) an inactive state in the event that the notification type associated with the alert icon does not exist.

In a further aspect, a method is provided for alerting an operator to a specific condition associated with a scale including a weigh station for receiving items to be weighed and an operator interface configured to display information associated with scale operations, where the operator interface comprising a touch-sensitive display. The method involves: displaying an alert icon in an inactive state on the display when an alert condition associated with the alert icon does not exist; displaying the alert icon in an active state on the display when the alert condition associated with the alert icon does exist; and upon user selection of the alert icon during display of the alert icon in the active state, displaying alert notification message information.

In another aspect, a method is provided for reorganizing a food product display area within a food retail sales establishment. The method involves: utilizing a scale including a weigh station for receiving items to be weighed and an operator interface configured to display information associated with scale operations; the scale displaying a planogram alert icon on the operator interface to notify the operator of an available planogram update; the operator selects the planogram alert icon to access display of an image of a desired layout of food product for the food product display area; and the operator utilizing the image to adjust the food product display area to match the desired layout presented in the image.

In a further aspect, a method is provided for reorganizing multiple food product display areas within a food retail sales establishment. The method involves: utilizing a scale including a weigh station for receiving items to be weighed and an operator interface configured to display information associated with scale operations; using the operator interface to access display of multiple planogram options on the operator interface; selecting a first planogram option to cause display of a first image of a desired layout of food product for a first food product display area; the operator utilizing the first image to adjust the first food product display area to correspond to the desired layout presented in the first image; selecting a second planogram option to cause display of a second image of a desired layout of food product for a second food product display area; utilizing the second image to adjust the second food product display area to correspond to the desired layout presented in the second image.

The details of one or more embodiments are set forth in the accompanying drawings and the description below.

Other features, objects, and advantages will be apparent from the description and drawings, and from the claims.

BRIEF DESCRIPTION OF THE DRAWINGS

FIGS. 9, 10 and 11 show exemplary formats for a second primary interface screen view;

FIGS. 35 and 36 show exemplary screen views that facilitate adjustment of scale interface screen dimming operations;

FIGS. 40-42 show screen views that enable an operator to adjust the sell by date of a product on the fly;

FIG. 47 shows a screen view with a network settings pop-up window when there is a network connection.

DETAILED DESCRIPTION

Figure 1:
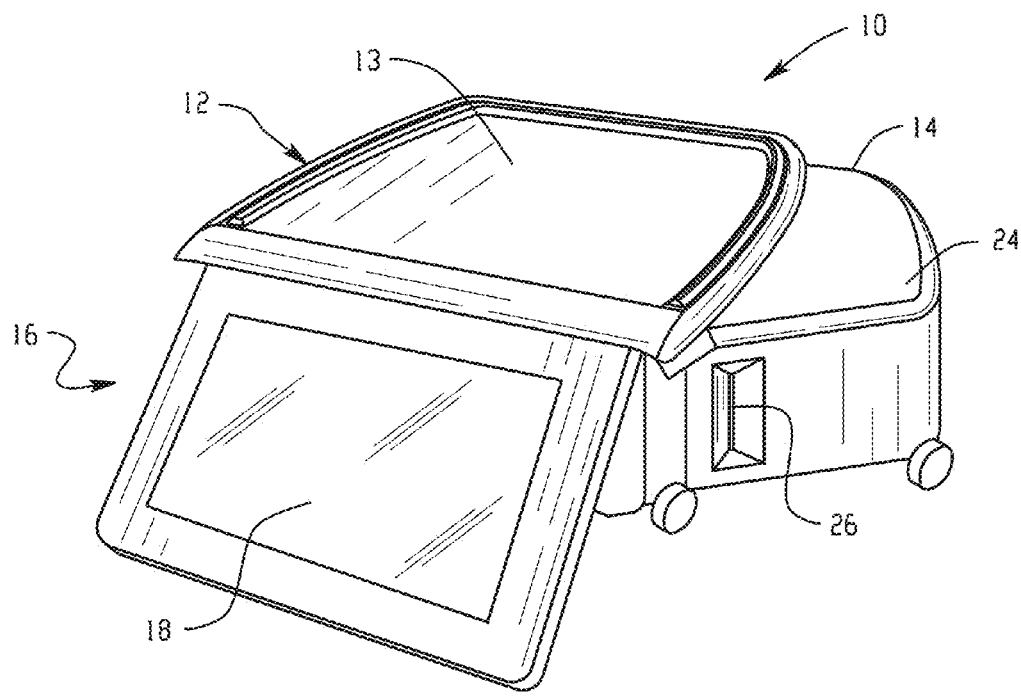
FIG. 1 is a front perspective view of one embodiment of a scale.
Figure 2:
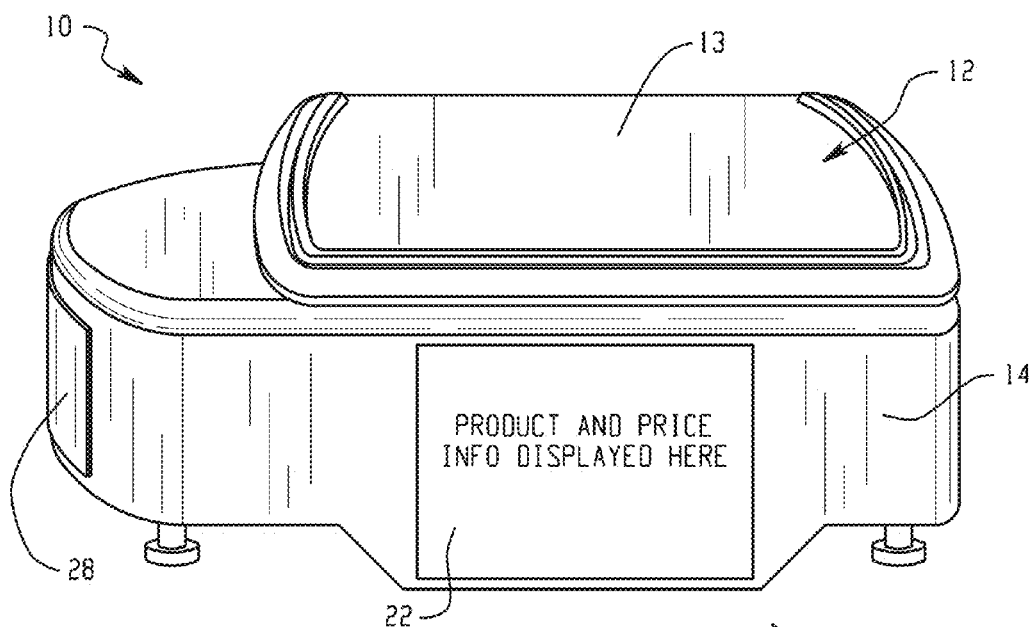
FIG. 2 a rear perspective view of the scale of FIG. 1'

Referring to FIGS. 1 and 2, an exemplary scale configuration is shown. The scale 10 includes a weighing station 12, which in some embodiments may be formed by a weighing platter 13 that can be removed (e.g., for cleaning) from atop the scale housing 14, and having an associated mechanism such as a load cell located internal of the scale housing 14, for producing weight indicative signals when items are placed on the weighing station. An operator interface side 16 of the scale includes an operator interface 18 configured to display information associated with scale operations. By way of example, the operator interface 18 may be formed by a touch-screen display. A customer interface side 20 of the scale includes a customer interface 22, which in certain embodiments may be formed by any suitable display screen technology. It is contemplated that the customer interface 22 need not include touch-screen capabilities, but it is recognized that in certain embodiments touch-screen capability could be incorporated into the customer interface as well. A side portion 24 of the scale housing includes a label exit slot 26 and incorporates a label printer therein along with a label supply station. The label printer may use any suitable printing technology. A removable side panel 28 is provided to access the label supply station for replacement of the labels and to access the label printer and the label path for maintenance etc. Alternatively, member 28 may take the form of a removable cassette.

Figure 3:
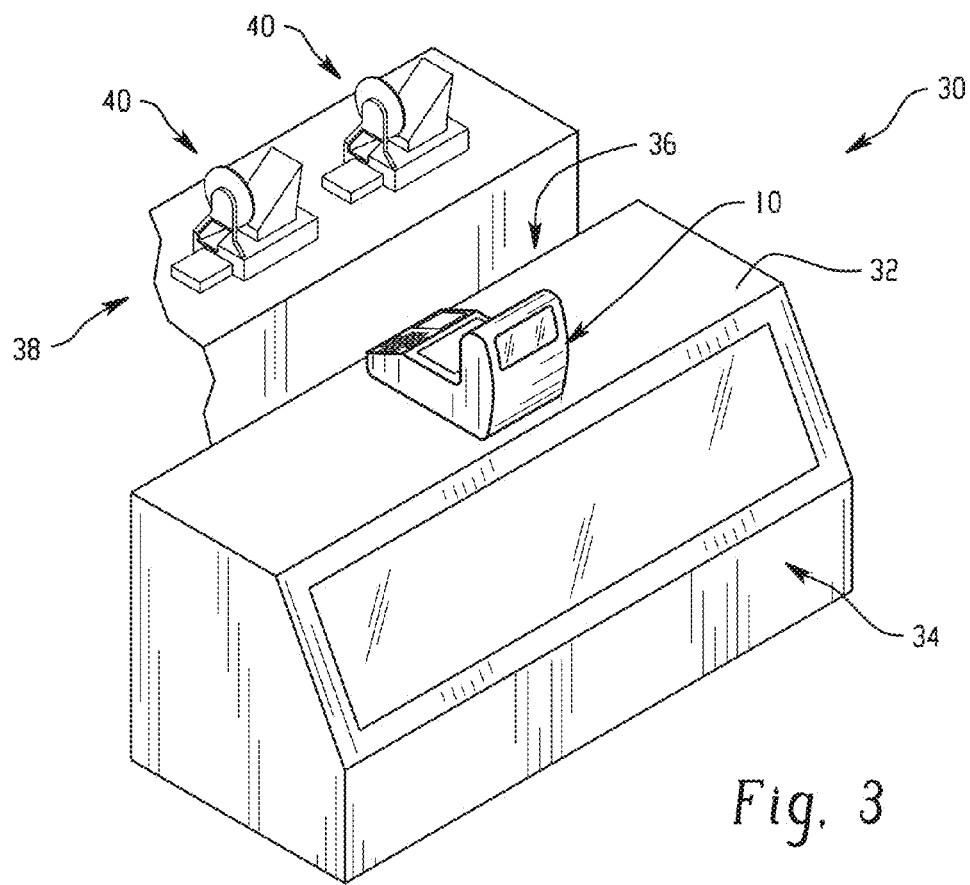
FIG. 3 is a partial perspective view of a scale in an exemplary perishables department of a store.

Referring to FIG. 3, an exemplary scale system 30 is shown (e.g., located in a store perishables department such as a deli department, meat and fish department or baked goods department) having a counter 32 with a customer side 34 and a service person side 36. The scale system includes a scale 10 located atop the counter 32 and adapted for weighing and pricing food items. In the illustrated embodiment a single scale 10 is shown, but many departments will include multiple scales. Likewise, while a single counter is shown, many departments will include multiple counters arranged adjacent each other to effectively form one continuous counter. In an alternative embodiment, the scale may be a hanging scale located above the counter 32. As shown, in certain embodiments the scale counter may be located in front of a meat slicing station 38 that includes one or more food product slicers 40. Although shown in the context of a department including a customer facing side or region, it is recognized that in certain applications the scales will not be used in an environment where the interface 22 faces a customer or customer location (e.g., a back-room or other location where items are not being weighed directly in front of the customer, such as a bakery department). In addition, some scales may also include a self service functionality, that enables store customers to weigh and price items. Moreover, in certain implementations the scale or scale system may be an integrated part of a package wrapper (e.g., of the type used to wrap meat products in the back room of the supermarket). In such an implementation the load cell may be located along a package feed in path of the machine.

In one example of a typical item pricing operation an operator enters an item identifier (e.g., a price look-up number or PLU) via the operator interface, and the scale retrieves price and other product information associated with the PLU and displays product information. The operator places the item (e.g., just sliced by the operator or selected from a container within the deli counter or elsewhere, or in the case of self service selected from a food display or stand) on the weighing station, and the scale prices the item based upon weight and displays that price on both the operator interface and the customer interface. When the desired amount of the product is achieved, the operator presses a print button on the operator interface and the scale prints a label with item details (e.g., item name, item weight, item price) that is then applied to a package in which the item is placed before the package is handed to a customer. In another example, which is more common in a bakery department, the scale 10 may price an item by an item count entered by the operator (e.g., in the case of an item with a PLU that indicates a price based upon item count).

As used herein, the term "operator" refers broadly to any person interacting with the user interface of the scale. Thus, the term "operator" includes, for example, each of (i) regular store employees that may have access to basic scale functions/operations, (ii) supervisor type store employees that may have access to basic scale functions/operations and more advanced scale functions/operations, (iii) service personnel that may have access to special service-based scale functions/operations and (iv) store customers (e.g., where a scale is set-up for operation in a self service mode). When the term "operator" is used in the claims, and unless otherwise dictated by other express limitations of the claim, the term should be construed broadly enough to encompass one or more of the foregoing exemplary operator types. However, when the term "operator" is used in the claims, and unless otherwise dictated by other express limitations of the claim, the term should not be construed as requiring applicability to more than one of the exemplary operator types.

Figure 4:
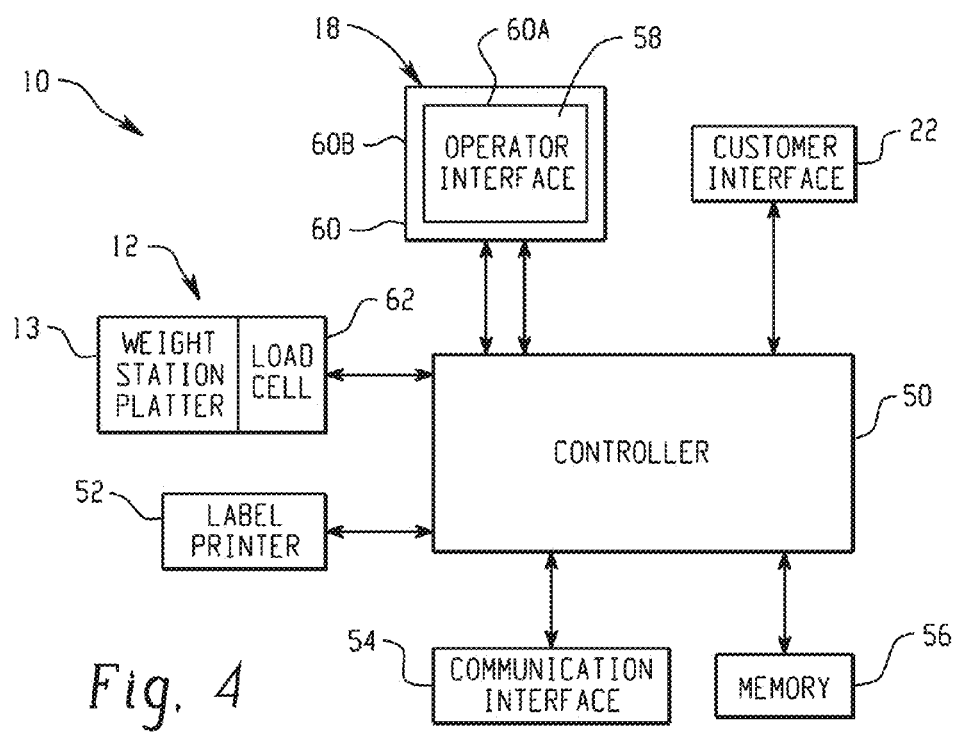
FIG. 4 is a schematic depiction of the scale of FIG. 1.

Referring now to FIG. 4, a high level schematic depiction of the scale 10 is shown, including a controller 50 interconnected with each of the operator interface 18, customer interface 22, weighing station 12, label printer 52 and a communications interface 54, and having associated memory 56. The controller 50 may, for example, be any suitable processor-based controller, including one or more processors, such as a dual-core processor, with associated hardware, software and firmware to achieve desired functionality. As used herein, the term "controller" is intended to broadly encompass the collection of circuits, processors, software, firmware and/or other components that carry out the various operating and processing functions of the scale and its component parts as described herein. The operator interface 18 may include both a display device 58 and touch-screen panel 60 as shown. The weight station platter 13 is operatively connected to a load cell 62, which produces weight indicative signals. The communication interface 54 may be any suitable type (e.g., as a hardware link, such as a standard network connector, or may be formed by a wireless device such as an RF or infrared transceiver), and it is recognized that multiple communications interfaces may be provided. Memory 56 may, by way of example, take the form of one or more of non-volatile flash memory and/or random access memory, or disk on module or micro-SD. As explained above, the controller 50 is operable to establish a price for a weighed item based in part upon a weight indicative signal produced for that item. In this regard, the scale controller may include its own database of product price information (e.g., price per pound) that it retrieves when the operator inputs the PLU number or other product identifier of an item being weighed. Alternatively, in certain embodiments, the controller may utilize the communication interface 54 to access a remote computer system having the database of product price information on other product information. Although not shown in FIG. 4, in certain embodiments the scale may also include an RF operator identification system in which operators utilize RF identification units (e.g., in the form of wrist-band type units, or other structures) that are worn proximate to the hands of the operator. Such a system is described in U.S. Pat. No. 7,041,915.

Figure 5:
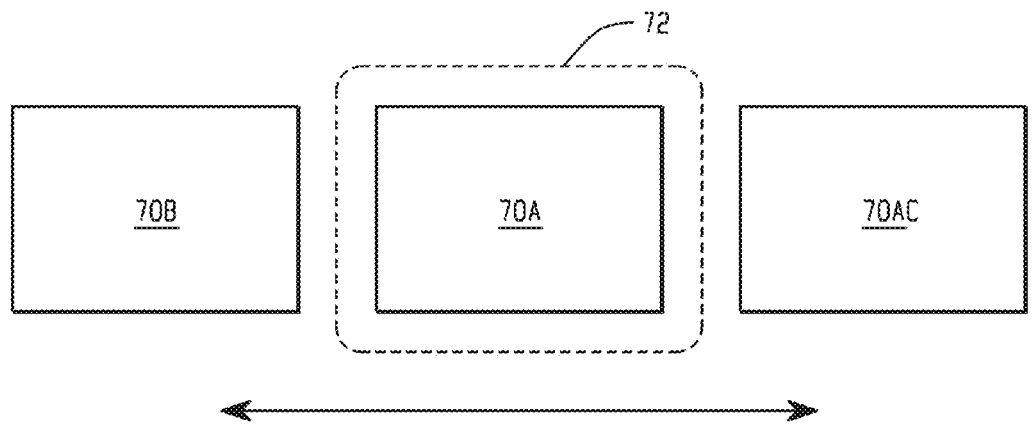
FIGS. 5 and 6 show schematic depictions of primary interface screen view arrangements for the scale of FIG. 1.
Figure 6:
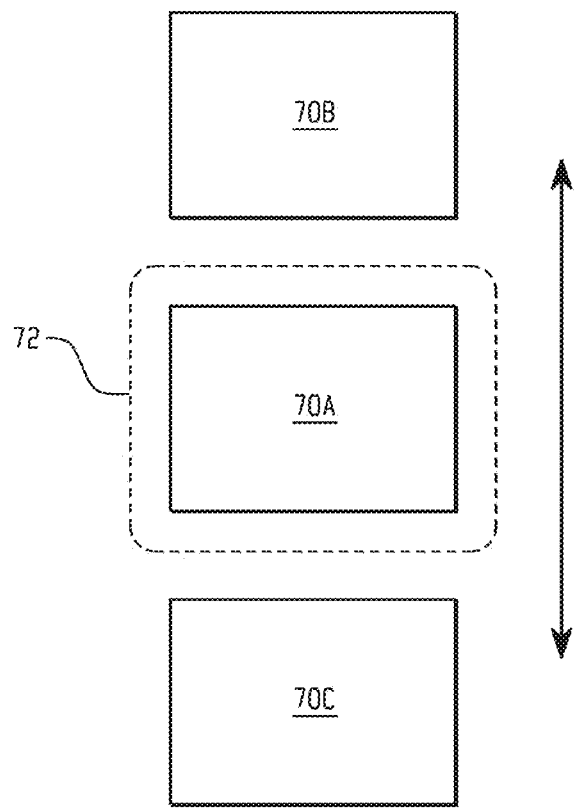

Enhanced functionality and operations of food product scales are desired. In order to provide such enhancements in a straightforward and streamlined manner, such a scale 10 may be provided with an operator interface that utilizes multiple interface screen views. Specifically, and referring to FIG. 5, multiple primary interface screen views 70A, 70B and 70C are shown in side by side relation, with the currently displayed interface screen view represented within dashed line region 72. Although three primary interface screen views are primarily described herein, it is recognized that embodiments having only two primary interface screen views and embodiments having more than three primary interface screen views are also possible. As used herein the terminology "primary interface screen view" is intended to encompass a first level screen view, that is, a screen view that can be presented for display without first clicking or passing through another screen view. As will be described in further detail below, each primary interface screen view is at the ready for display (e.g., meaning that it stands ready to be displayed, such as in RAM), even though only one of the views is being displayed at any given time. In the arrangement of FIG. 5, from the perspective of the operator, the interface screen views 70A, 70 B and 70C appear to be arranged side-by-side horizontally, so that operator selection of a different interface screen view is achieved by some interaction that designates another screen view that is either to the left or to the right of the currently displayed screen view. By way of example, such selection could be achieved by a left or right swiping operation along the operator interface, by selection of a left or right screen view indicator arrow or by selection of a screen view icon that is one of multiple screen view icons displayed horizontally side-by-side on each screen view. In an alternative arrangement depicted in FIG. 6, from the perspective of the operator, the interface screen views 70A, 70B and 70C appear to be arranged one atop another vertically, so that operator selection of a different interface screen view is achieved by some interaction that designates another screen view that is either above or below the currently displayed screen view. By way of example, such selection could be achieved by an up or down swiping operation along the operator interface, by selection of a an up or down screen view indicator arrow or by selection of a screen view icon that is one of multiple screen view icons displayed in a vertically stacked manner on each screen view.

In other embodiments, from the perspective of the operator, the interface screen views could appear to be arranged both side-by-side horizontally and one atop another vertically. For example, with reference to FIG. 5, in order to provide five screen views, a fourth screen view could be perceived as being above screen view 70A and a fifth screen view could be perceived as being below screen view 70A. Thus, from screen view 70A an operator could swipe in any one of four directions to access another screen view, but from either of screen views 70B and 70C, as well as the proposed fourth and fifth screen views, the only screen view accessible by swiping would be the center screen view 70A.

Figure 7:
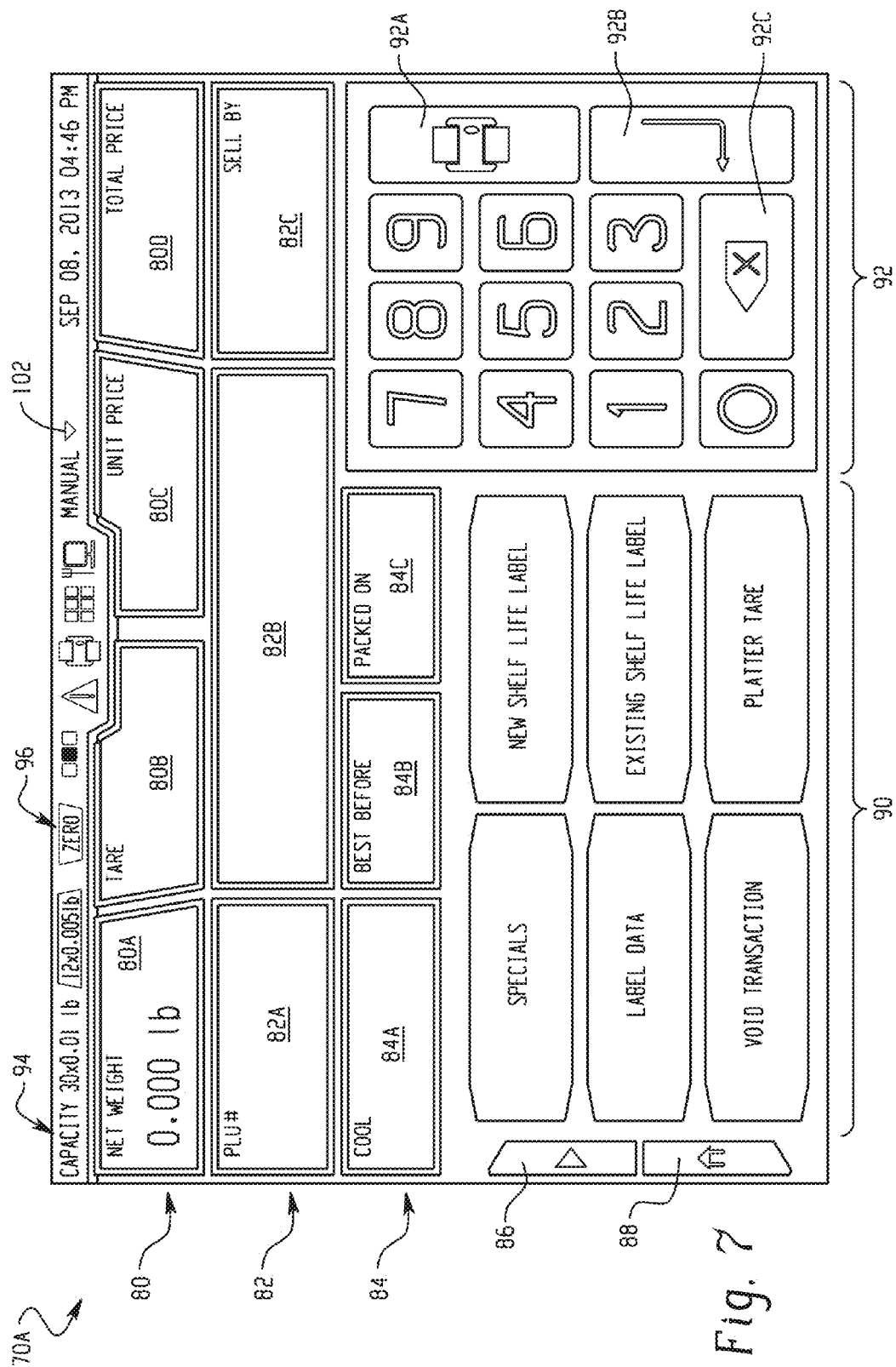
FIGS. 7 and 8 show an exemplary format for a first primary interface screen view.
Figure 8:
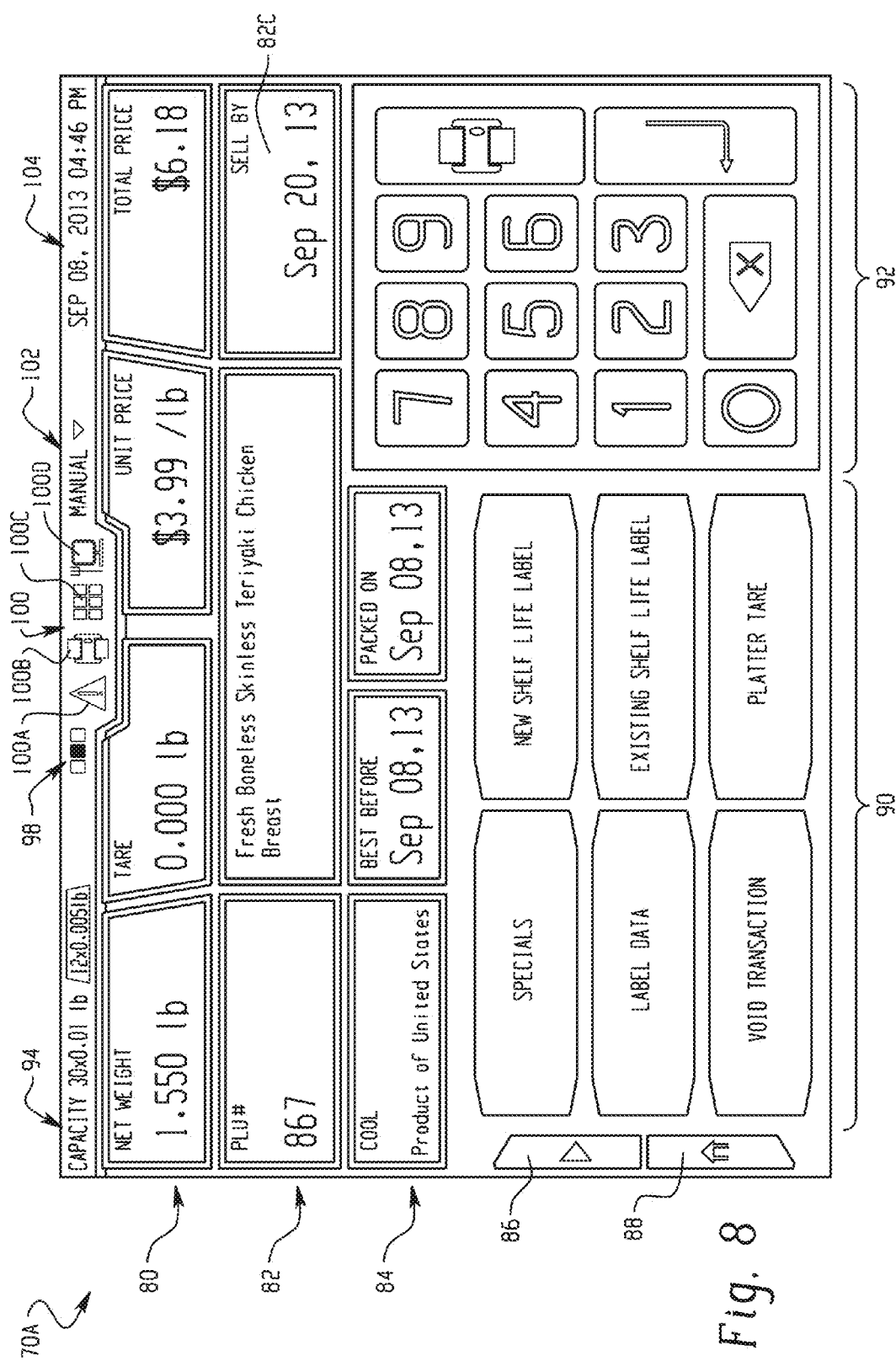

Referring now to FIGS. 7 and 8, an exemplary primary interface screen view 70A is shown. The interface screen view 70A includes each of a metrology bar 80, a PLU description line 82, a product tracking information line 84, a menu button/icon 86, a home button/icon 88, a dynamic content area 90, and a keypad area 92. The illustrated metrology bar 80 for a by weight item includes each of a WEIGHT field 80A, a TARE field 80B, a UNIT PRICE field 80C and a TOTAL PRICE field 80D. However, where the product is a by count, by fluid ounce or fixed weight item the metrology bar fields may vary The PLU line 82 includes each of a PLU # field 82A, a product name/description field 82B and a SELL BY field 82C. The product tracking information line 84 includes a COOL (country of origin label) field 84A, a BEST BEFORE field 84B and PACKED ON field 84C. The illustrated dynamic content area 90 includes multiple selectable buttons, but could include other content as will be described in more detail below. The keypad area 92 includes multiple selectable numeric buttons, as well as print 92A, return 92B and backspace 92C buttons. The operator may use the keypad to enter a PLU number, which causes product price and other information to be retrieved and loaded into the various fields as shown by way of example in FIG. 8.

Notably, in the top section of the screen view 70A, a further set of display features is provided. These display features include a capacity string 94, a ZERO indicator 96, a screen view location indicator 98, an alert indicator section 100, a scale operating mode indicator 102 and a date and time indicator 104. The capacity string 94 shows the scale capacity, with current capacity range is shown within a trapezoid. The ZERO indicator 96 is an icon that appears when no weight is on the scale and the scale is at zero load. The screen view location indicator 98 is an icon or group of adjacent icons that shows which of the three screen views is being displayed. In this case, three side-by-side rectangular icons, with the rectangle shown in solid reflecting an active state of that icon and depicting the screen view that is currently being displayed, and with the rectangles not shown in solid reflecting a background state of that icon showing the other screen views that exist, but that are not currently being displayed. Thus, each one of the adjacent screen view icons or frames is associated with one of the of primary interface screen views in a one-to-one correspondence, and only one of the screen view icons is displayed as active at any given time in accordance with the primary interface screen view being displayed at the given time. In certain implementations, the controller 50 may be configured such that the screen view icons are selectable, and selection of a given one of the screen view icons will cause the primary interface screen view associated with the given screen view icon to be displayed. The alert section provides four different alert icons, representing four different alerts, namely a Generic Alert icon, a Printer Alert icon, a Planogram Alert icon and a Network Connectivity alert icon.

The Generic Alert icon 100A will flash (e.g., red) when one or more alert messages occurs (e.g., a product recall message is available, or other alert not addressed by a more specific alert icon). Touching the icon will cause the message to be displayed. The icon will remain white (e.g., not flashing) when there are no active generic alert messages.

The Printer Alert icon 100B will flash (e.g., red) when there is a printer issue such as the label cassette is open or the printer is out of labels. Touching the icon will cause the message to be displayed. The icon will remain white (e.g., not flashing) when no message exists.

The Planogram icon 100C will flash (e.g. red) when a planogram image is available. Touching the icon will cause the planogram image to be displayed. The icon will remain white (e.g., not flashing) after the planogram image has been viewed.

The Network Connectivity icon 100D will either display a hard wired icon or will show bar strength for a wireless connection. If connectivity is lost, the background of the scale application will be red and the icon will be red and flashing.

Notably, the capacity string 94 and the metrology bar 80 may be connected in the control software design. All required active screen information from Weights & Measures is within these two lines. For operator ease, the PLU # field 82A and item description field 82B are side by side. All PLU information is viewed in the top half of the screen view, helping the operator concentrate in a smaller area. In FIG. 7, the PLU # field is outlined in and offset color (e.g., blue rather than white), because in this image the cursor is in the PLU # field designating it as the active field, helping the operator know where the scale is and if it's expecting a command. The product tracking line or row 84 contains information that is commonly used in Deli/Meat/Seafood departments, but that is generally not necessary for a bakery or a floral department. These fields 84A, 84B and 84C can be hidden, as will be described in more detail below, thus making the overall screen layout more effective for departments not needing this information.

Figure 9:
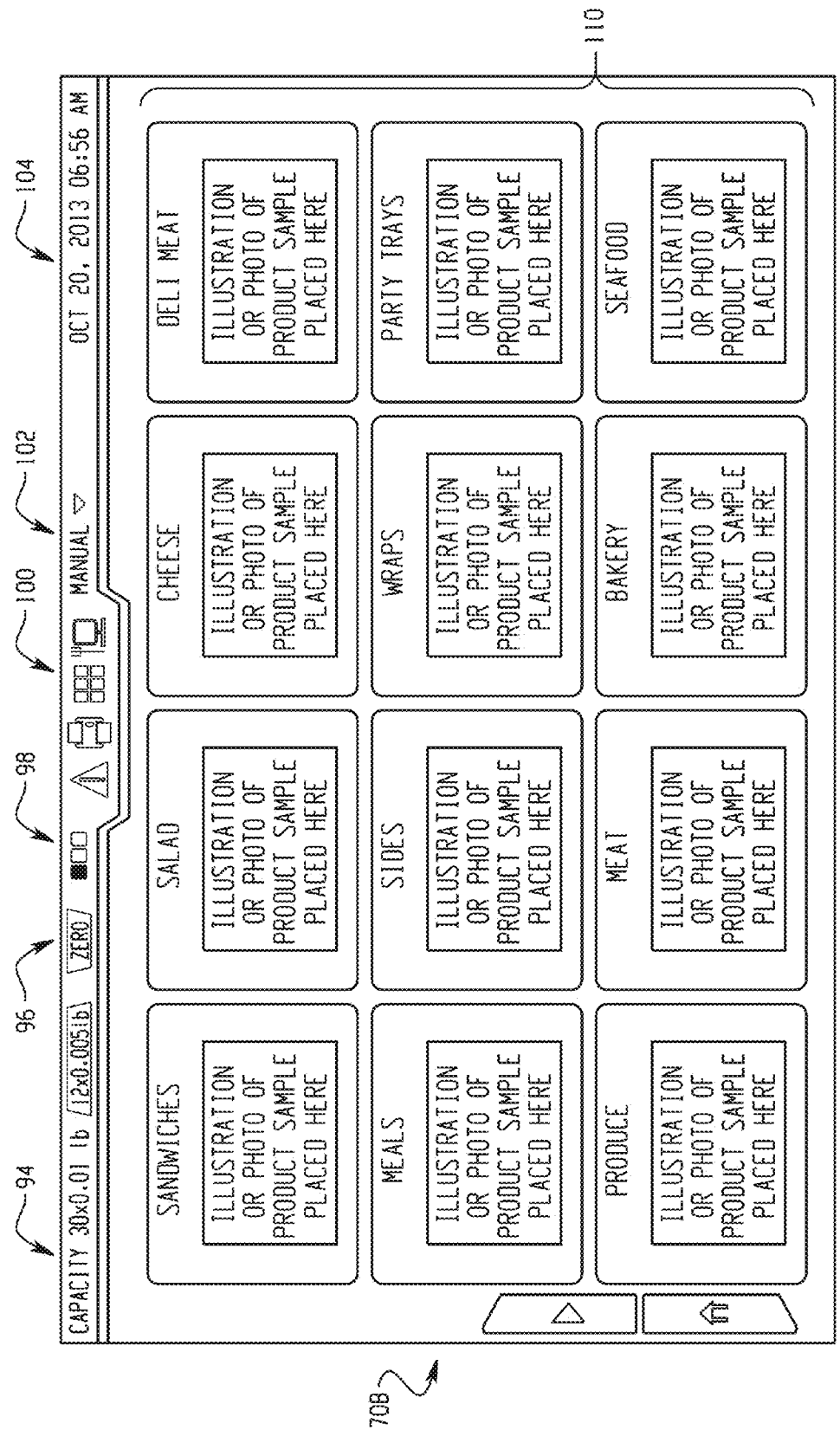
Figure 10:
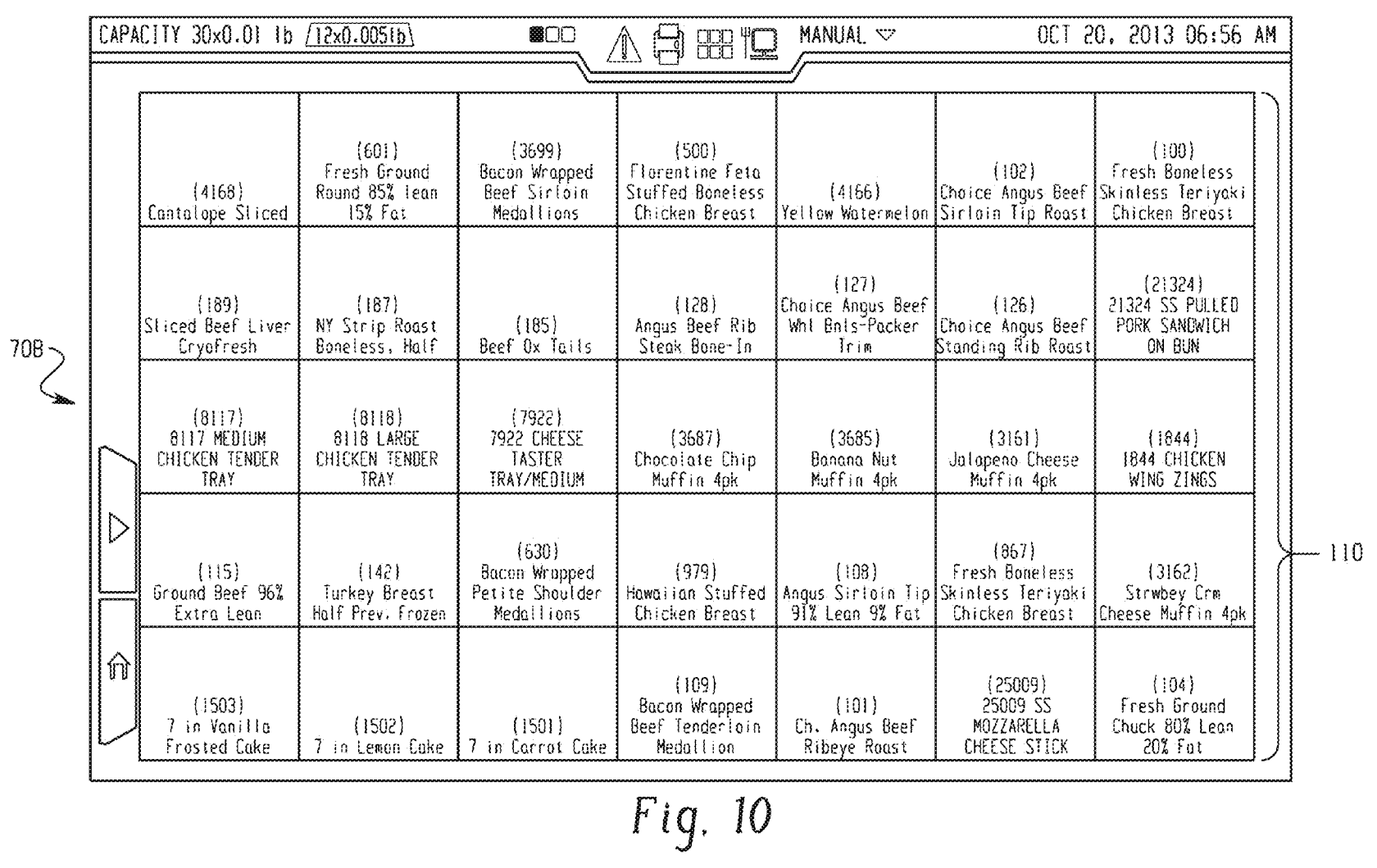
Figure 11:
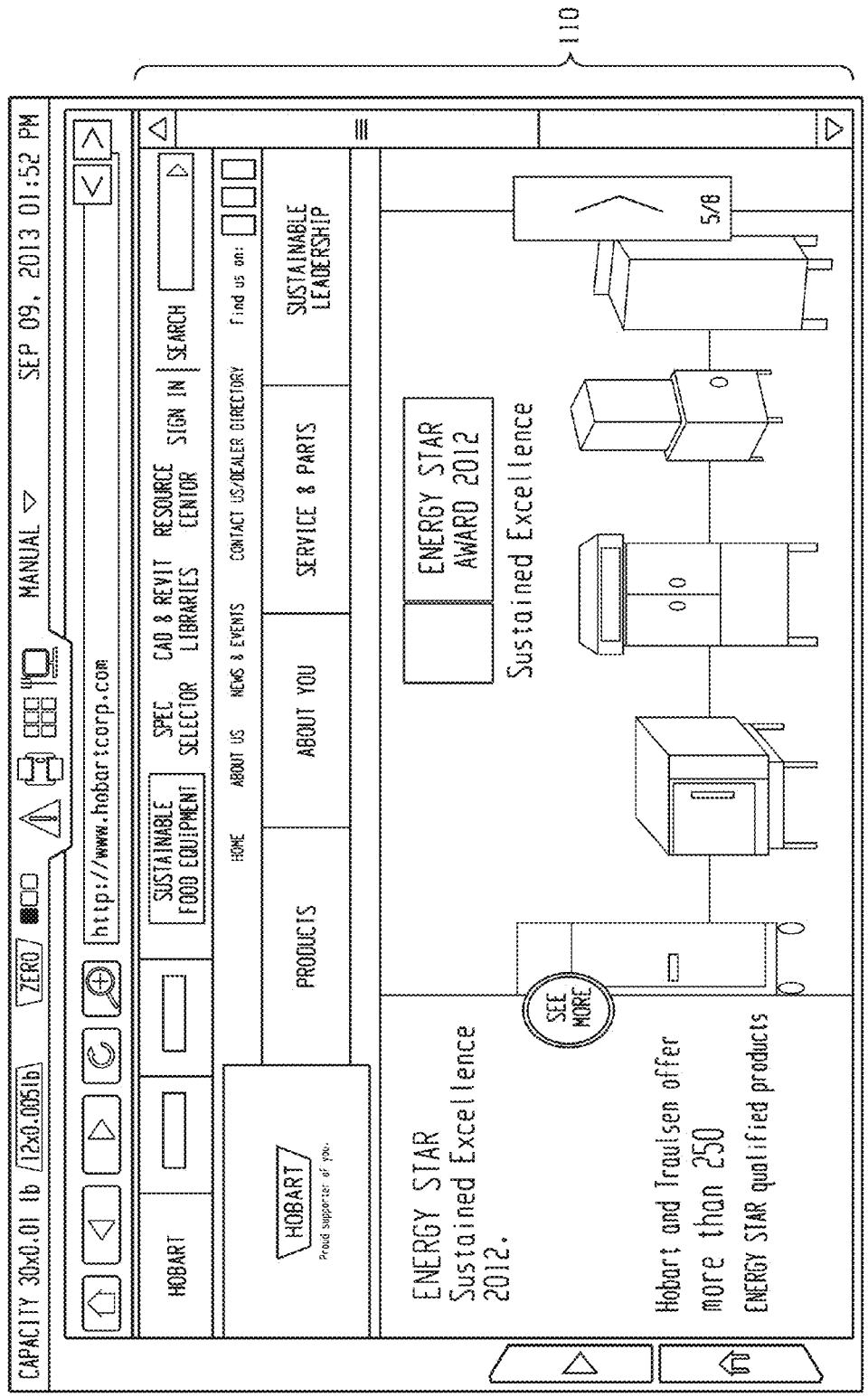

Referring now to FIGS. 9-11, exemplary primary interface screen views 70B are shown in which a major portion of the view is a dynamic content area 110 that can be set to display multiple different sets of content. For example, in FIG. 9 the dynamic content area displays customized flashkeys, which may be varied/selected as described further below, for different item types that can be selected to retrieve further information regarding such item types, such as flashkeys for specific PLUs. In FIG. 10 the dynamic content area displays item PLU #s and names for a plurality of items (e.g., as flashkeys), which may be varied/selected as described further below. Selection of a PLU key from the view in FIG. 10 may function to load the corresponding PLU data into the PLU fields 82 of primary interface screen view 70A, even though that primary interface screen view is not being viewed. Likewise, in certain implementations, such selection of a PLU key from the view of FIG. 10 may also cause an automatic transition to screen view 70A. In FIG. 11 the dynamic content area displays a web browser that the operator can use to retrieve/view information.

Figure 12:
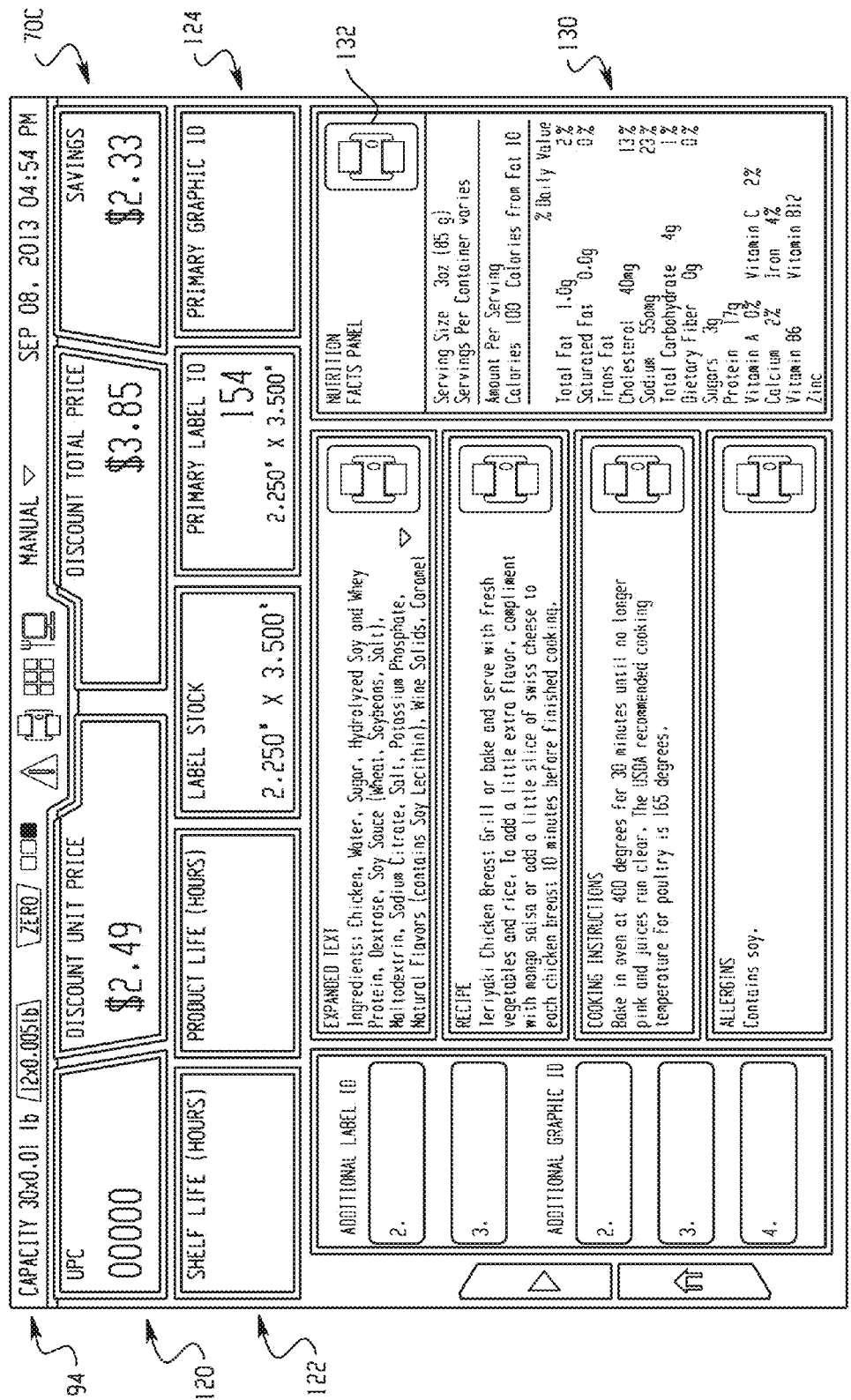
FIG. 12 shows an exemplary format for a third primary interface screen view.

Referring now to FIG. 12, an exemplary interface screen view 70C is shown. Notably, unlike the screen views 70A and 70B, the displayed field in screen view 70C are fixed and cannot be modified. Screen view 70C includes a discount pricing line 120 (e.g., UPC, DISCOUNT UNIT PRICE, DISCOUNT TOTAL PRICE and SAVINGS fields), a product life display region 122 (e.g. SHELF LIFE and PRODUCT LIFE), label information display regions 124 (e.g., LABEL STOCK, PRIMARY LABEL ID and PRIMARY GRAPHIC ID display fields) and 126 (e.g., ADDITIONAL LABEL ID and ADDITIONAL GRAPHIC ID display fields), additional product information display region 128 (e.g., displaying EXPANDED TEXT, RECIPE, COOKING INSTRUCTIONS and/or ALLERGENS information, each with an associated print icon that can be used by the operator to print the information) and nutrition facts panel display region 130 (e.g., having an associated print icon 132 that can be used to print a nutrition facts label). The data for the fields on screen view 70C is automatically retrieved and loaded based upon the PLU # entered by the operator on screen view 70A, so that the data is ready and available for the operator when the operator shifts to screen view 70C.

Notably, also present in each of the screen views 70B and 70C, are the capacity string 94, ZERO indicator 96 (not shown in screen view 70C because the screen view presumes an item on the weighing scale), the screen view location indicator 98, the alert indicator section 100, the scale operating mode indicator 102 and the date and time indicator 104. Moreover, screen views 70B and 70C also include the menu button/icon 86 and the home button/icon 88. Thus, as between the multiple screen views 70A, 70B and 70C there is a degree of similarity based upon certain fixed features that are common between the screen views, and a degree of difference based upon other features that are not common between the views. Thus, the scale provides a unique and desirable interface arrangement.

In particular, the controller 50 is operably coupled to the operator interface 18 to affect display of information thereon, with the controller configured such that multiple primary interface screen views (e.g., 70A, 70B and 70C) are made available for operator use. Each of the primary interface screen views includes: (i) a plurality of fixed features (e.g., features 86, 88, 94, 96, 98 100, 102 and/or 104), that are common among all the primary interface screen views, where each fixed feature resides in a common location in each of the primary interface screen views, and (ii) other features that are not common with the other primary interface screen views. The most prominent of the fixed features include the home button/icon 88 and menu button/icon 86. Notably, the controller 50 may be configured such that one of the screen views 70A, 70B and 70C is designated as a home interface screen view. Triggering the home button/icon 88 from either of the non-home interface screen views causes a transition back to display of the designated home interface screen view. The controller 50 may be configured such that designation of the home interface screen view can be changed as between at least two of the primary interface screen views as reflected in FIGS. 13-16. Likewise, the controller may be configured such that the scale automatically boots to the designated home screen upon start-up.

Figure 13:
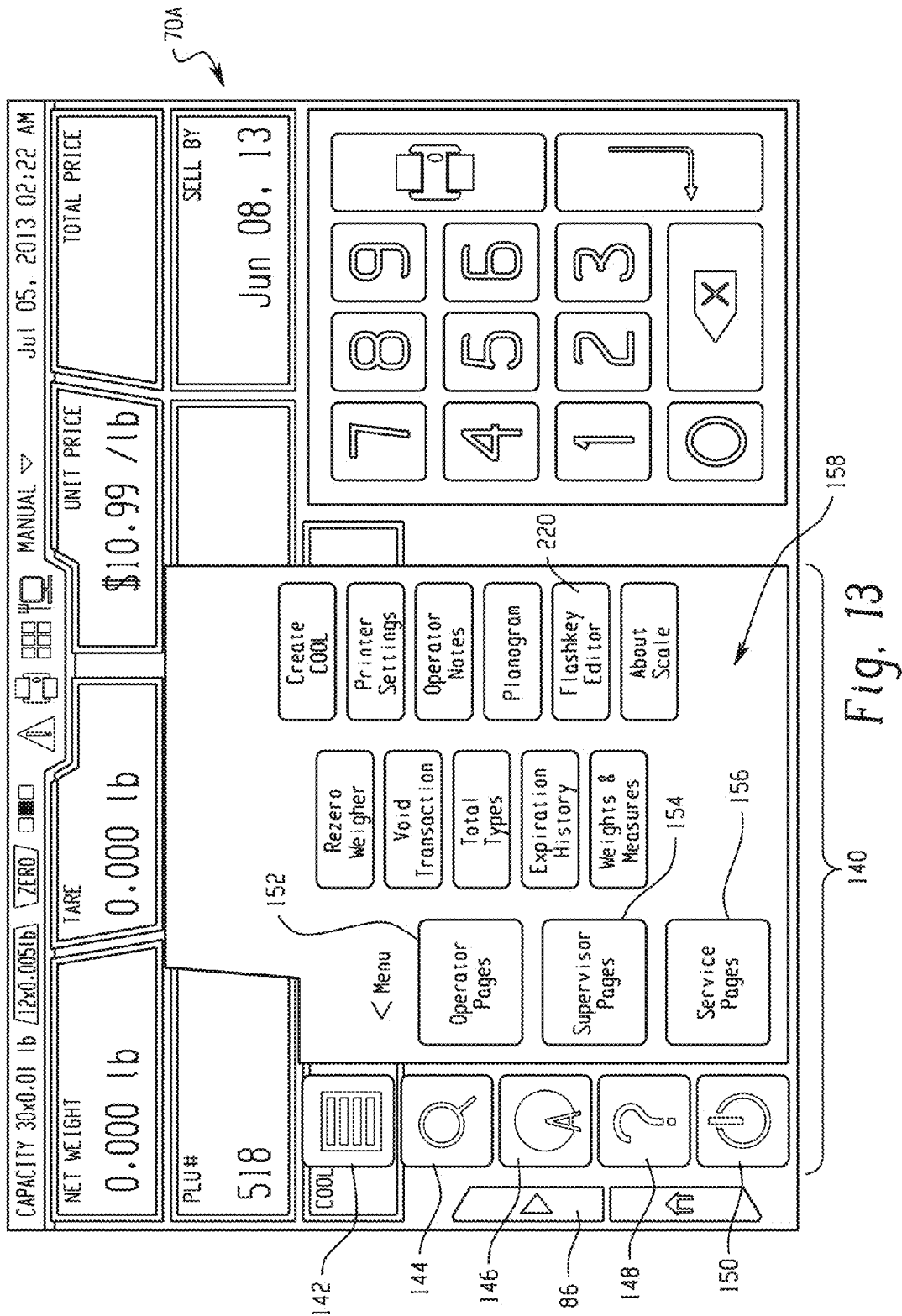
FIGS. 13-16 show exemplary interface operations enabling the designated home interface screen view to be changed.
Figure 16:
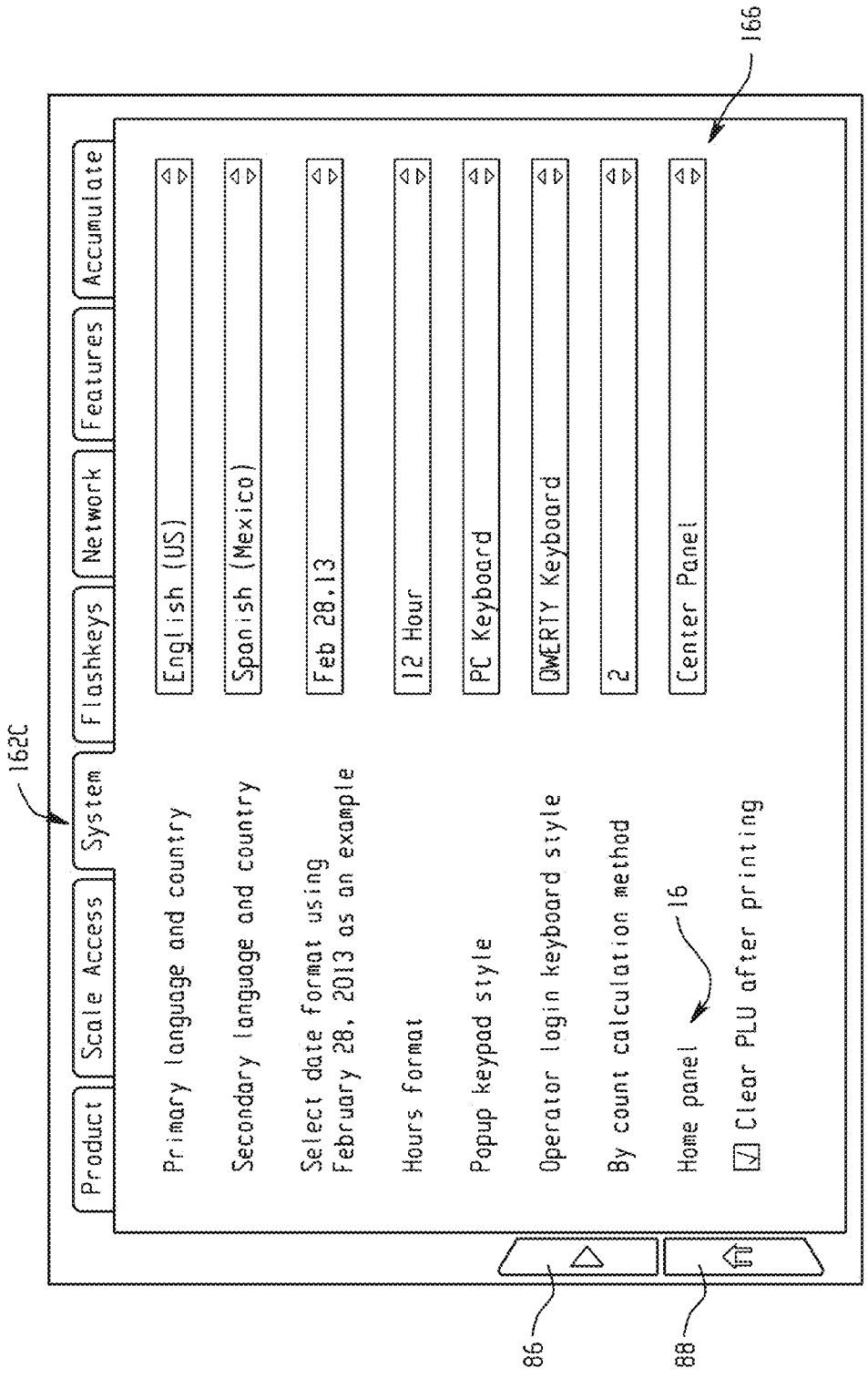

FIG. 13 shows an initial pop-up window 140 that appears upon operator triggering of the menu button/icon 86, which includes the following items menu icon 142, search icon 144, language toggle icon 146, help icon 148 and shutdown icon 150, with a default selection of the menu icon 142 (e.g., as reflected by the surrounding frame of the icon 142 being offset in a different color (e.g., blue) than the frame colors (e.g., white of the other icons). This default selection results in the simultaneous display of an operator pages button 152, a supervisor pages button 154 and a service pages button 156, with the operator pages button 152 selected as default. This default button selection results in the display of various operator task buttons 158. In the exemplary embodiment, the home screen view selection is made by way of the supervisor pages button 154, the selection of which causes the window view to change as reflected in FIG. 14 to present a number of supervisor task buttons 160, including a scale operations button 160A designated as Normal Operations. Selection of button 160A causes the screen view to display the data shown in FIG. 15, which includes a task selection bar 162 with buttons for Product 162A, Scale Access 162B, System 162C, Flashkeys 162D, Network 162E, Features 162F and Accumulate 162G, where the Product button 162A is the default selection. By selection of the System button 162C the display transitions to that shown in FIG. 16, which presents numerous system features that can be modified, including a Home panel feature 164 with a drop down menu 166 that allows selection of which screen view (here referred to as a "panel") is the designated home screen view that is associated with the home button/icon 88. In FIG. 16 the center screen view 70A is designated as the home screen view, but an alternate screen view can be selected from the drop down menu. Notably, where more than two primary interface screen views are provided, the controller may be configured such that less than all of those screen views can be designated as the home screen view. For example, in the above described embodiment including with primary interface screen views 70A, 70B and 70C, only screen views 70A and 70B may be selectable as the home interface screen view, while screen view 70C cannot be designates as the home interface screen view. The purpose of including this limit is where one or more of the primary interface screen views is limited in its usefulness to the operator (e.g., as in the described embodiment where interface screen view 70C is only useful if a PLU number has been entered in order to retrieve and load data into the fields of screen view 70C).

Referring again to the fixed features common to interface screen views as described above, a method of achieving this operator interface arrangement involves: identifying a set of critical interface features (i.e., to be the fixed features, such any of features 86, 88, 94, 96, 98 100, 102 and/or 104, or others that may be suitable), incorporating the critical features into at least a first interface screen view (e.g., view 70A) and a second interface screen view (e.g., view 70B) that are presentable to operators via the operator interface in a manner that enables operators to switch between the first interface screen view and the second interface screen view, identifying a first set of primary features for the first interface screen view, the first set of primary features focused on a primary function of the first interface screen view (e.g., the metrology bar 80 of interface screen view 70A for use in weighing), incorporating the first set of primary features into the first interface screen view, identifying a second set of primary features for the second interface screen view, the second set of primary features focused on a primary function of the second interface screen view (e.g., the dynamic content area 110 of screen view 70B for use by operators to obtain information) and incorporating the second set of primary features into the second interface screen view.

As mentioned above, various techniques may be used to transition between the multiple primary interface screen views. Where the operator interface 18 is formed by a touch-sensitive display, the controller 50 may configured to enable transition from one primary interface screen view to another primary interface screen view via a swiping operation along the display in one of a horizontal direction or a vertical direction. In one example of such an arrangement, and referring again to FIG. 4, the touch-sensitive display includes a viewing area reflected by the rectangular area of the display device or screen 58, and a touch-sensitive member 60 with a primary portion 60A that overlies the viewing area 58 and a secondary portion 60B (e.g., shown with stippling in FIG. 4 and framing the viewing area 58) that is external of the viewing area. In this arrangement, swiping operations can be achieved using the secondary portion 60B of the touch-sensitive member 60.

Figure 17:
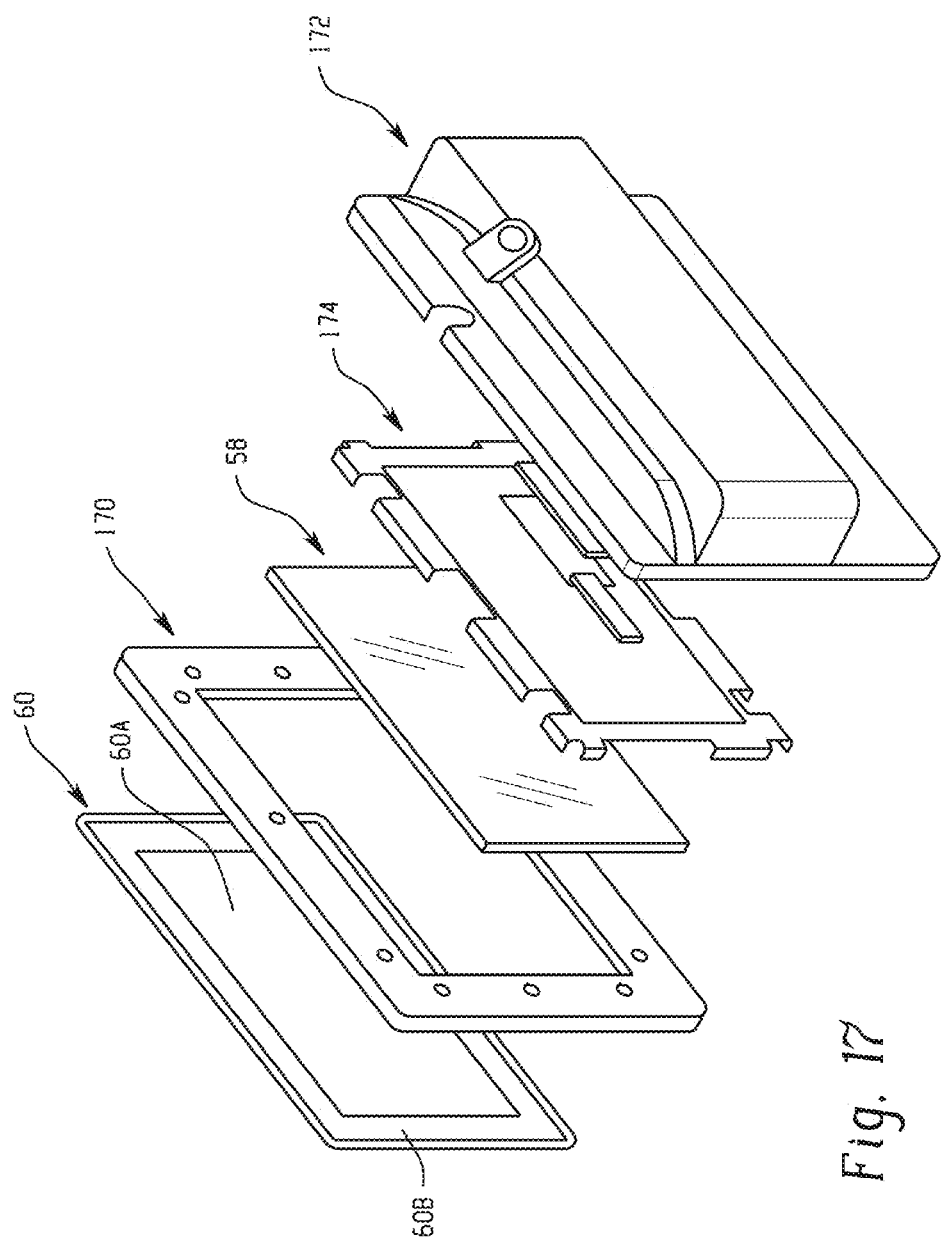
FIG. 17 shows an exploded partial perspective view of an exemplary console that can form the operator interface of the scale of FIG. 1.
Figure 18:
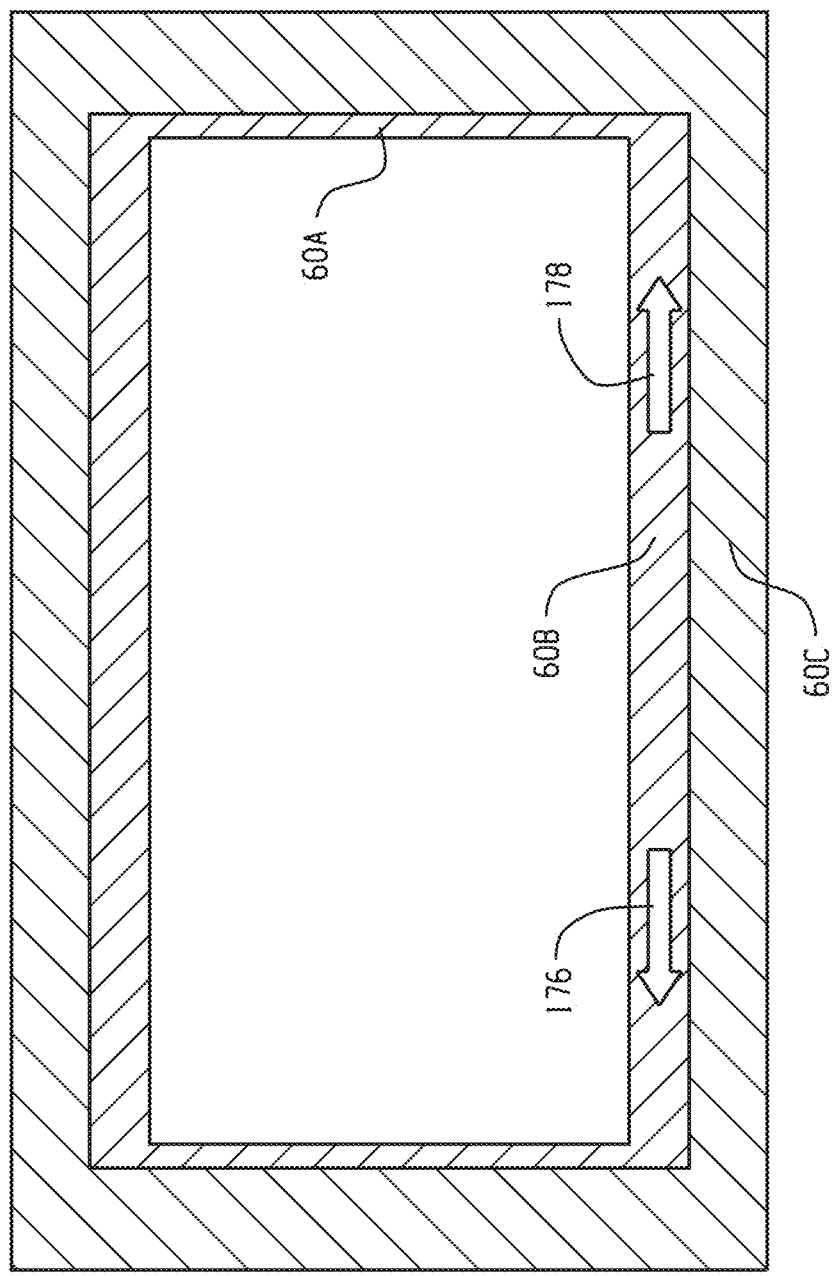
FIG. 18 shows a view of the active area of the touch-sensitive member of FIG. 17.

FIG. 17 shows an exploded partial view of one example of the operator interface including both the touch-screen panel 60 and the display screen 58, as well as housing components 170, 172 and circuitry panel/component 174. Primary portion 60A and secondary portion 60B of the touch-sensitive panel are both shown. The touch-sensitive member may be formed by a plate (e.g., glass or plastic) with a perimeter portion that is opaque so as to frame an interior portion that is transparent. Here, the perimeter portion defines the secondary portion 60B and the interior portion defines the primary portion 60A. The interior portion of the glass plate aligns with the display screen 58 positioned behind the glass plate. A printed layer is applied to a back side of the glass plate to achieve opaqueness of the perimeter portion 60B. In addition to the opaqueness, the printing may be used to apply fixed visible indicia on the back side of the glass plate to indicate swipe functionality outside the perimeter of the interface viewing area. As best seen in FIG. 18, where the visible indicia takes the form of left and right swipe arrows 176 and 178. However, the indicia could take other forms (e.g., such as verbal indicia indicating Swipe Here) or a swiping bar that extends the full width of the viewing area. In the example of FIG. 18, the primary portion 60A of the touch sensitive plate is shown as blank and aligns with the viewing area of the display. The remaining portions of the touch sensitive plate are shown with cross-hatch marking and represent the portions of the plate that include printing on the back side. The remaining portions include the secondary portion 60B immediately surrounding the primary portion 60A and that is also touch sensitive, and a third portion 60C which frames the secondary portion 60B and that is not touch-sensitive.

In the illustrated example, the secondary portion of the touch-sensitive panel frames the entire viewing area, thereby enabling swiping operations in any of those regions immediately adjacent the viewing area. Thus, all such regions could include the swiping indicia mentioned above. However, it is recognized that the secondary portion need not necessarily frame the entire viewing area (e.g., it could be located only above and below or only to the left and right sides of the viewing area). Providing the swiping area external of the viewing area is particularly useful where, as is the case in the illustrated example, the viewing area is largely covered with selectable fields, making it difficult to swipe within the viewing area without inadvertently selecting a field.

Referring again to FIGS. 7-12, and as alluded to above, each primary interface screen view is at the ready. When a PLU number is entered, for example in primary interface screen view 70A, data is automatically loaded into interface screen view 70C (e.g., in RAM) so that if an operator swipes to transition to screen view 70C, that screen view 70C will contain the loaded information immediately upon viewing. Moreover, when an operator swipes to transition away from, for example, a populated primary interface screen view 70A (e.g., per the view shown in FIG. 8) to one of the other views 70B or 70C, and then subsequently swipes to transition back to the primary interface screen view 70A, the primary screen view 70A returns as a populated view (i.e., the PLU based data that was previously loaded remains in the screen view 70A for viewing).

Thus, in such an embodiment, the controller is configured such that item information retrieved and displayed on the item weigh primary interface screen remains populated when an operator transitions from the item weigh primary interface screen view (e.g., in this case screen view 70A) to another primary interface screen view (e.g., in this case screen view 70B or 70C) and back again. Moreover, screen view 70C represents a supplementary product information primary interface screen view that includes additional product-related display fields (e.g., 120, 122, 128 and 130) and when identity data regarding an item to be weighed is entered by the operator at the item weigh primary interface screen view (e.g., PLU entered at screen view 70A) the controller is configured so that it automatically retrieves and loads the additional product-related display fields with data even though the supplementary product information primary interface screen view is not being displayed on the operator interface. Notably, these features of implementations using multiple primary interface screen views (i.e., the automatic retrieve and load feature, and screen view data remaining populated even after a transition away from the screen view) enhance overall operator interaction with, and ease of use of the scale.

As used herein, the terminology "remains populated" when referring to the information and/or data of a screen view is intended to broadly encompass the situation in which the information and/or data is still presented on the screen view when the operator returns to the screen view. Thus, in one example, the information and/or data remains populated as a result of the information and/or data never being removed from the fields of the screen view (e.g., even when the screen view is not being displayed or when a pop-up window is being displayed over the screen view). In another example, the information and/or data remains populated as result of being temporarily removed from the fields of the screen view and stored (e.g., upon transition away from the screen view or upon over display of a pop-up window on the screen view) until the information and/or data is later automatically loaded into the fields of the screen view (e.g., as triggered by a call to return to display of the screen view or as triggered by a call to close the pop-up window that is displayed over the screen view).

Figure 14:
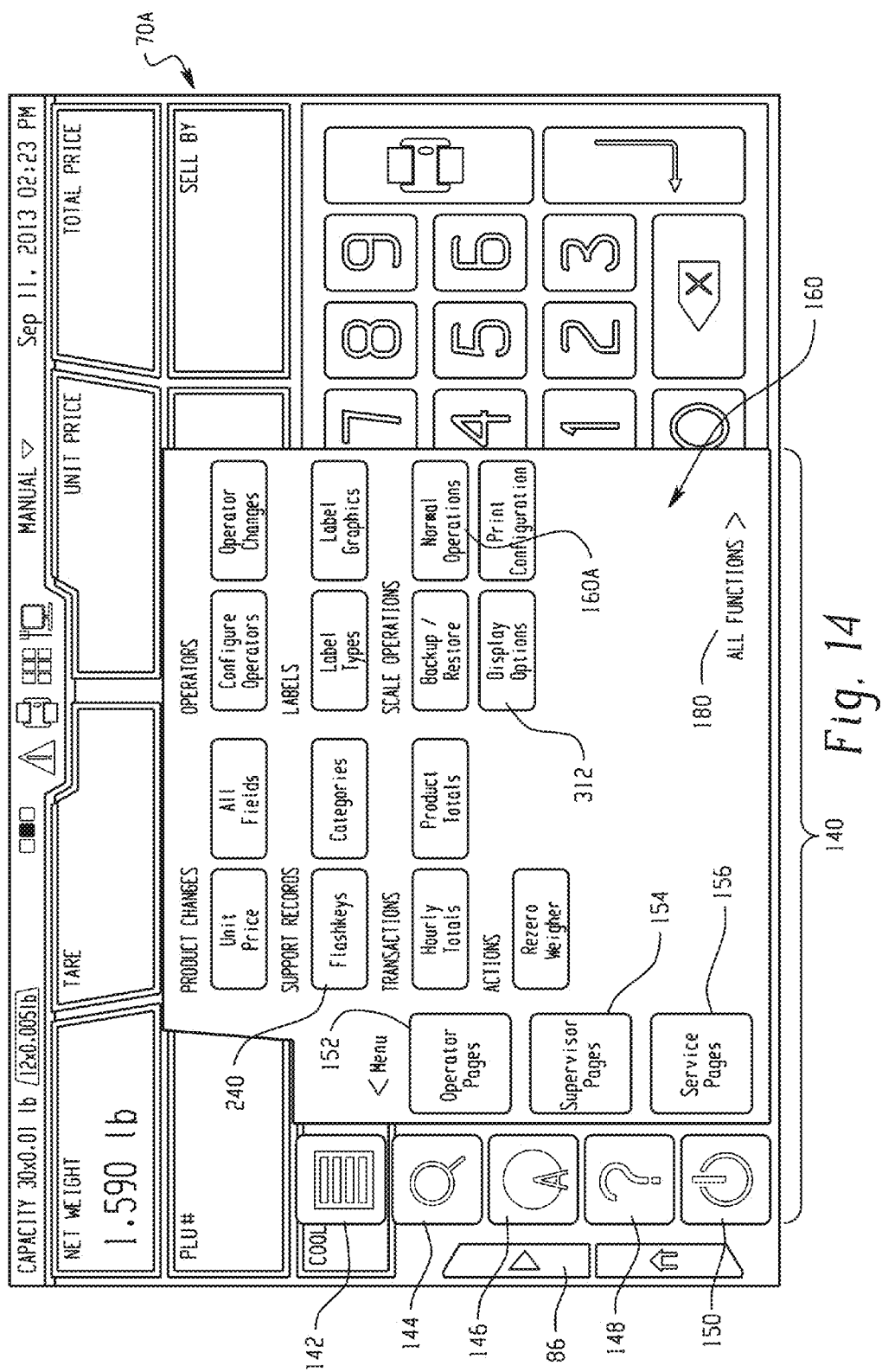
Figure 15:
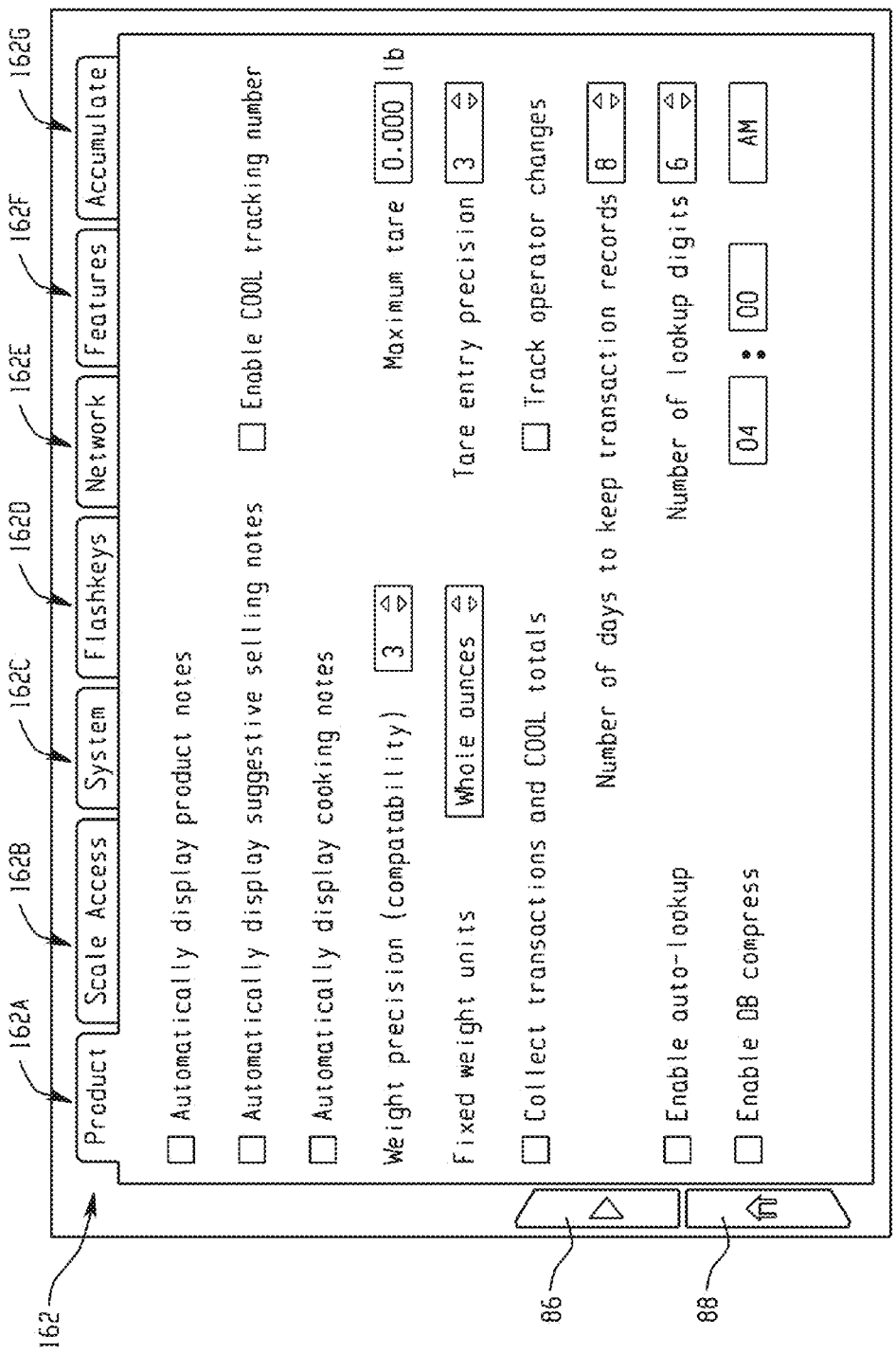

In addition, and referring specifically to FIGS. 13 and 14, in certain embodiments, the item weigh primary interface screen view (e.g., 70A) includes a selectable menu icon (e.g., 86). As noted above, selection of the menu icon triggers display of an menu interface pop-up window (e.g., 140) over the item weigh primary interface screen view, which causes the fields of the item weigh primary interface screen view to no longer be selectable. An operator can access many types of supplemental information through the pop-up window 140, as well as perform other functions. When the operator is finished with the information look-up, the pop-up window 140 can be closed (e.g., as by hitting the home button or hitting the screen anywhere outside of the pop-up window 140), leaving the item weigh primary interface screen view 70A presented on the screen with its fields again in a selectable state. Thus, in such an implementation, the controller is configured such that item information retrieved and displayed on the item weigh primary interface screen view remains populated when an operator temporarily accesses and then closes the menu interface window. Again, this feature facilitates enhanced operation of the scale, enabling an operator to, for example, look-up information in the middle of a weighing process without having to restart the weighing process (e.g., reenter the PLU#) once the information look-up is completed.

Thus, an advantageous method of facilitating user access to information during performance of a weighing operation using a scale is provided. The method involves the scale receiving identity data regarding an item to be weighed (e.g., based upon operator enters a PLU# via the displayed keypad or selects a displayed PLU flashkey). The scale responsively displays on an item weigh primary interface screen view retrieved item information for the given item (e.g., PLU #, unit price, product name etc.) in at least one product-related display field on the item weigh primary interface screen view. The interface subsequently transitions (e.g., responsive to an operator swiping operation or menu button selection) from display of the item weigh primary interface screen view to one of a different primary interface screen view (e.g., 70B or 70C) or a menu interface window displayed over the item weigh primary interface screen view (e.g., pop-up window 140). The interface subsequently again transitions (e.g., responsive to another swipe or to pop-up window closure) back to display of the item weigh primary interface screen view, with the retrieved item information for the given item continuing to be displayed in the product-related display field. The operator is thereafter able to complete the weighing operation that had been initiated.

Figure 19:
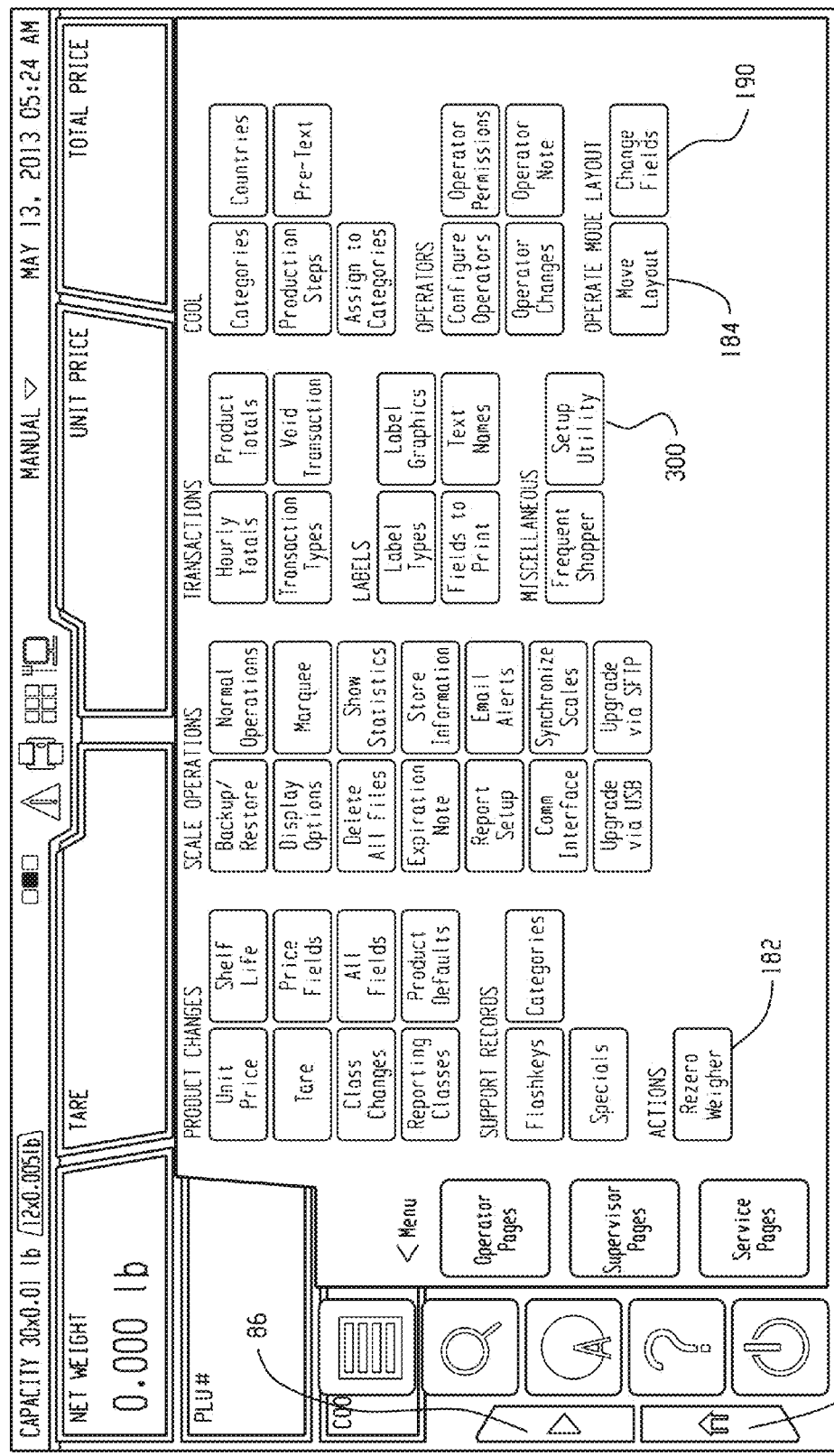
FIG. 19 shows a screen view with a supervisor functions pop-up window showing all available functions.

In order to facilitate ease of operator use, one or more of the screen views may be adjustable according to, for example, store preference or operator preference. In this regard, and referring to the item weigh primary interface screen views shown in FIGS. 7 and 8, the scale controller may be configured to enable straightforward and simple screen view format adjustment. By way of example, in FIGS. 7 and 8 the keypad area 92 is located in the lower right quadrant or corner of the screen view. As shown in FIG. 13, selection of the menu button/icon generates a pop-up window 140 initially displaying operator pages, but including a supervisor pages button 154 that can be selected to access different functions per FIG. 14. This window displays only the most used supervisor functions, but additional functions can be accessed by selecting the all functions button/icon 180 in the bottom right corner of the pop-up window, which selection generates a larger pop-up window display 182 as shown in FIG. 19. Among the various options available is a Move Layout button/icon 184.

Figure 20:
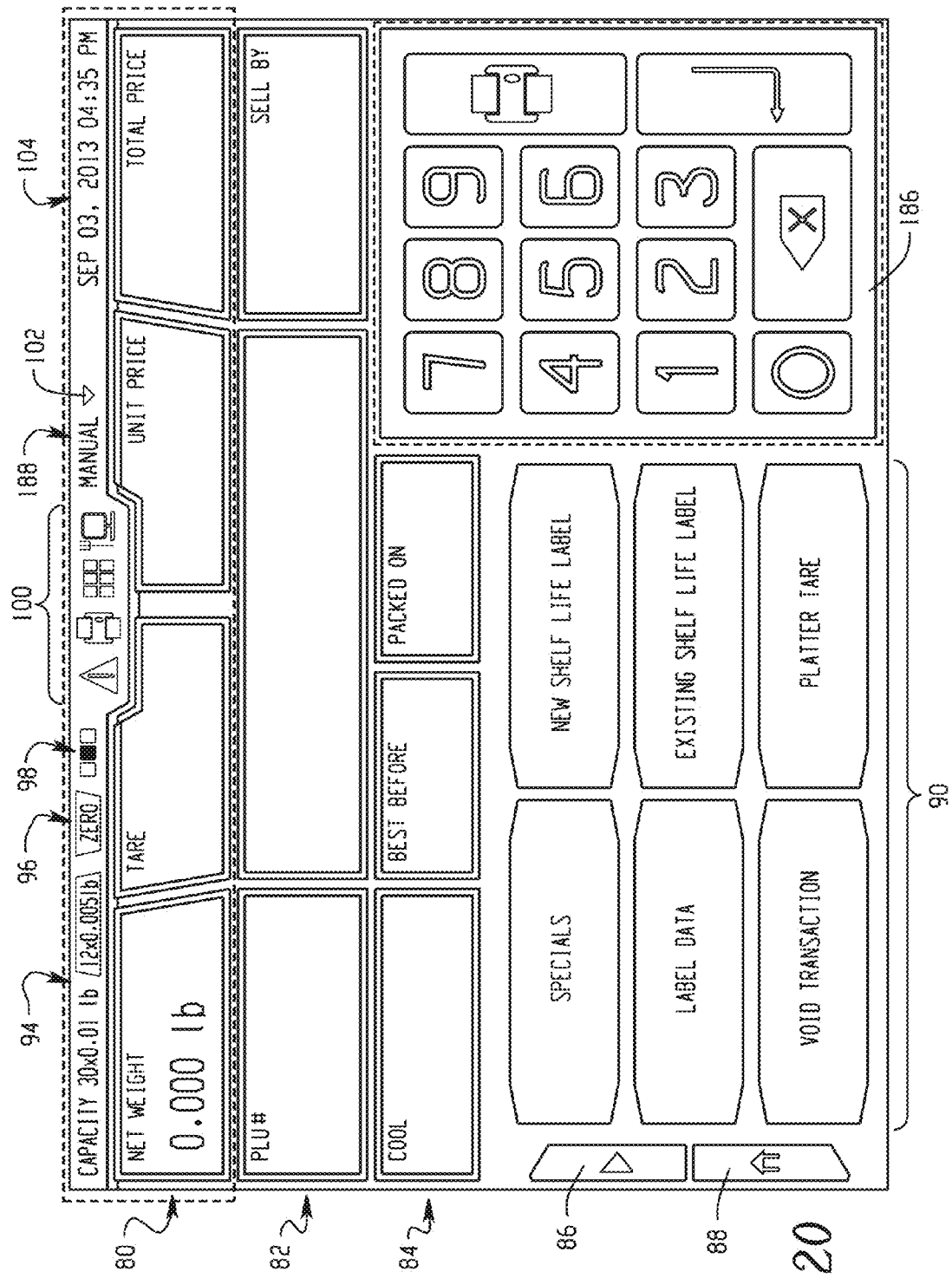
FIG. 20 shows a primary interface screen view with groups of icons and fields activated to enable movement of the groups.

Selection of the Move Layout button/icon 184 causes the display of the layout adjustment screen view shown in FIG. 20. As shown, two groups of buttons, keys and/or fields 186, 188 are shown with a defined outline (e.g., a surrounding yellow box) or other set-off indicator to alert the supervisor that these two parts of the screen view can be moved. The supervisor can select either grouping and simply drag the grouping in order to move its position on the screen view.

Figure 21:
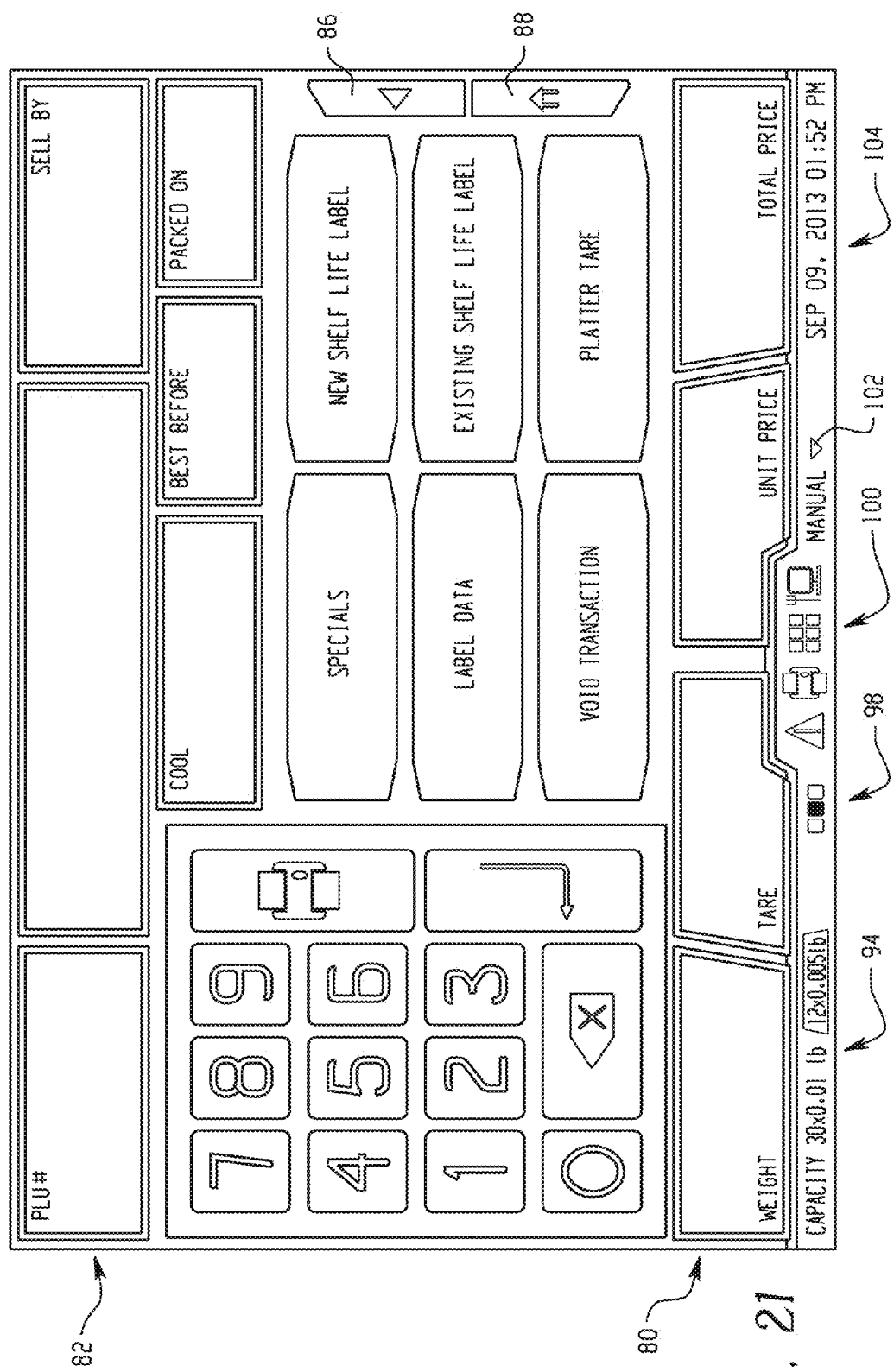
FIG. 21 shows a screen view with the two groupings of FIG. 20 moved.

In particular, by selecting the keypad grouping 186 and dragging it to the left side of the screen view, the position of the keypad grouping 186 will snap to a new position at the left side of the screen view and at the same time the product tracking information line 84, menu 86 and home 88 buttons and the dynamic content area 90 will automatically shift to the right. By selecting grouping 188, which includes the metrology bar 80, capacity string 94, zero indicator 96, screen view location indicator 98, alert indicator section 100, mode selection 102 and date 104, and dragging the grouping 188 toward the bottom of the screen view, the grouping will snap to a new position along the bottom of the screen view, but with the relative vertical positioning of the metrology bar 80 and the other parts of the grouping reversed (i.e., the metrology bar above the capacity string 94, zero indicator 96, screen view location indicator 98, alert indicator section 100, mode selection 102 and date 104). At the same time the other parts of the screen view will be automatically shifted upwards slightly. The result of both layout adjustments is reflected in the screen view shown in FIG. 21. When the supervisor is done, in order to exit the layout adjustment screen, the supervisor simply triggers the home button. Triggering of the home button saves any changes made. Generally, tapping off screen will return close any pop-up or other adjustment window without saving changes that have been made.

Thus, the scale controller is configured to enable adjustment of the item weigh primary interface screen view by dragging and dropping at least one grouping of displayed fields and/or icons in order to shift the grouping from one location on the item weigh primary interface screen view to another location on the item weigh primary interface screen view. The controller is also configured to effect automated adjustment of locations of other parts of the item weigh primary interface screen view to accommodate the shift of the grouping.

As mentioned above, a snap to location feature is used in connection with the drag and drop of the groupings 186, 188, meaning that the groupings cannot be moved to any desired location on the screen view. Instead, the scale controller is configured such that the locations at which the groupings can be moved are predefined locations. In the case of the grouping 188, in the illustrated embodiment the locations are either a top of screen view location and or a bottom of screen view location. In the case of the grouping 186, the locations are either a right side of screen view location or a left side of screen view location. As reflected in FIG. 21, the shifting of the grouping 188 from the top of screen view location to the bottom of screen view location will also automatically result in a slight movement of the keypad grouping 186. However, each grouping is movable independently of the other.

With respect to the keypad grouping 186, adjustment as between left and right side of screen view locations, it is noted that such adjustment is particularly useful to accommodate both left-handed and right-handed operators. That is, left-handed operators may typically prefer the keypad grouping 186 to be on the left side of the screen view and right-handed operators may typically prefer the keypad grouping 188 to be on the right side of screen view.

As noted above, in the described embodiment the controller is configured to enable adjustment of the position of each grouping via a drag and drop operation by setting each group as an active field group enabling the drag and drop. However, other variations are possible, such as display of a toggle button for each grouping (e.g., a left/right toggle for grouping 186 and a top/bottom toggle for grouping 188). Moreover, while the adjustment function is described as a supervising operator function, it is recognized that in some embodiments it could also be implemented as a non-supervisor type operator function. When all layout adjustment operations are complete, pressing the home button 88 will exit the adjustment screen view of FIG. 20.

Figure 22:
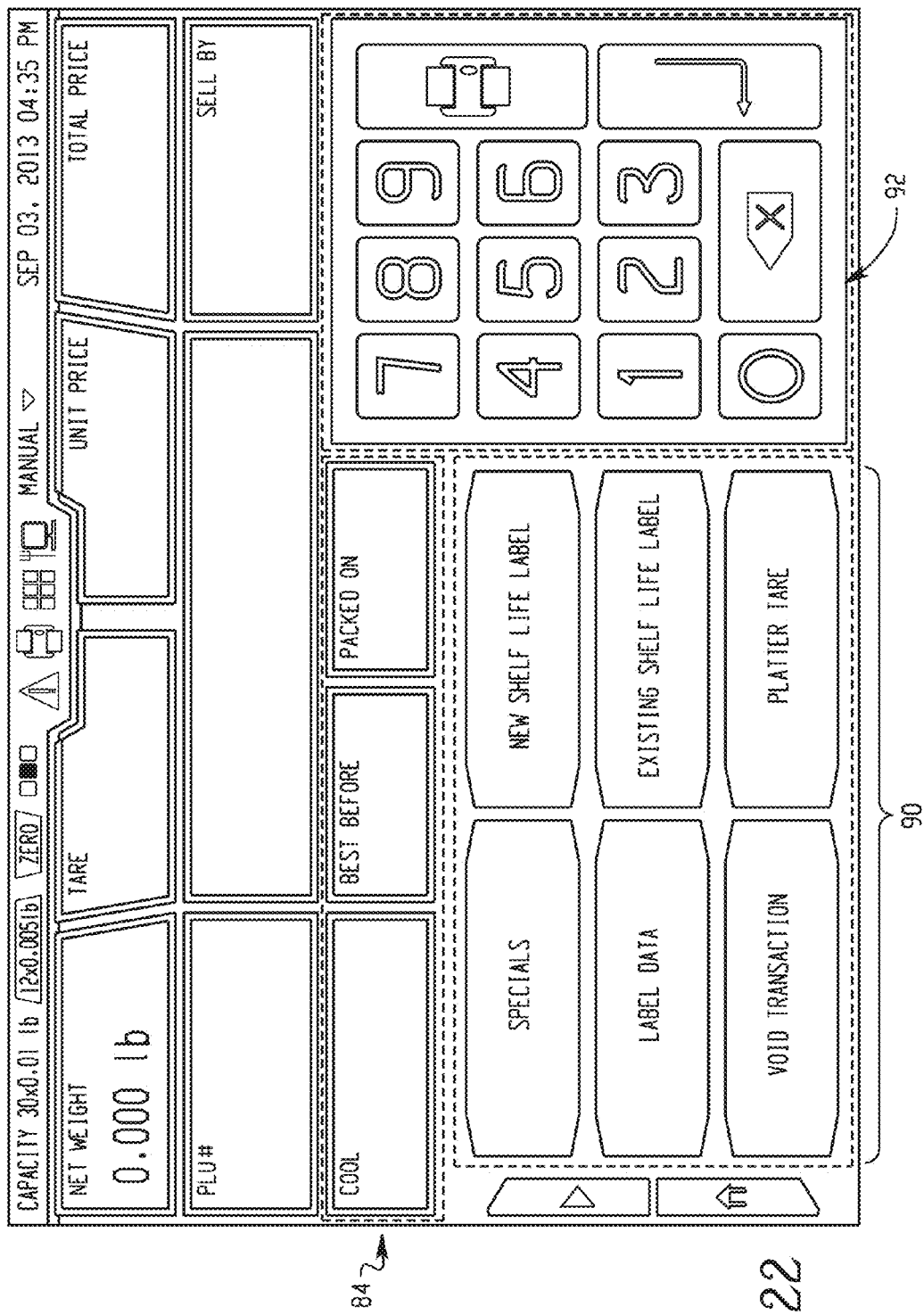
FIG. 22 shows a screen view with certain dynamic content fields activated.
Figure 23:
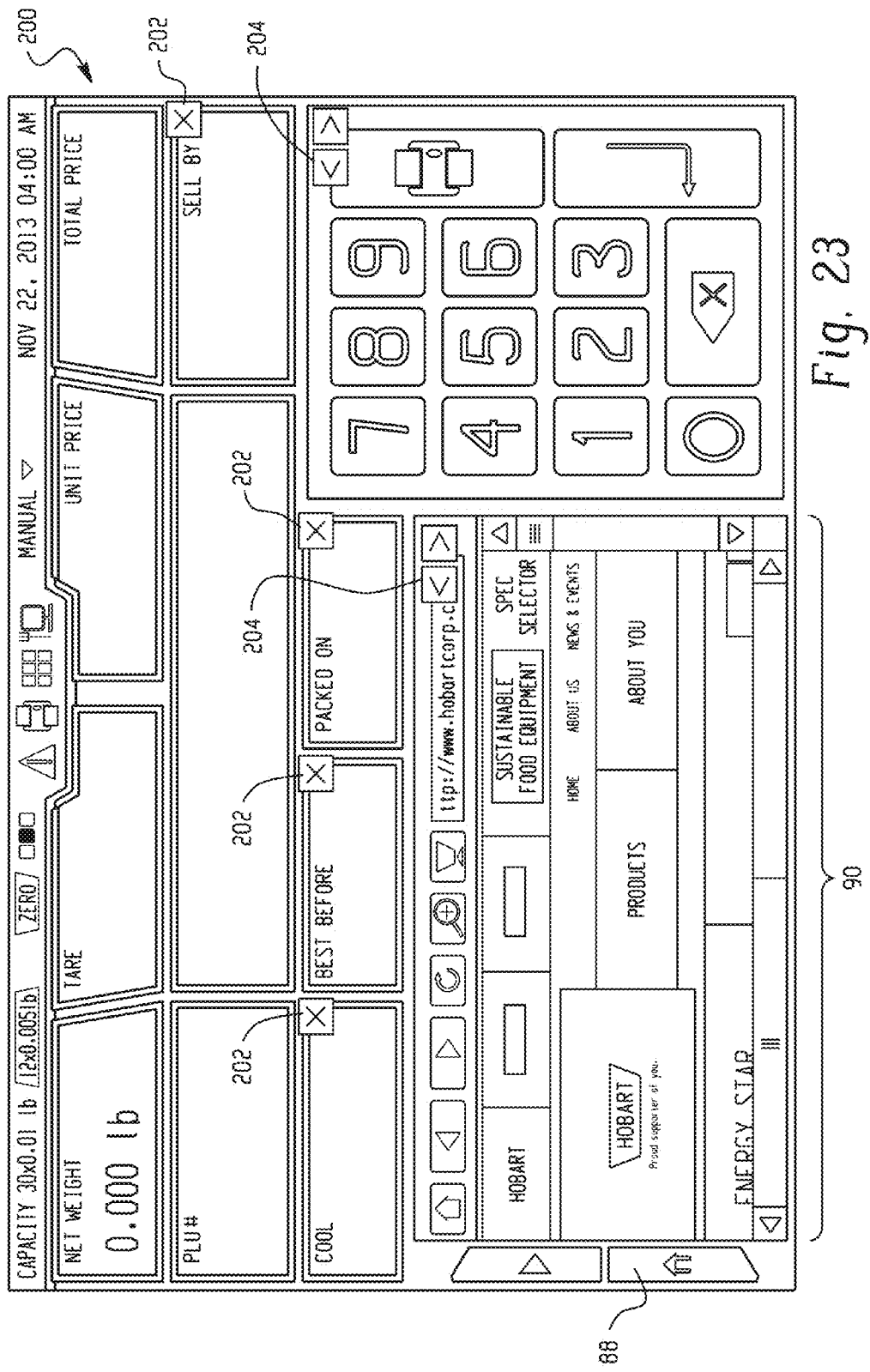
FIG. 23 shows an adjustment screen view for the dynamic content fields.
Figure 24:
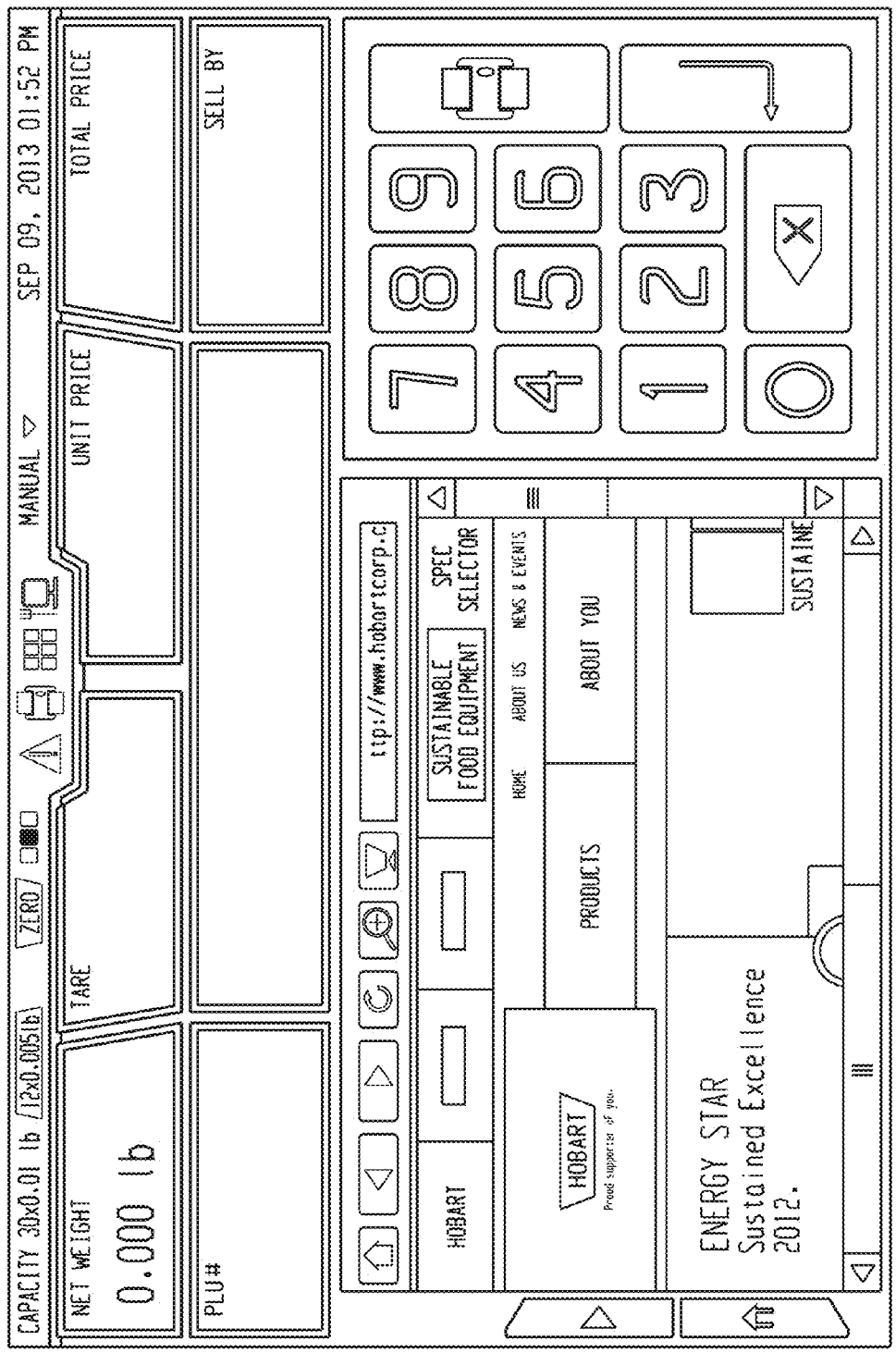
FIG. 24 shows a modified version of the interface screen view of FIG. 23 with one dynamic content area expanded to fill space left available by closure of other dynamic content fields.

As noted above, certain areas of the screen view may be dynamic content areas. In particular, and referring to the item weigh interface screen view as shown in FIG. 22, dynamic content area 90 includes a set of flash keys, but the content of such area can be adjusted. Moreover, the keypad area 92 and the product tracking information line 84 can also be considered dynamic in that such areas can either be eliminated or content display modified. By way of example, and referring to FIG. 19, where the supervisor selects the Change Fields button/icon 190, the scale controller effects display of the adjustment interface screen view 200 of FIG. 23. The dynamic content area 90 will display whatever content is currently set for the area, which in this case is a web browser interface. Fields that that have a square box 202 in the upper right hand corner can be hidden by simply pressing inside the box where an "x" appears. In this case, the Sell By, COOL, Best Before and Packed On fields can all be hidden. Notably, the fields can each be individually and selectively hidden on a case by case basis (i.e., the fields are not an all or nothing). If each of the COOL, Best Before, and Packed On fields are hidden, the scale controller auto adjusts the dynamic content area 90 to be larger so as to fill the space previously taken up by the now hidden fields, as shown in FIG. 24. Thus, the scale controller is configured to effect automatic adjustment of a display size of one dynamic content area to fill the space previously taken by another dynamic content area that becomes hidden or removed from the screen view. If only one or two of the three fields is hidden, then the dynamic content area 90 remains at the smaller size. Thus, in the illustrated example, all of the display fields immediately above dynamic content area 90 must be hidden or turned off in order for the scale controller to effect adjustment of the display size of dynamic content area 90.

Returning to FIG. 23, areas that have customizable options have the toggle arrows 204 in the upper right hand corner. Pressing an arrow will move the supervisor through whatever the available display options for that specific area (e.g., web browser, flashkeys or best seller keys for dynamic content area). By way of example, in FIG. 24 the dynamic content area 90 displays a web browser page and a keypad is displayed alongside the web browser page, whereas in FIG. 25 the dynamic content area 90 displays function flash keys and a set of item best seller flash keys is displayed alongside the function flash keys. When content adjustments are completed in the adjustment screen view 200 of FIG. 23, pressing the home button 88 will exit the adjustment screen view and save the adjustments.

Figure 25:
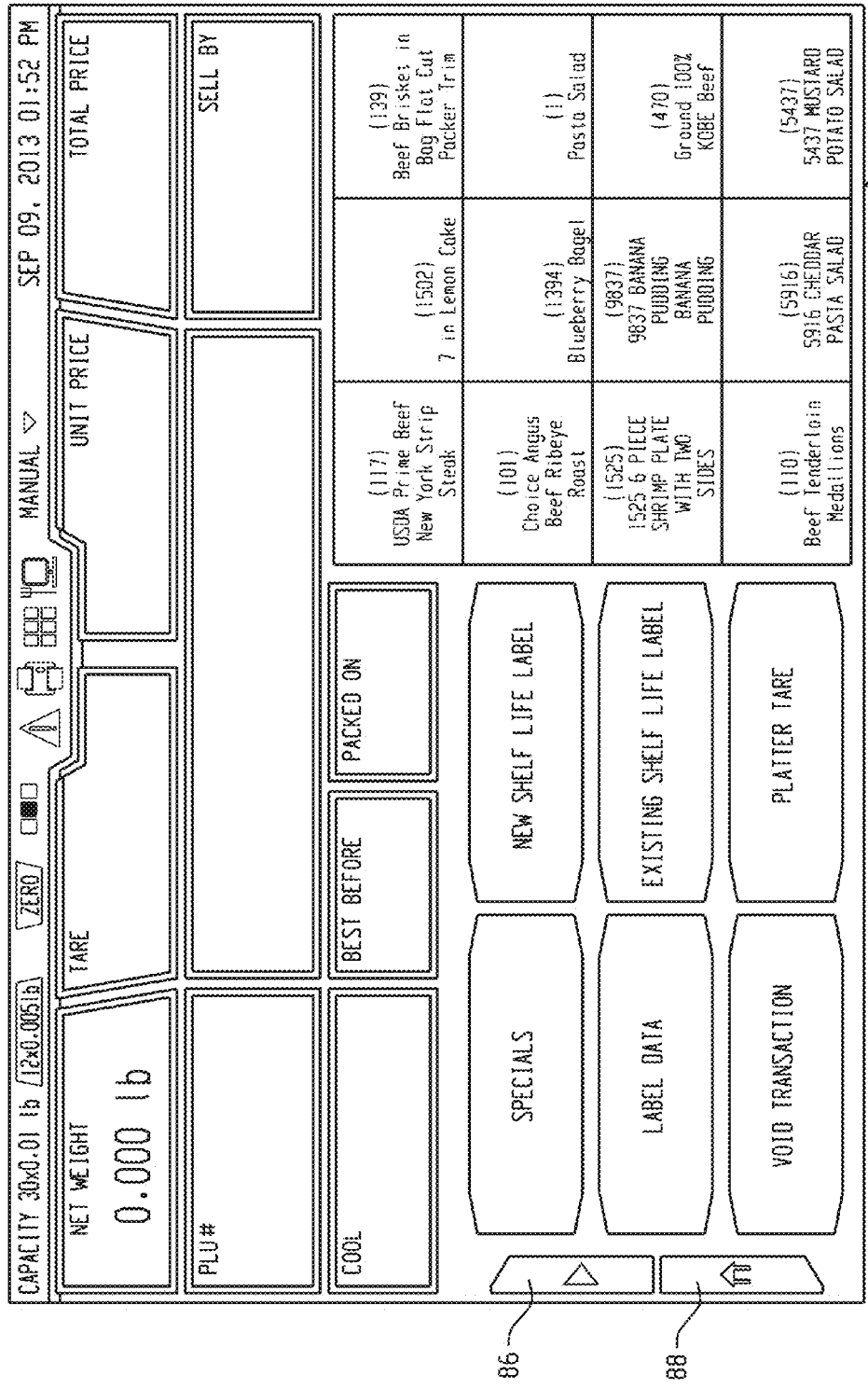
FIG. 25 shows a screen view with the keypad replaced by flashkeys.

In an arrangement such as that shown in FIG. 25 with best seller flash keys displayed instead of the keypad, when an operator activates a field (e.g., such the PLU field), the scale controller automatically displays the keypad instead of the best seller flash keys to allow an operator to enter a PLU number. When used in prepack mode, this same area 292 may display, for example, run totals for the prepack operation.

Figure 26:
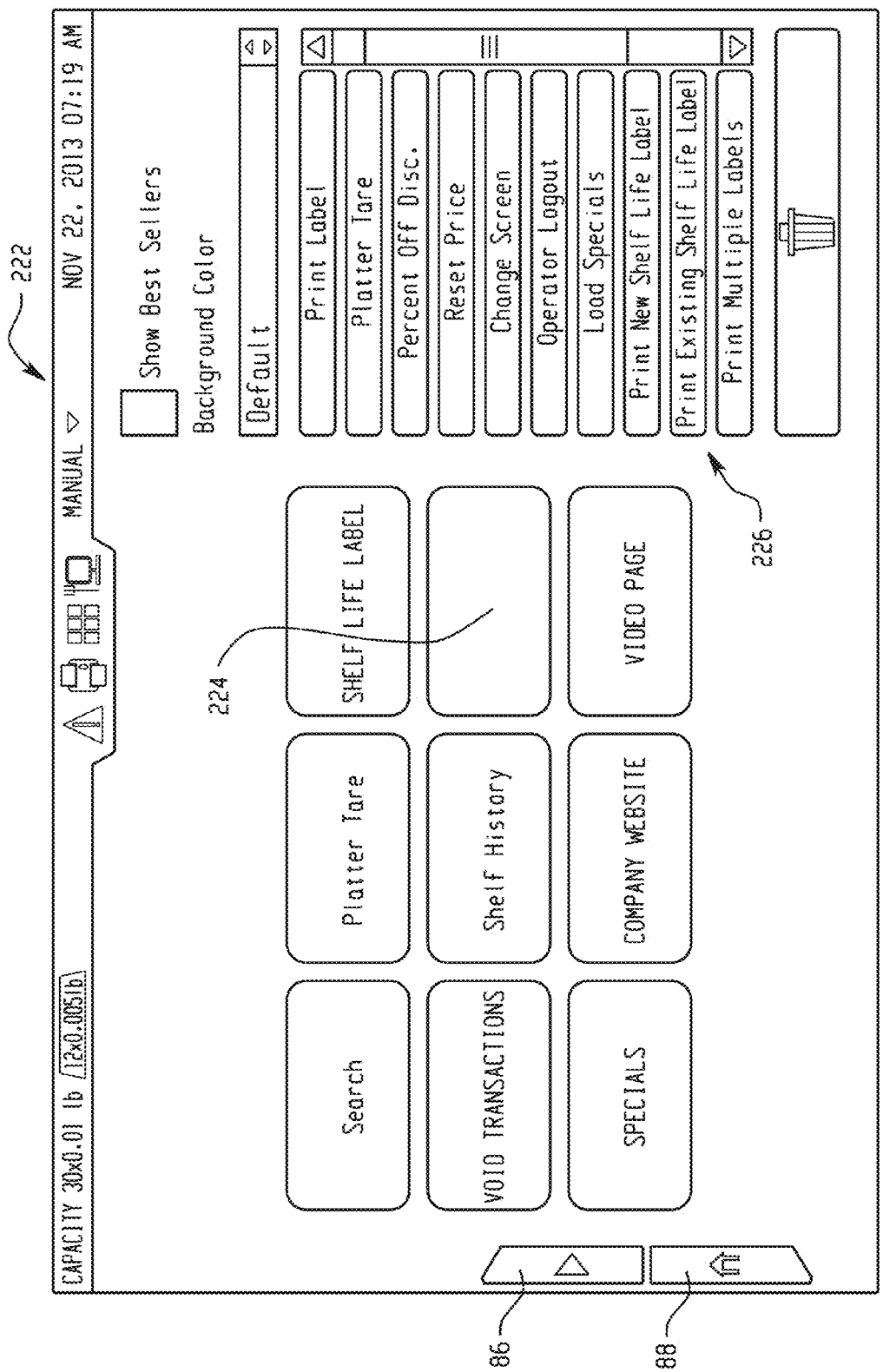
FIGS. 26-29 show exemplary screen views that enable flashkey setup.

With respect to flash keys, a variety of different options exist, and the scale controller enables operator adjustment of the specific flash keys that are displayed. In this regard, referring to FIG. 13, after pressing the menu button 86 the operator can select the Flashkey Editor button/icon 220, in which case the screen view 222 shown in FIG. 26 will be presented. Screen view 222 presents existing flashkeys and available spaces at 224, which are associated with the dynamic content area 90 (the number of flashkeys and the grid layout is configured in the Supervisor Mode), and presents available flashkey options at 226. Numerous flashkey options may exist, such as any of the following: (1) Select Product/Specific PLU—This function will load the information for the PLU assigned to this flashkey; (2) Load Softkey Group—Takes the operator to another set of flashkeys; (3) Load Category—Takes the operator to another set of flashkeys containing subcategories and items that have been assigned to the specified category; (4) Print Label—A label will print if a product is entered and weighed; (5) Platter Tare—Allows the operator to adjust the platter tare; (6) Percent Off Discount—allows the operator to apply Percent Off Discounts; (7) Reset Price—Allows the operator to reset the price of a product to its original value; (8) Home Panel—Takes the operator to the Configured Home Panel; (9) Search—Takes the operator to Search Screen; (10) Operator Login—This will login the operator; (11) Show Expanded Text—Displays the expanded text field on the operator screen; (12) Show Expanded Text 2—Displays the expanded text 2 field on the operator screen; (13) Show Recipe—Displays the recipe field on the operator screen; (14) Show Cooking Instructions—Displays the cooking instructions field on the operator screen; (15) Show Suggestive Sell—Displays the suggestive selling field on the operator screen; (16) Show Allergens—Displays the Allergens field on the operator screen; (17) Label Data—Takes the operator to the Label Data Screen; (18) Product & Shelf Life—Takes the operator to the Product and Shelf Life Screen; (19) Printer Settings—Takes the operator to the Printer Settings Window; (20) Total Types—Takes the operator to the Total Types Window; (21) Expiration History—Takes the operator to the Expiration Label Window; (22) COOL—Takes the operator to the Create COOL Window; (23) Void Transaction—Takes the operator to the Void Transaction Window; (24) Preset Tares—Enters a preset tare value into the tare field; (25) Browse Web—Takes the operator to the default internet web address, if available; (26) Operator logout—This will logout the current operator and set the scale for the next operator to login; (27) Load Specials—Takes the operator to another set of flashkeys sorted by specials; (28) Store Applications—Enter Applications URL, ability to include CGI parameters; (29) Production Planning—PP URL, ability to include CGI parameters; (30) Print New Shelf Life Label—Prints a new shelf life label for the active PLU; (31) Print Multiple Labels—Allows scale to print multiple labels for active PLU; (32) Change Language—Enables screen to toggle from primary language to secondary language; (33) Print Existing Shelf Life Label—Prints an existing shelf life label for the active PLU; (34) Load Best Sellers—shows the best selling products based upon historical data; and (35) Show Accumulate Items—displays the list of accumulated items on operator screen.

Figure 27:
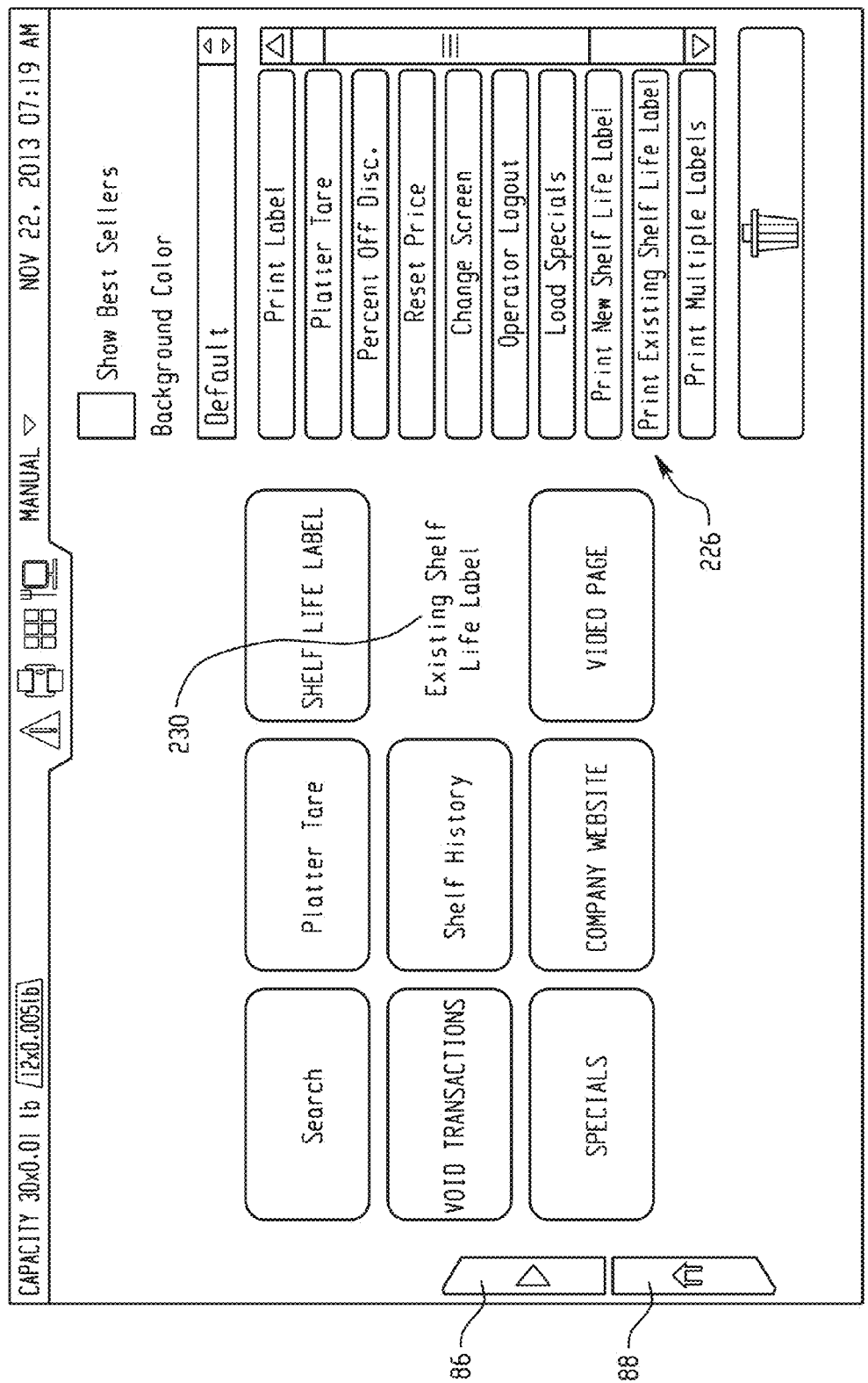
Figure 28:
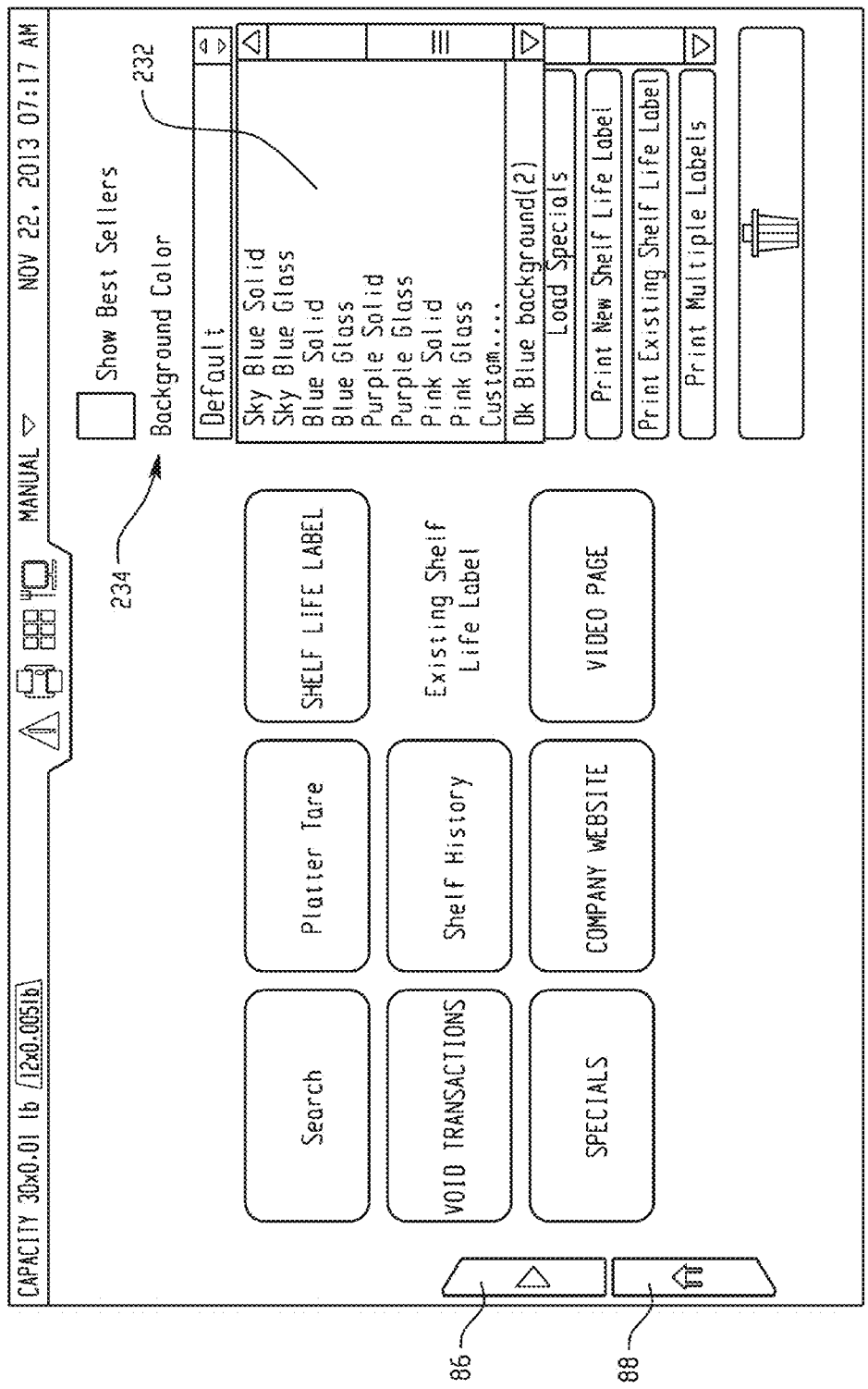

The operator can select from the pre-determined flashkey list 226, touch the desired flashkey and drag it to an open key space 224 on the grid, as reflected in FIG. 27 where the Existing Shelf Life Label flashkey 230 has been added. The key color background can then be set using the drop down menu 232 under the Background Color designation 234 as shown in FIG. 28. Once the desired flashkeys have been set, the operator presses the home button 88 and the adjusted flashkey grid will be applied to the dynamic content area 90 of the item weigh primary interface screen view.

Figure 29:
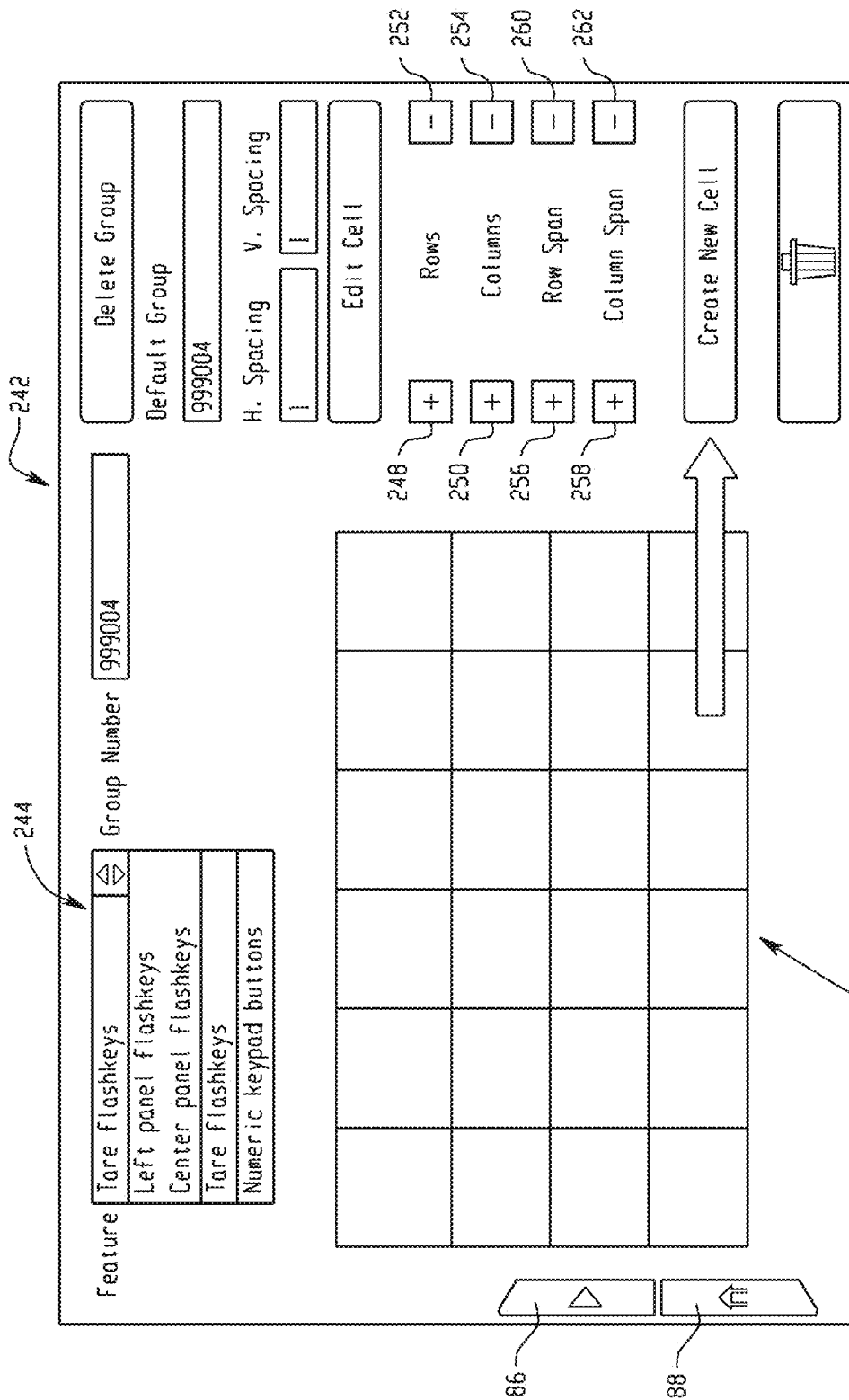

Referring again to FIG. 14, a supervising operator can also make certain flashkey adjustment by selecting the Flashkeys button/icon 240. Because such an adjustment is considered a common supervisor task, the button/icon 240 is made available on the opening pop-up window 140, without requiring the supervisor to press the All Functions button/icon 180. Triggering the Flashkeys button/icon results in display of the flashkey set-up screen view 242 shown in FIG. 29. The Feature drop down menu 244 enables selection one of multiple groupings of flashkeys to be configured (e.g., the flashkeys for the primary interface screen view 70B, the flashkeys for the dynamic content area 90 of the primary interface screen view 70A, the flashkeys associated with the tare field of the primary interface screen view 70A (i.e., flashkeys that show up in the dynamic content area when the Tare field 80B is selected) or the flashkeys that fill the keypad area of the primary interface screen view 70A when the keypad is hidden). Depending upon which grouping is selected, the displayed grid 246 will auto-adjust to the amount of space available for that grouping. Adjustment of the number of rows or columns of flashkeys is achieved by selection of the appropriate row or column plus buttons 248, 250 and minus buttons 252, 254. If there is a desire that a specific flashkey take up more space horizontally or vertically, selection of the appropriate row span or column span plus buttons 256, 258 or minus buttons 260, 262. For example, to make a specific flashkey horizontally take the space of two cells, the row span plus button 256 would be triggered. Once the grid is set up as desired, the supervisor selects the Create New Cell button 264, which causes the flashkey list to be displayed. Desired flashkeys can then be selected for drag and drop to the desired grid location.

Referring again to FIG. 13, a convenient process for changing the display language of the scale is described. In particular, pressing the menu button/icon 86 brings up the pop-window 140, which includes the language toggle button/icon 146. Selection of button/icon 146 causes the scale to immediately toggle to a default second language and return to the designate home screen. By way of example, the scale can be set up to toggle between English/Spanish or English/French. This process only requires the operator only to press two buttons to change the language. By contrast, in current scales, the operator must drill down 3-5 layers to change this setting. Notably, only the user interface portion of the screen view shifts languages, the data that has been uploaded to the scale and that may be displayed in certain fields or locations remains in whatever language it was uploaded. Also, in one implementation, the unit of measure and the language are not connected. For example, when changing to French, the measurement does not auto change to metric/kilograms.

Figure 30:
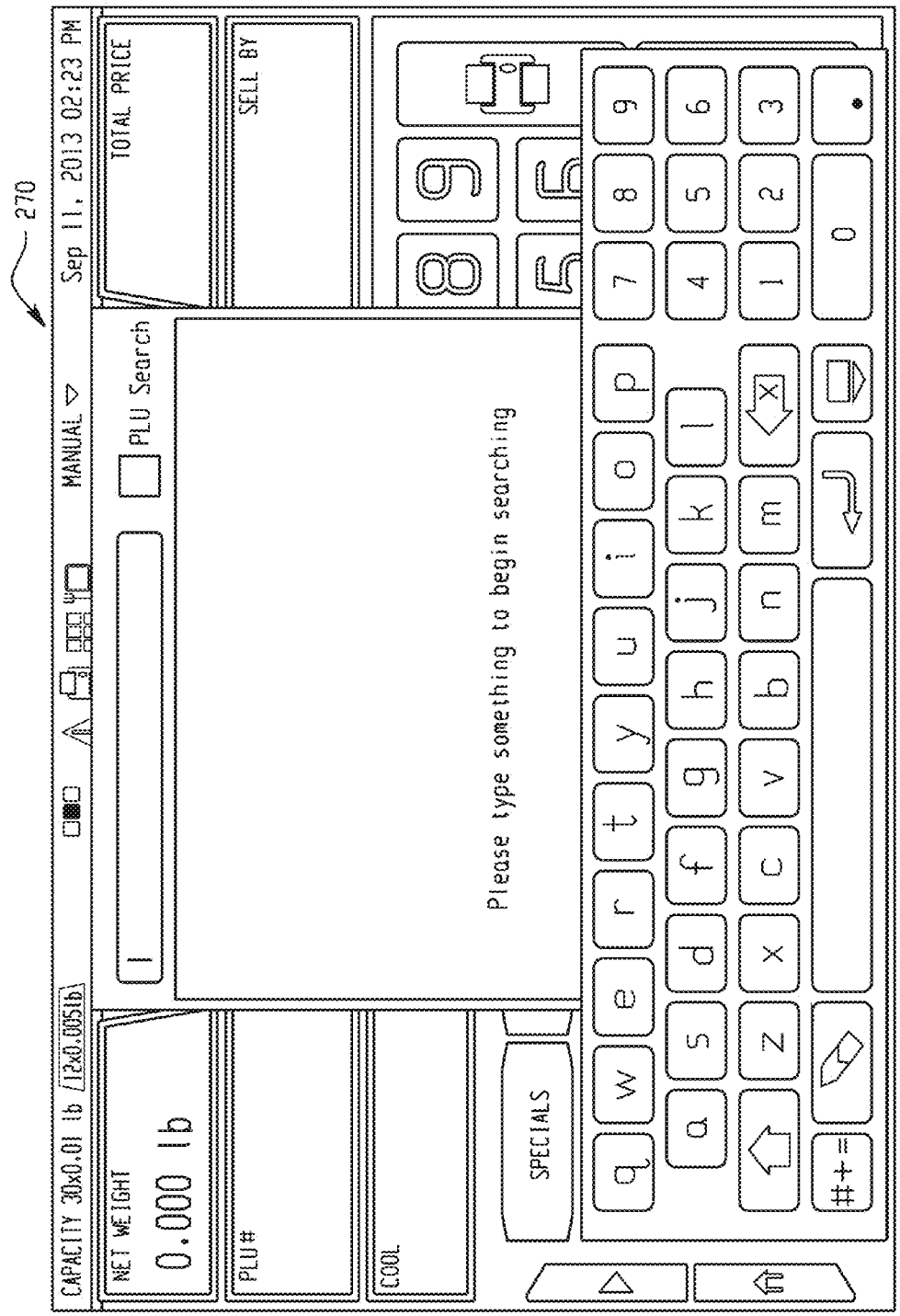
FIGS. 30-34 show exemplary screen views that enable an operator to perform a product search function.
Figure 31:
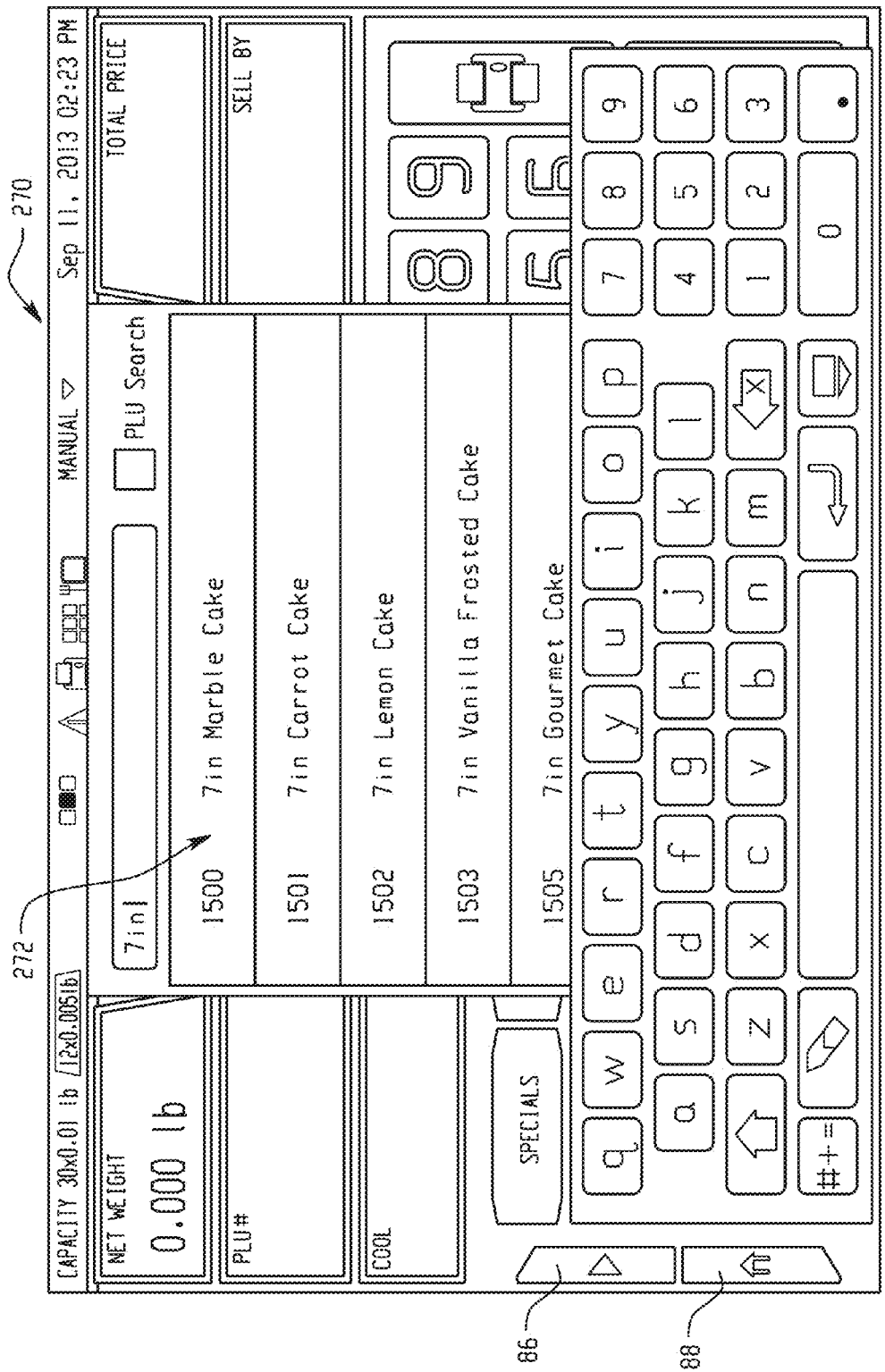
Figure 32:
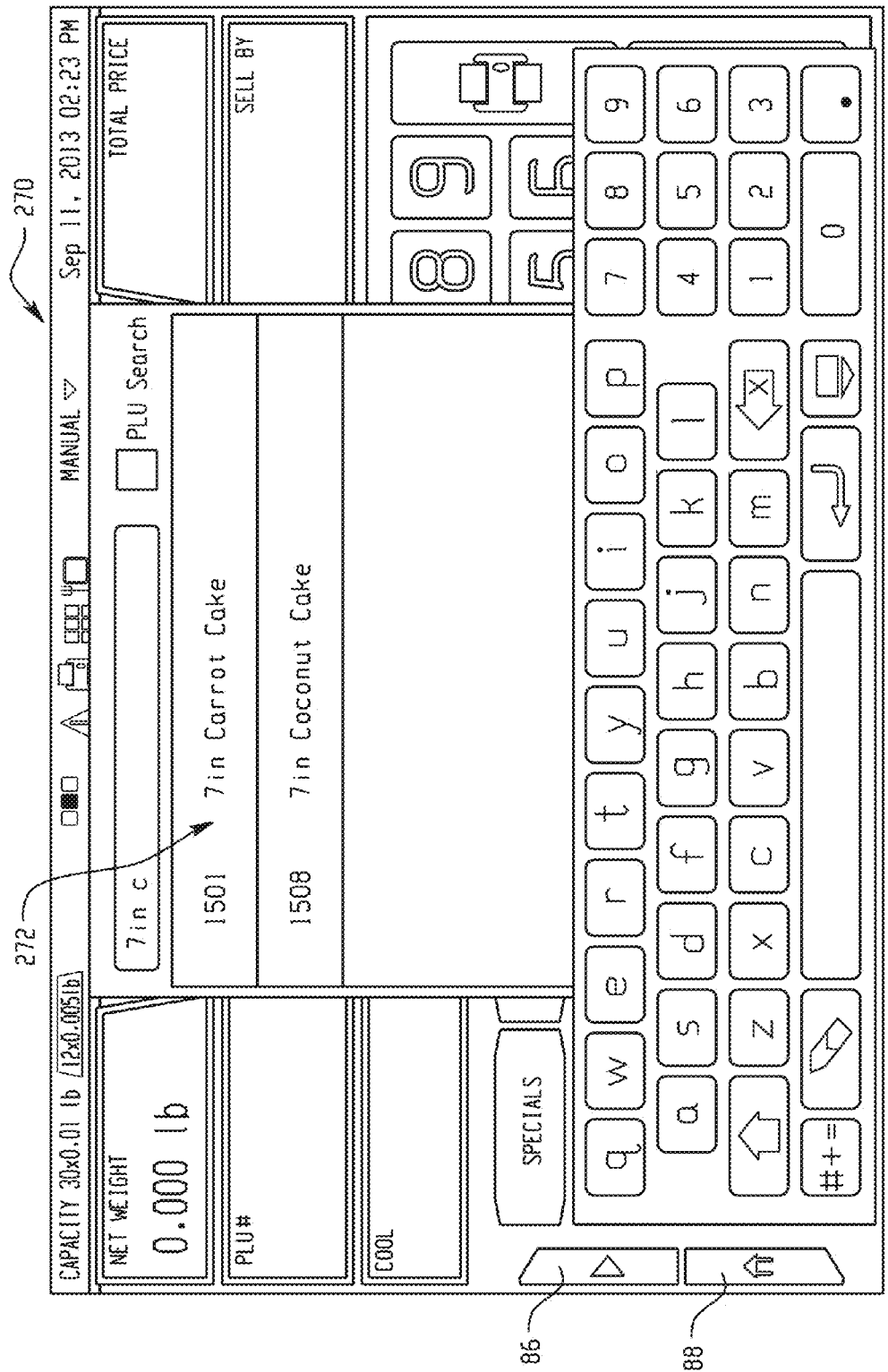
Figure 33:
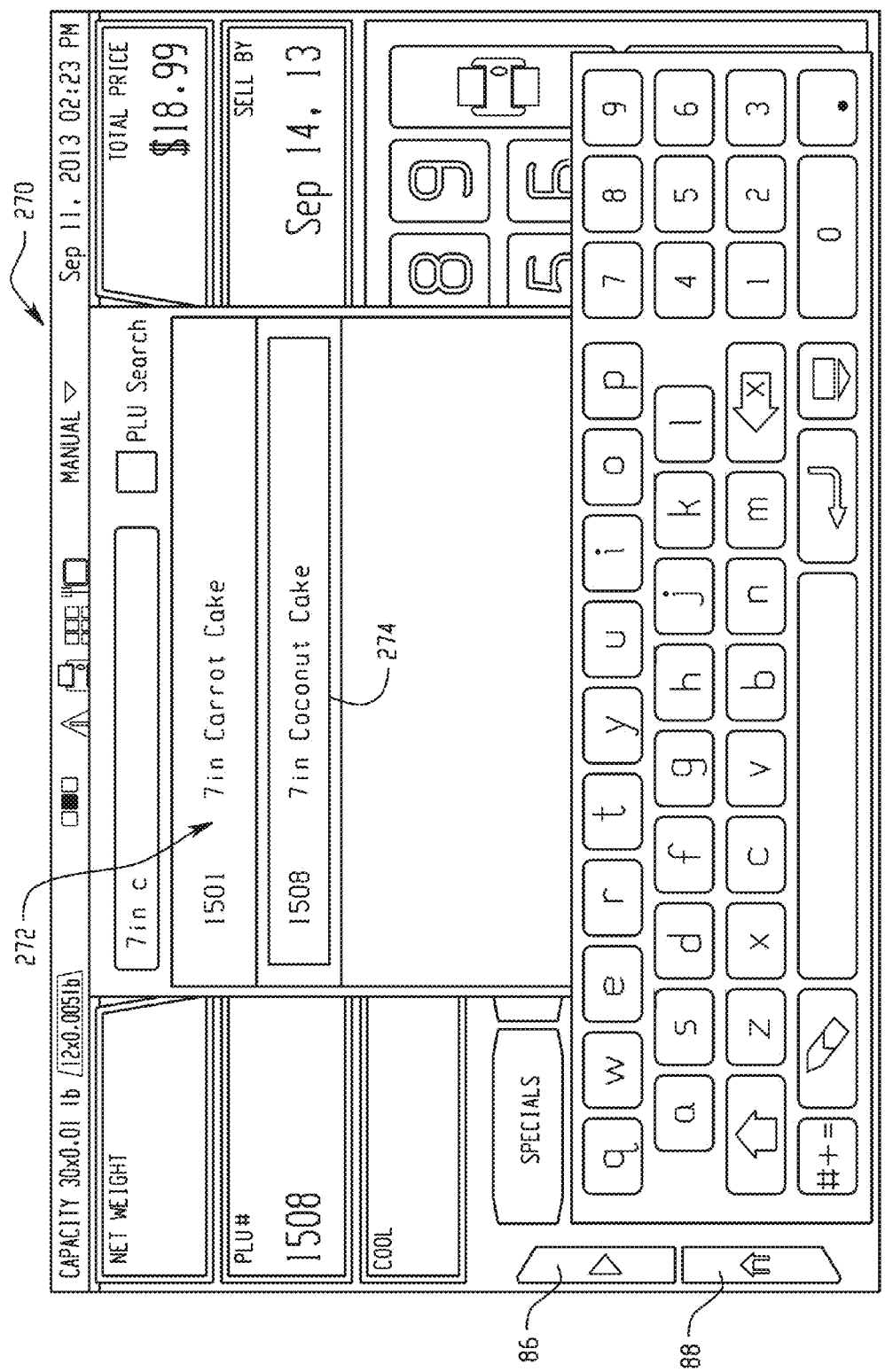
Figure 34:
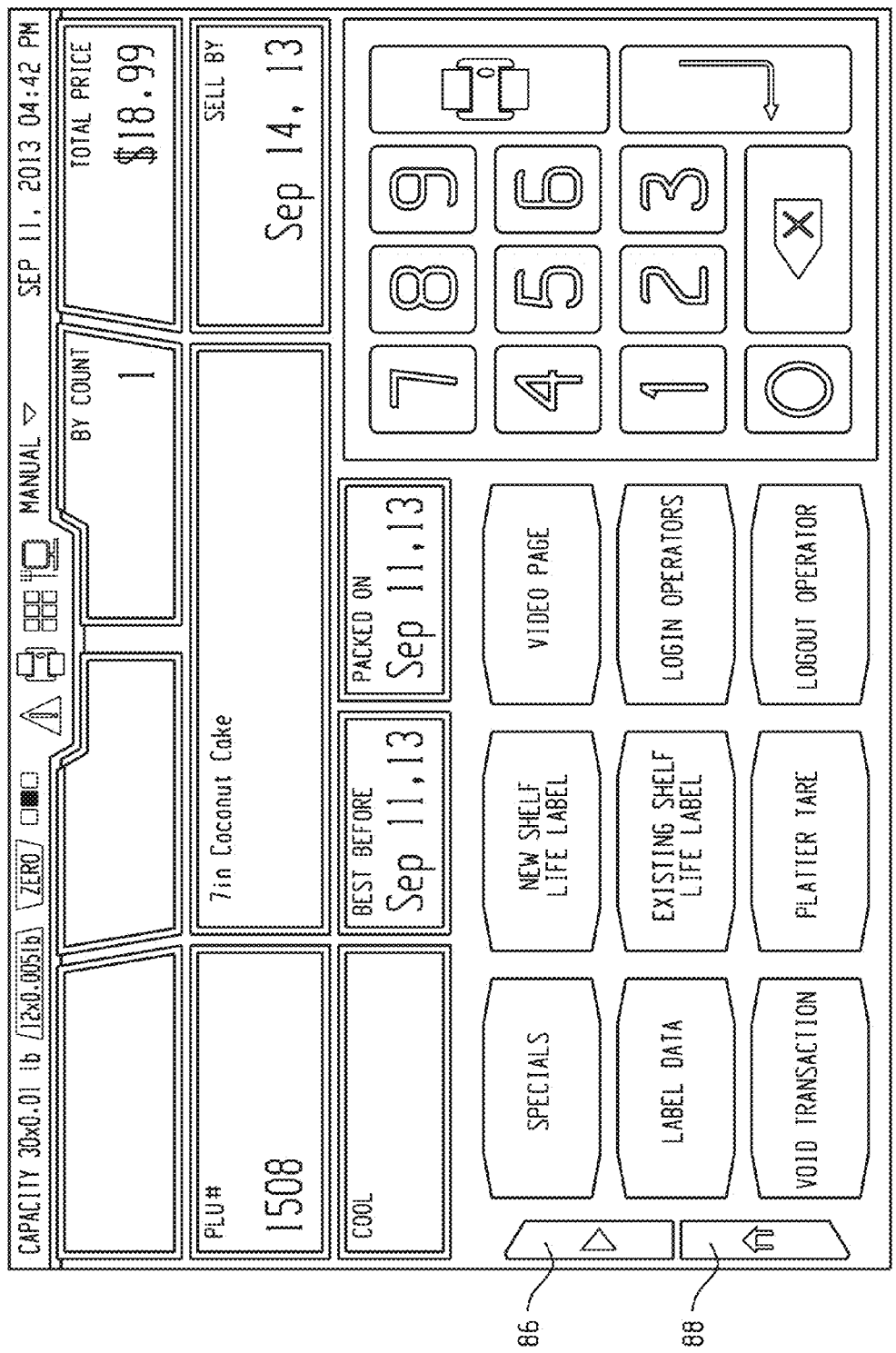

A search button/icon 144 is also included in the pop-up window 140 and can be used to carry out an item/PLU search. The length of time to complete a search is drastically reduced in the present scale (e.g., in prior scales from 60-90 seconds, while in the present scale within 2-5 seconds). An operator can search using letters, numbers or a combination of both, whereas in prior art scales they could only search on alpha or numeric, but not a combination. In the present scale the operator can enter as many letters/numbers as necessary. Upon selecting the search button/icon 144, the search screen view 270 shown in FIG. 30 is displayed. Notably, such search screen view is populated with a QWERTY keyboard to facilitate user typing of the search request. As the operator begins to type, a search list 272 is populated and continues to evolve as more characters are added, as suggested in FIGS. 31 and 32. As suggested in FIG. 33, the operator can select the desired item (e.g., item 274) when it appears in the list, which automatically loads PLU data into the item weigh primary interface screen view 70A and returns the display to such view as per FIG. 34.

As noted above, a touch-screen display may be used in connection with the scale, and it may be of the color-type to enhance the operator experience and functionality. Scale purchasers in the grocery and supermarket industry focus on ease of use, reliability and durability. As is the case with any touch-screen display, the life span of the display is limited. However, certain features may be implemented by the scale controller so as to extend the display life or, in other words, reduce the number of maintenance and/or warranty claims. By way of example, the scale controller may be configured to effect a normal brightness setting during operator interaction with the touch-sensitive display. After a set time period without interaction, the scale controller implements a dimmed brightness setting for the touch-sensitive display. The dimmed brightness setting effectively enhances the overall working life of the display. In order to achieve this desirable result without adversely impacting scale function, during the dimmed brightness setting, one or more selectable icons or fields on the touch-sensitive display remain live and ready for operator selection. As used herein an icon or field remaining "live" is intended to mean that the icon or field can be immediately triggered by contact with the screen in the vicinity of the icon or field. That is to say, unlike known screen dimming functions which require two touches for user interaction (i.e., one touch to "wake" the screen function and another touch to then select an icon or field on the screen), the scale implemented as described above enables immediate operator activity by a single touch, making the scale more straightforward for operator use.

In one implementation, during the dimmed brightness setting and upon operator selection of the selectable icon or field, the selection of the selectable icon or field is automatically captured and a transition to the normal brightness setting is automatically effected. Moreover, the controller may also be configured such that, during the dimmed brightness setting, and upon detection of item placement on the weighing station of the scale (e.g., as determined by an output change of a load cell associated with the weighing station), a transition to the normal brightness setting is automatically effected.

Multiple stages of dimmed brightness may be implemented by the scale controller. For example, a first dimmed brightness setting (e.g., 60% of normal) may be initiated after a first set time period without scale interaction (e.g., 2 minutes). A second dimmed brightness setting (e.g., 40% of normal or other value less bright than the first setting) may be implemented after a second set time period without any scale interaction (e.g., 4 minutes or other time period longer than the first time period). In another example, the scale controller may be configured to effect a multi-tier dimming operation that includes transition to a dimmed brightness setting after a set time period and shut down of the display after a further time period, where upon shutdown of the display no selectable icons are active.

Notably, the scale may enable adjustment, via the operator interface, of one or more of the normal brightness setting, the dimmed brightness setting or the set time periods. In particular, and referring again to FIG. 19, in the supervisor menu the supervising operator selects the Setup utility button 300, which produces the adjustment screen view 302 shown in FIG. 35. The brightness of both the customer display and the operator display can be adjusted by selecting the appropriate button 304 or 306, and then using the up down arrows 308, 310 to define the percent of max brightness. These adjustments set the brightness level for normal operation, but not the amount of dimming. In one example, the dimming level may be predefined to trigger off of the normal brightness setting. For example, if the normal brightness is set to 90% of maximum brightness, and the predefined dimming level is 60% of normal, then the predefined dimming level will be 54% of the maximum brightness. In another example, the dimming level may be predefined to trigger off of the max brightness, regardless of the normal setting. For example, the predefined dimming level may be 60% of max, regardless of where the normal brightness setting is established. In an alternative embodiment, the dimming level could also be adjusted by the supervising operator in a similar manner. Notably, a lower limit on the normal brightness adjustment may be set in order to assure that the interface can be viewed sufficiently to allow interaction and control of the scale (i.e., so that the operator does not lose the ability to interact with the scale through the touch-screen display).

Figure 36:
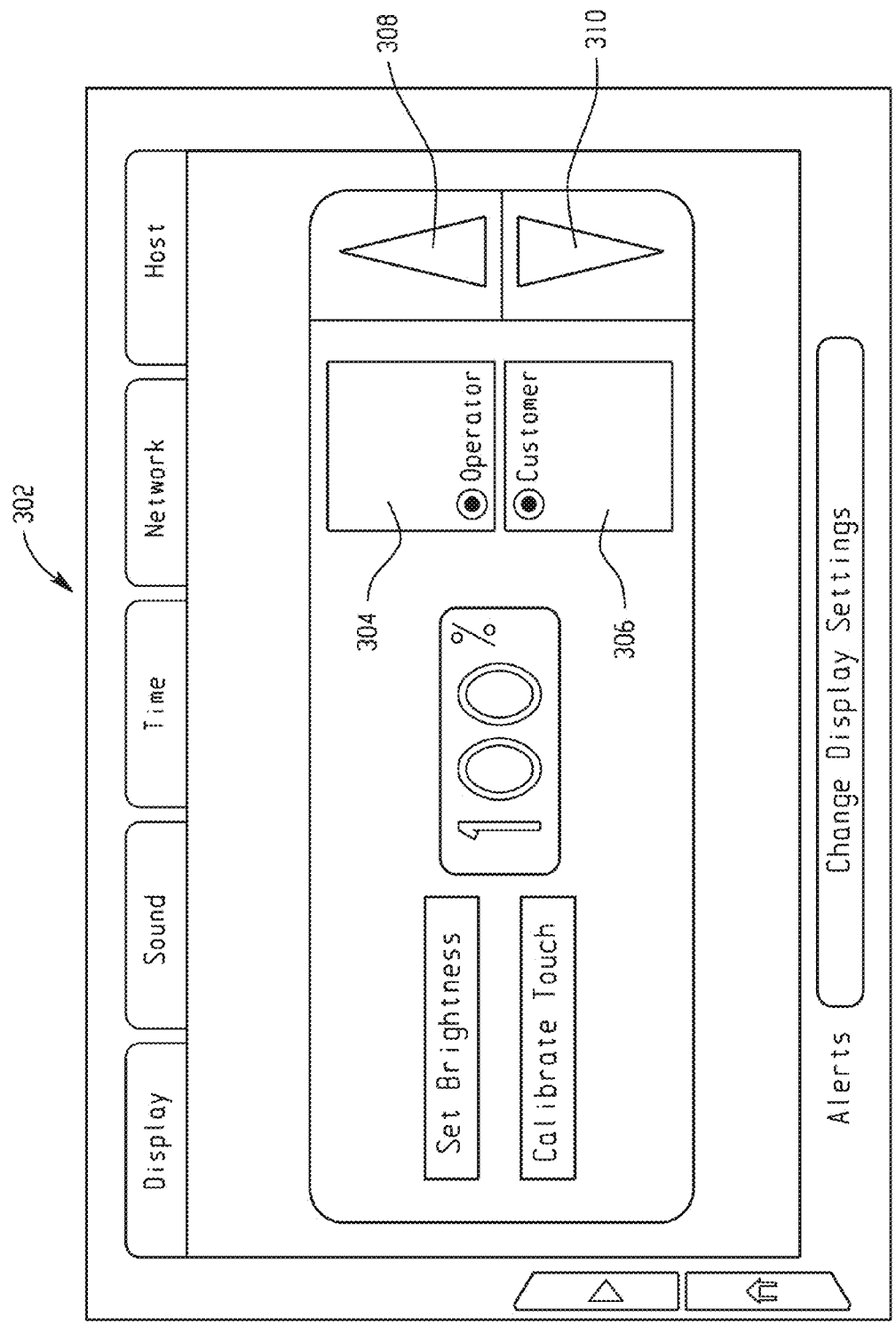
Figure 36:
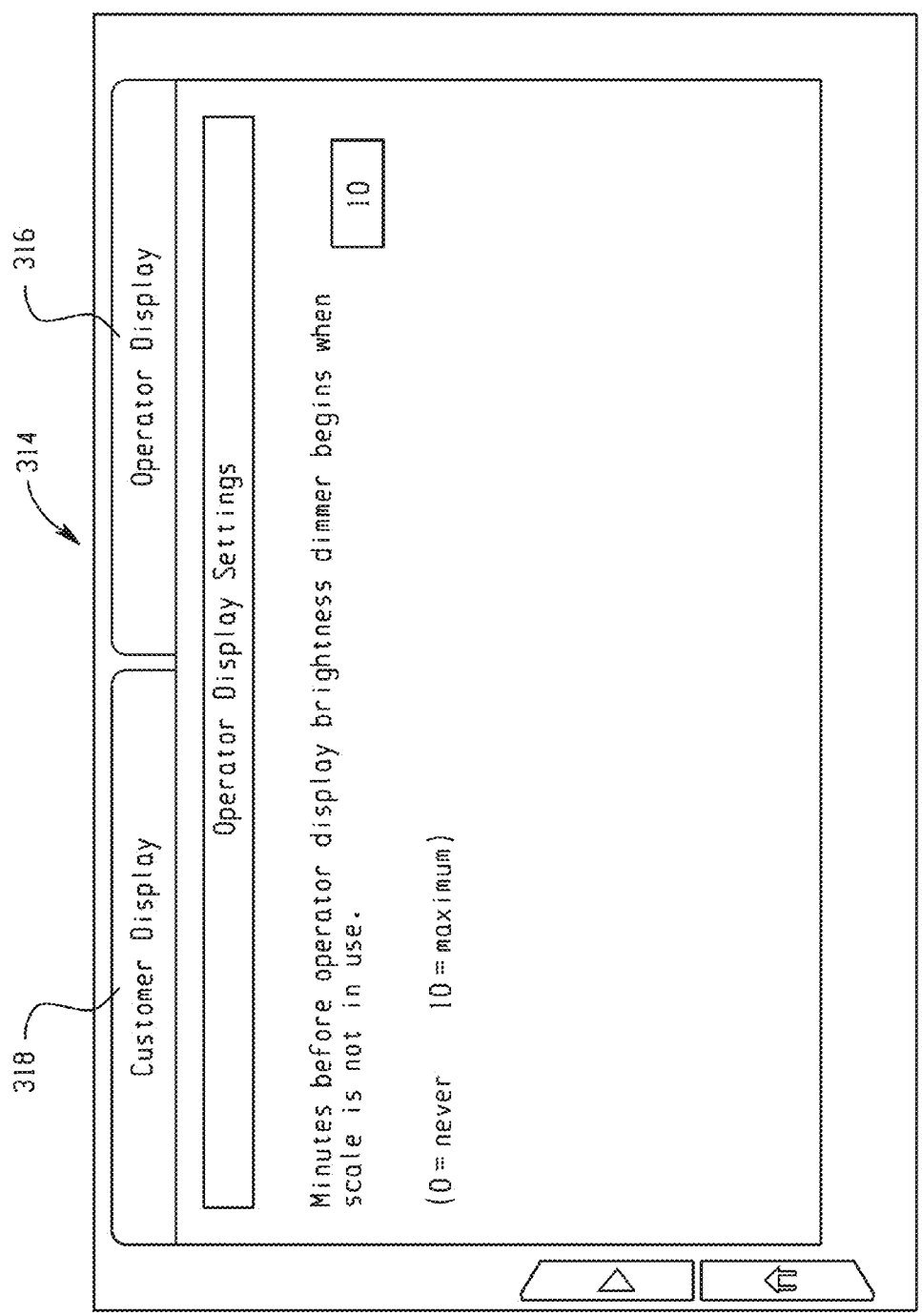

Referring now to FIG. 14, by selecting the Display Options button/icon 312, the supervising operator will be presented with the adjustment screen view 314 shown in FIG. 36. By selecting the Operator Display option 316, the supervising operator can then enter the number of minutes of non-use of the scale (e.g., minutes without a weight output and/or minutes without a touch-screen interaction) that will cause the dimming operation to be implemented.

Thus, the scale is configured to enable a unique method of operation that involves utilizing a first brightness (e.g., a normal brightness) setting for operation of the touch-sensitive display (e.g., during normal operator interaction with the scale). Thereafter, an automatic transition to utilization of a second brightness setting for operation of the touch-sensitive display is made, where the second brightness setting is lower than the first brightness setting (e.g., for the purpose of improving operating life of the touch-sensitive display). During utilization of the second brightness setting, the scale controller continues to monitor a touch-sensitive surface of the touch-sensitive display for operator selection of one or more displayed icons or fields and, upon operator selection of a given displayed icon or field, the selection is captured. The step of automatically transitioning to utilization of the second brightness setting may be triggered by monitoring one or more scale functions or, more appropriately, the inactivity of such functions. For example, a lack of operator interaction with the touch-sensitive display for a specified time period may trigger dimming and/or a lack of item weighing by the weighing station for a specified time period may trigger the dimming.

Regardless, as mentioned above the icons and fields of the operator interface display remain live, and upon operator selection of the given displayed icon or field, the scale controller may cause an automatic transition back to the first brightness setting for operation of the touch-sensitive display. Thus, the display "wakes-up" while simultaneously capturing the operator screen selection. Likewise, during utilization of the second brightness setting, and upon detection of item placement on the weighing station (e.g., as indicated by load cell output), the scale controller may cause an automatic transition back to the first brightness setting for operation of the touch-sensitive display.

In terms of the dimming operation, in one embodiment the customer facing display is not dimmed when the operator display is dimmed. This is particularly useful when the customer facing display is being used to communicate information to customers even when the scale is not in use, which will be described in more detail below.

In order to facilitate marketing operations via scales in the supermarket, it is possible for videos to be displayed on the customer facing interface or display 22. In one embodiment, multiple different videos may be stored in scale memory and played in sequence. However, because the customer facing interface must, at times be used for displaying weigh and price information, a controlled interruption and restart of the sequence is implemented. More specifically, the scale controller 50 may be configured such that upon operator initiation of an item weigh and price operation during display of a specific video, display of the specific video is stopped and item weigh and price information is displayed on the customer interface. By way of example, operator initiation of the item weigh and price operation may be triggered via an item being placed on the weighing station for weighing (e.g., as indicated by load cell output).

Upon completion of the item weigh and price operation, display of a different video is automatically initiated on the customer interface (i.e., without completing or restarting the specific video that was interrupted). By way of example, the different video may be the video that sequentially follows the specific video in the defined sequence, and completion of the item weigh and price operation is triggered via a label printing operation. In this manner, the scale is operated to avoid confusion that might be caused by starting a video midstream, and to assure that the same video is not continually restarted during time periods when the scale is being used heavily.

Figure 37:
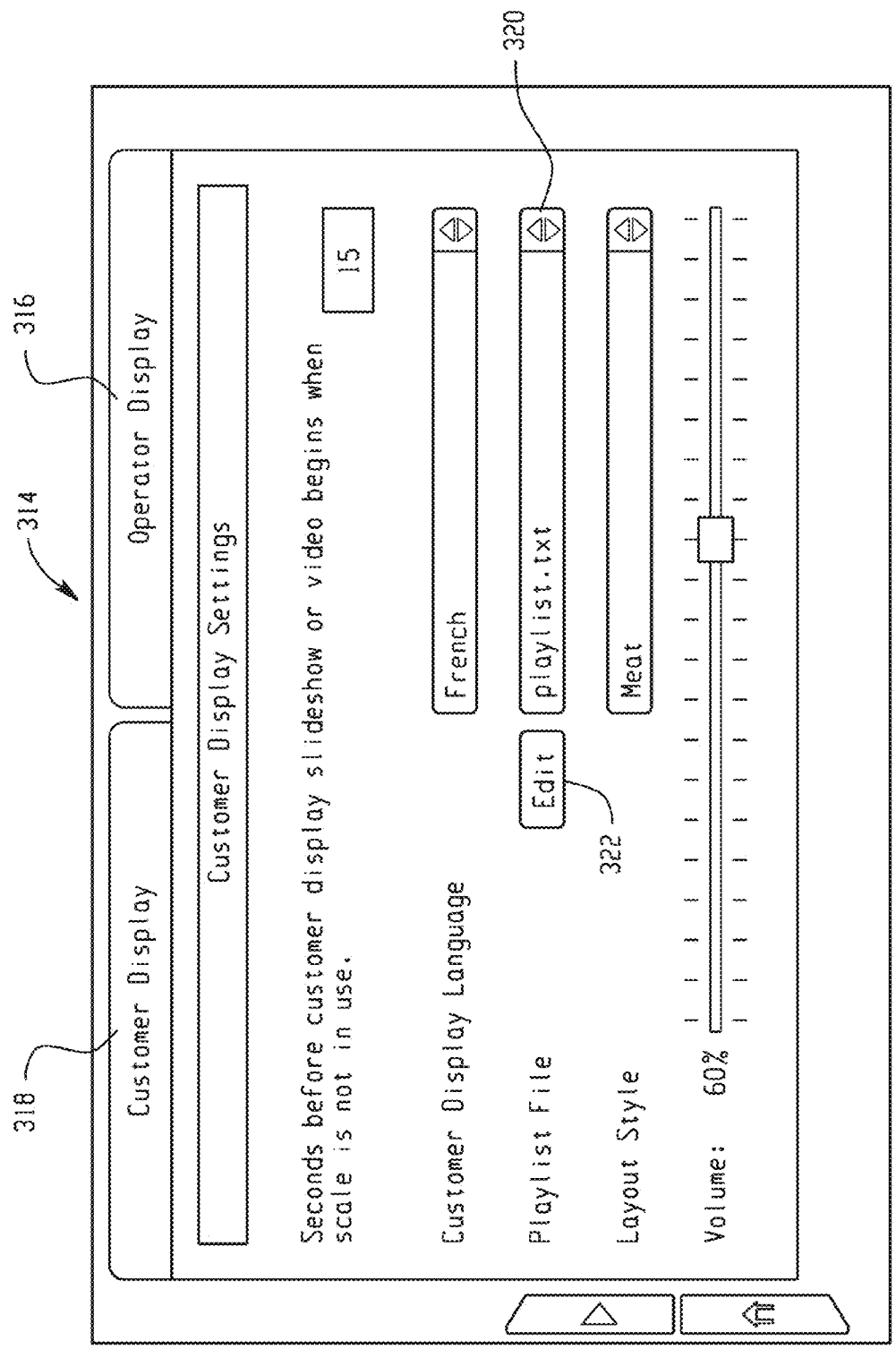
FIG. 37 shows a screen view that enables adjustment of customer video display functions.

With respect to the sequence of videos played on the scale, in one embodiment the sequence may be established by a playlist that can be modified via the operator interface. In particular, and referring to FIG. 37, the adjustment interface screen view 314 is shown with the Customer Display option 318 triggered. From this screen the supervising operator can modify any one of (i) lag time, if any, between non-use of scale and beginning to display the videos, (ii) customer display language, (iii) the playlist being used, (iv) the Layout (which allows you to choose from among different background images for the customer display when in the metrology displaying mode) and (v) the volume associated with the video display. By selecting the arrow buttons/icon 320 the supervising operator can select an alternate playlist from a drop down menu. By selecting the Edit button/icon 322, the supervisor can edit the identified playlist, which may be in the form of a text file. Thus, in one example, by editing the text file the supervising operator may modify one or both of the plurality of customer information videos or the defined sequence to be varied by modifying the playlist in the text file.

Depending upon the location of the scale within a store, the need for certain functions can vary widely. For example, a scale located in the back-room may not make use of the customer video play function (i.e., that function may be turned off). Likewise, the manner in which the scale is used may vary depending upon store type and location within the store. Different scale modes are provided for this reason. For some departments, changing the mode of the scale can happen many times a day.

There are primarily two distinct scale modes, namely Manual and Prepack. However, some scales may include an additional Self Service mode as well. In the Manual mode single transactions (e.g., each weigh, price and label print is a single operation that is not related to any preceding or following weigh and price operation). A majority of scale activity is typically carried out in the Manual mode. In the Prepack mode multiple transactions are carried out, and this mode is most often used in back of store meat rooms. In the Prepack mode the operator enters a PLU, places the product on the scale for weighing and when the weight becomes stable the scale auto prints a label. The operator can then place the next cut of meat under the same PLU on the scale and a label auto prints. In the Self Service modes, customers in the store are able to individually weigh and price items.

Figure 38:
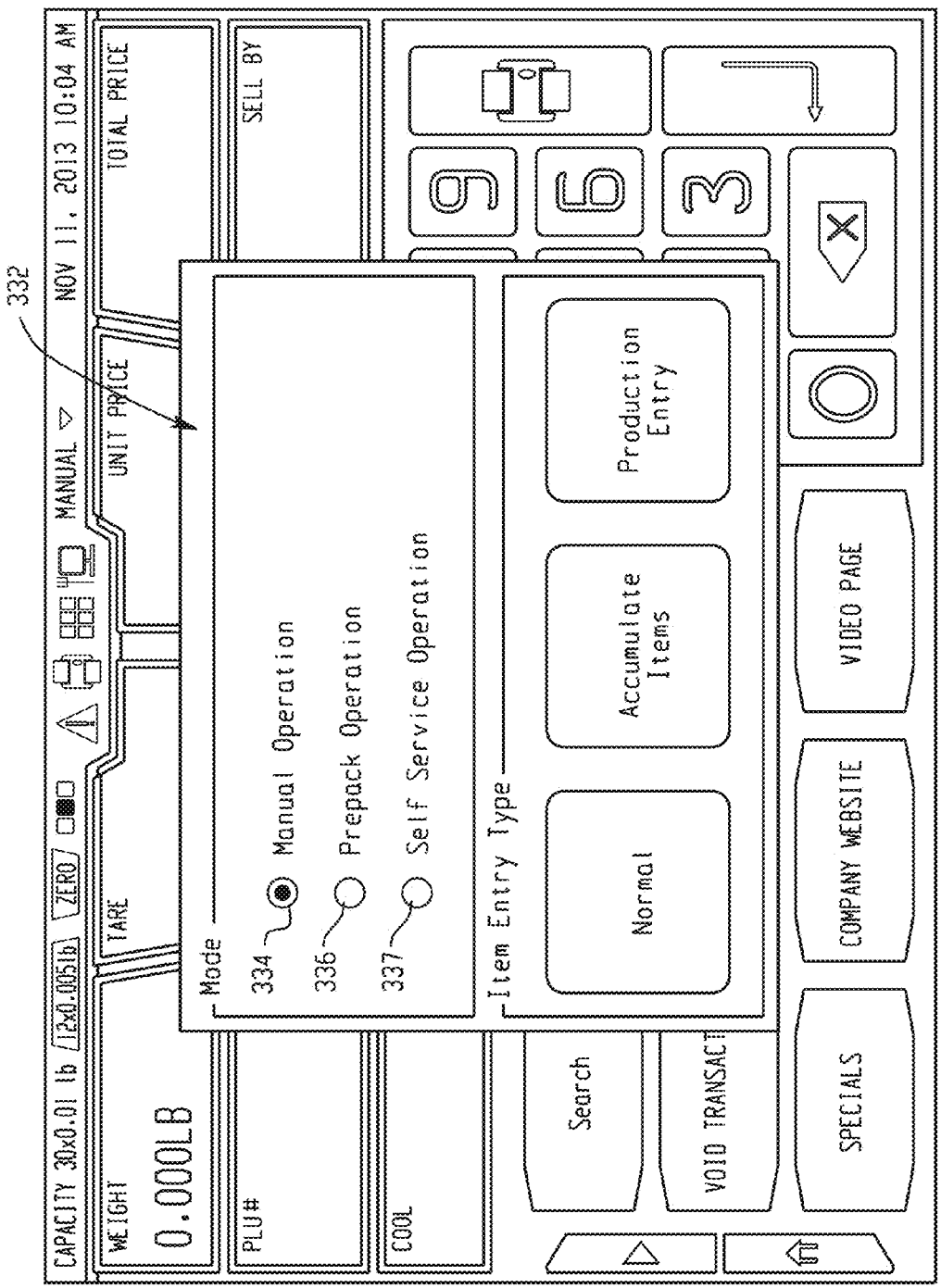
FIG. 38 shows a screen view that enables modification of scale mode.

In the case of the present scale, the transition between Manual and Prepack modes, and in some cases the Self Service mode, is facilitated by the mode selection button/icon 102 that is presented on the primary interface screen view 70A (FIG. 7). Selection of this button/icon 102 produces the adjustment pop-up window 332 shown in FIG. 38. Window 332 includes selections 334 and 336 for Manual and Prepack, and 337 for Self Service, enabling the operator to make a very simple transition between modes. As shown, there are 3 types of Item Entry processes available as well, namely Normal, Accumulate Items and Production Entry. The Normal item entry type involves single transactions as described above. The Accumulate Items entry type is used when multiple PLU's are sold in one transaction (bakery, meal counters, etc.). In this entry type the operator enters all PLU's, and the scale prints one label and gives a total price. The Production Entry entry type allows the operator to print multiple labels of the same PLU (for example, the operator can print 15 labels for 6 count white cupcakes). The Accumulate Items and Production Entry options are available on in Manual mode.

Figure 39:
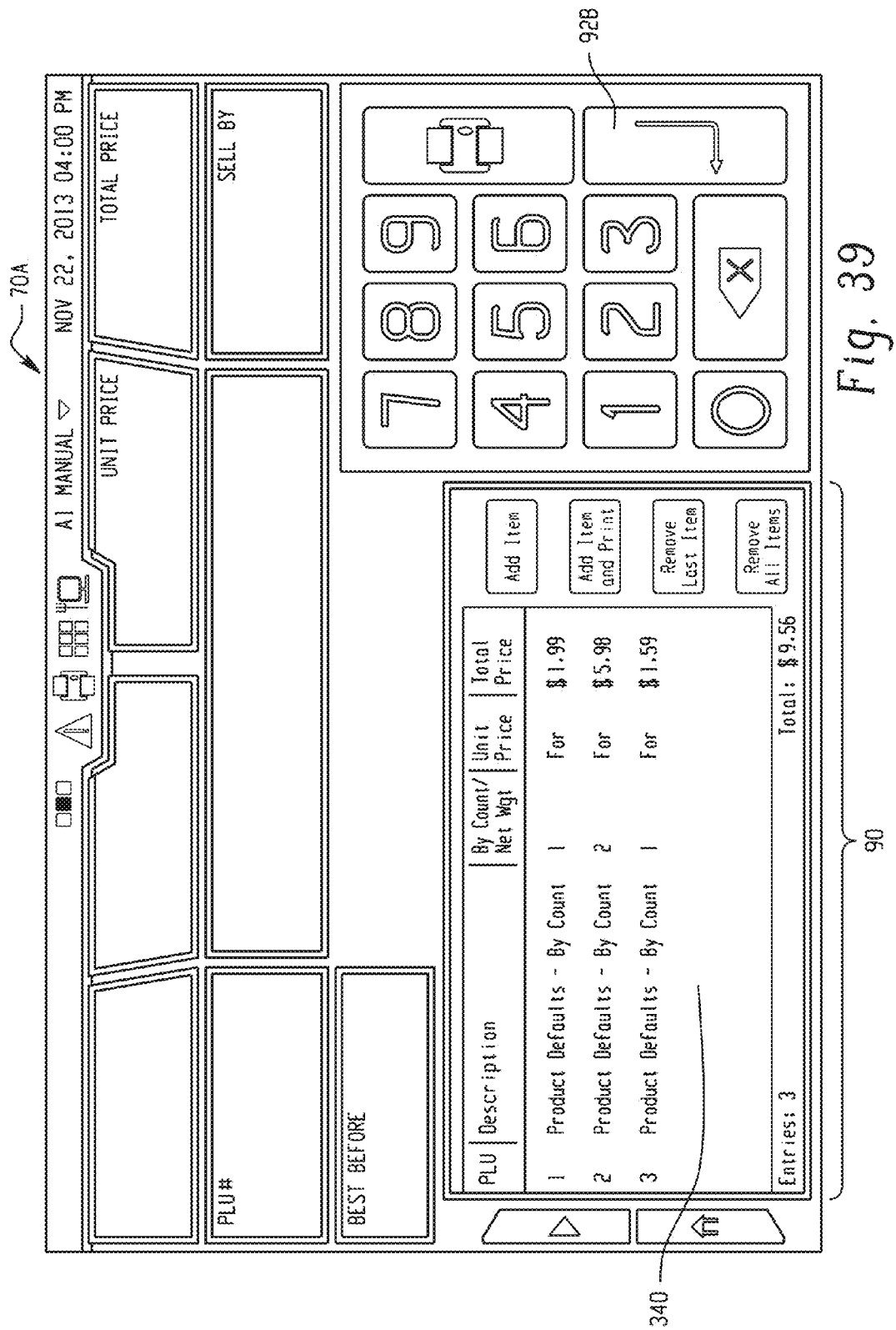
FIG. 39 shows a screen view presented for item accumulation purposes.

By way of example, when the Accumulate Items entry type is selected, the primary interface screen view 70A of FIG. 39 is presented, with item entry field 340 presented in the dynamic content area 90. The operator enters a PLU like normal using the keypad and presses enter 92B. The entered information populates the item entry field 340 when the operator presses Add Item on the Accumulate Items portion of the screen. The PLU entry process is repeated until all items are entered. Advantageously, the present scale therefore provides the ability for the operator to view the accumulated item list on the main interface screen view.

Figure 40:
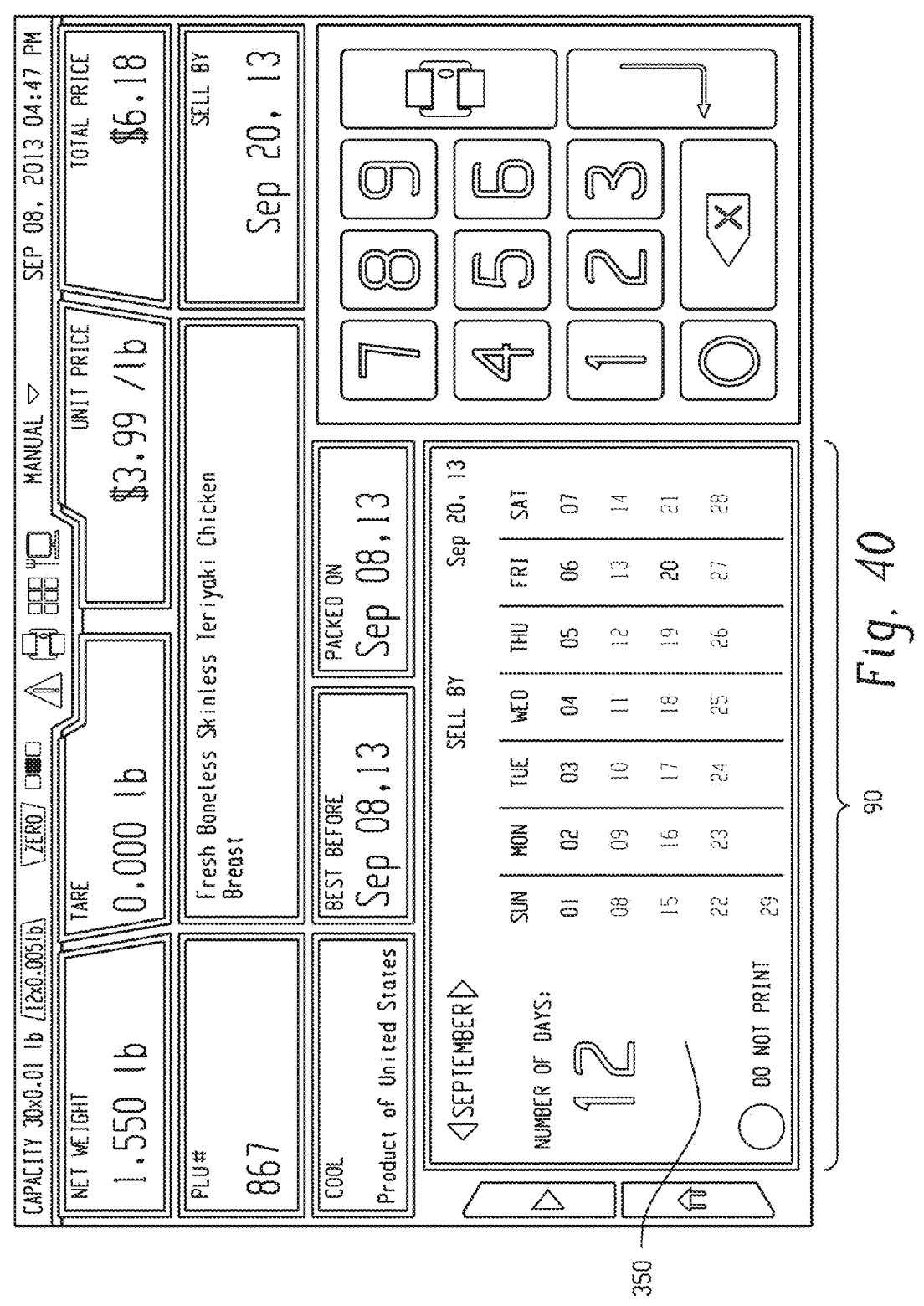
Figure 41:
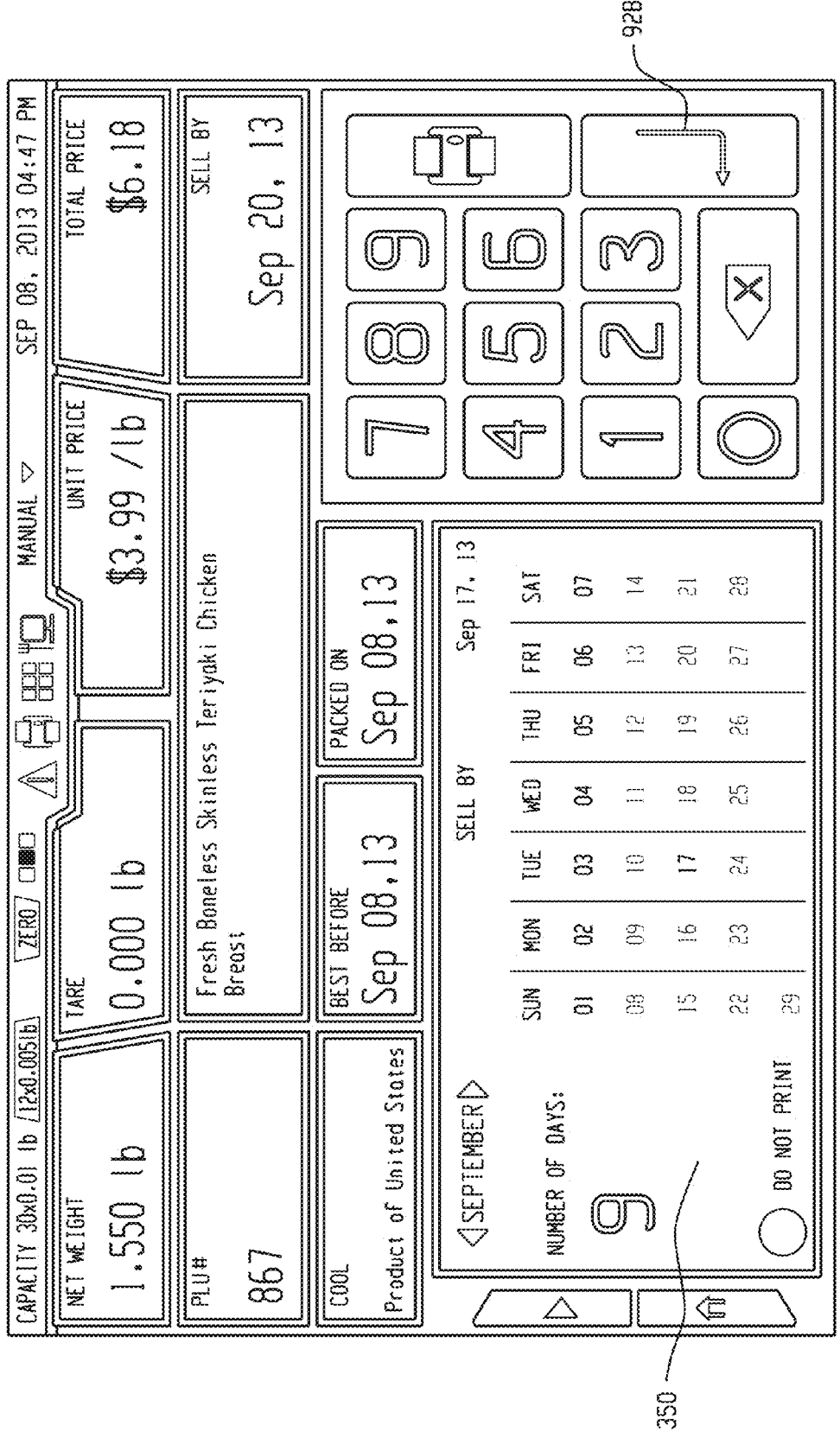
Figure 42:
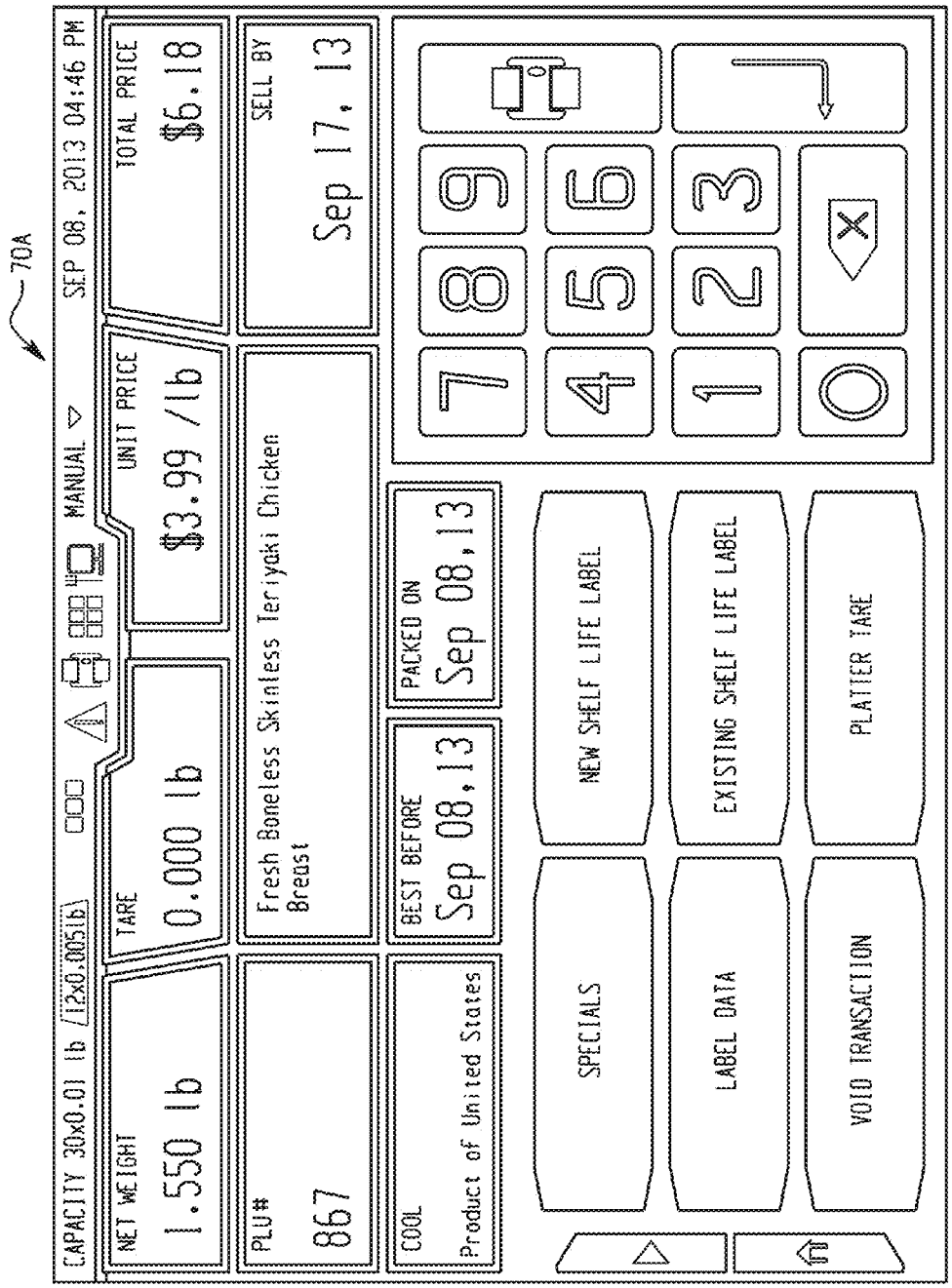

As noted above with respect to FIG. 8, the item weigh and price interface screen view 70A may include a SELL BY field 82C. The present scale may be configured to enable straightforward operator adjustment of that date. In particular, if the operator selects the SELL BY field 82C, the scale automatically modifies the screen view 70A to present the date adjustment window 350 in the dynamic content area 90 as shown in FIG. 40. The operator can then edit the date by selecting the actual day on the calendar or by entering the number of days using the keypad. By way of example, as seen in FIG. 41, the date has been adjusted from 12 days to nine days. Once the modification is set (e.g., by pressing the enter button/icon 92B in this case), the scale controller immediately reverts back to the normal operating screen view 70A with the modified Sell By date information populated as per FIG. 41. Thus, the present scale enables the operator to modify the sell by date information on the fly, during the weighing and pricing process, and without having to restart the weighing and pricing process.

Referring again to FIG. 8, as noted above the set of fixed features includes the icons in the alert indicator section 100. The Generic Alert icon 100A will flash (e.g., red) when one or more alert messages occurs (e.g., a product recall message is available, or other alert not addressed by a more specific alert icon). Touching the icon will cause the message to be displayed. The icon will remain white (e.g., not flashing) when there are no active generic alert messages. This can be a valuable tool if used for food recalls—essentially notifying departments immediately of recalls and giving retailers an additional form of communication to ensure this recall is acted on immediately.

Figure 43:
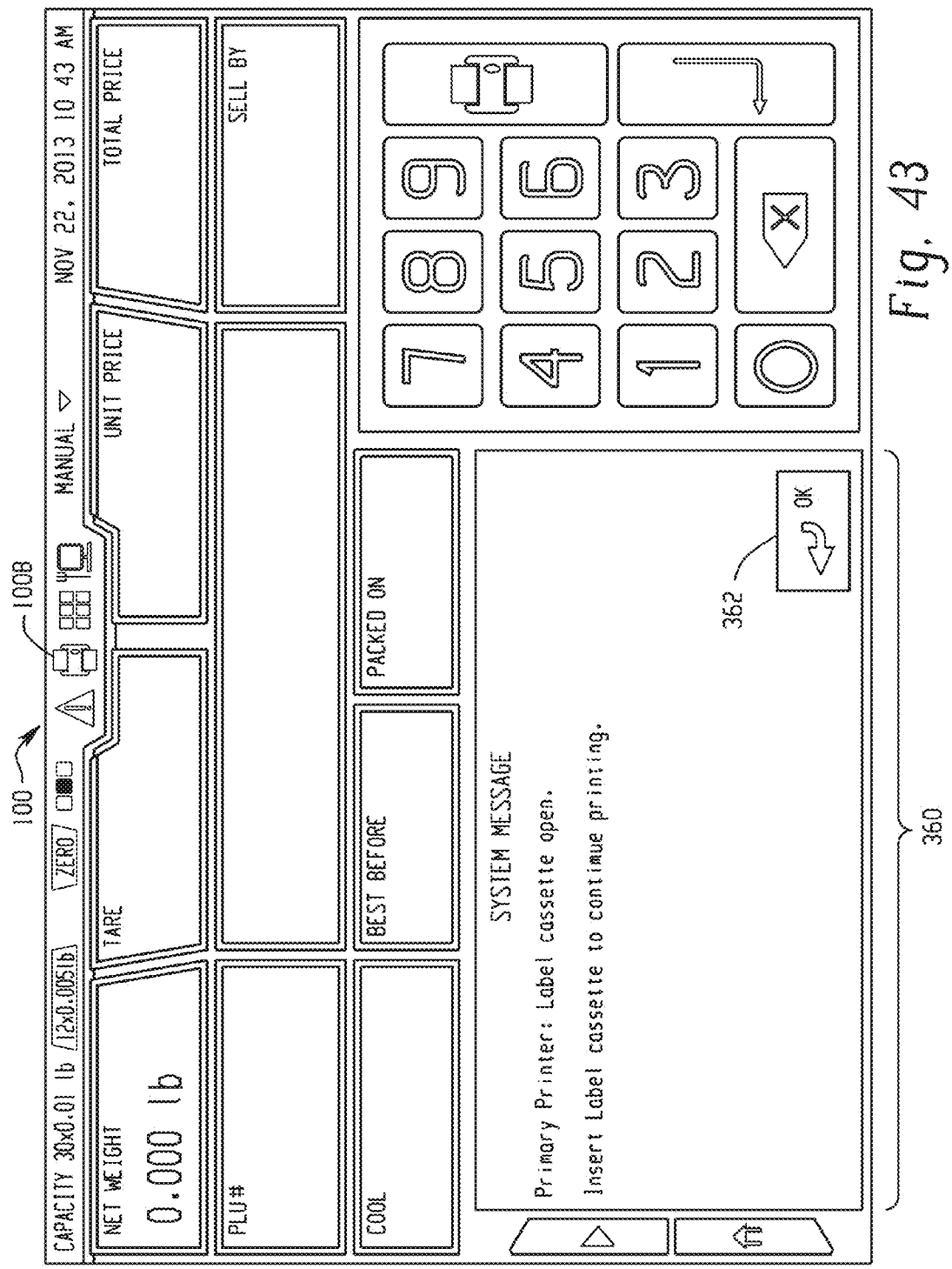
FIG. 43 shows a screen view with a printer alert message pop-up window.

The Printer Alert icon 100B will flash (e.g., red) when there is a printer issue such as the label cassette is open or the printer is out of labels. Touching the icon will cause the message to be displayed per FIG. 43 showing a pop-up message window 360 indicating that the label cassette is open and providing instruction to address the problem. If the operator hits the OK button 362, the window 360 will close, but the icon 100B will continued to flash (e.g., red) until the label cassette is closed. The icon 100B will automatically revert to constant white and remain white (e.g., not flashing) when the label cassette is closed and the error no longer exists.

Figure 44:
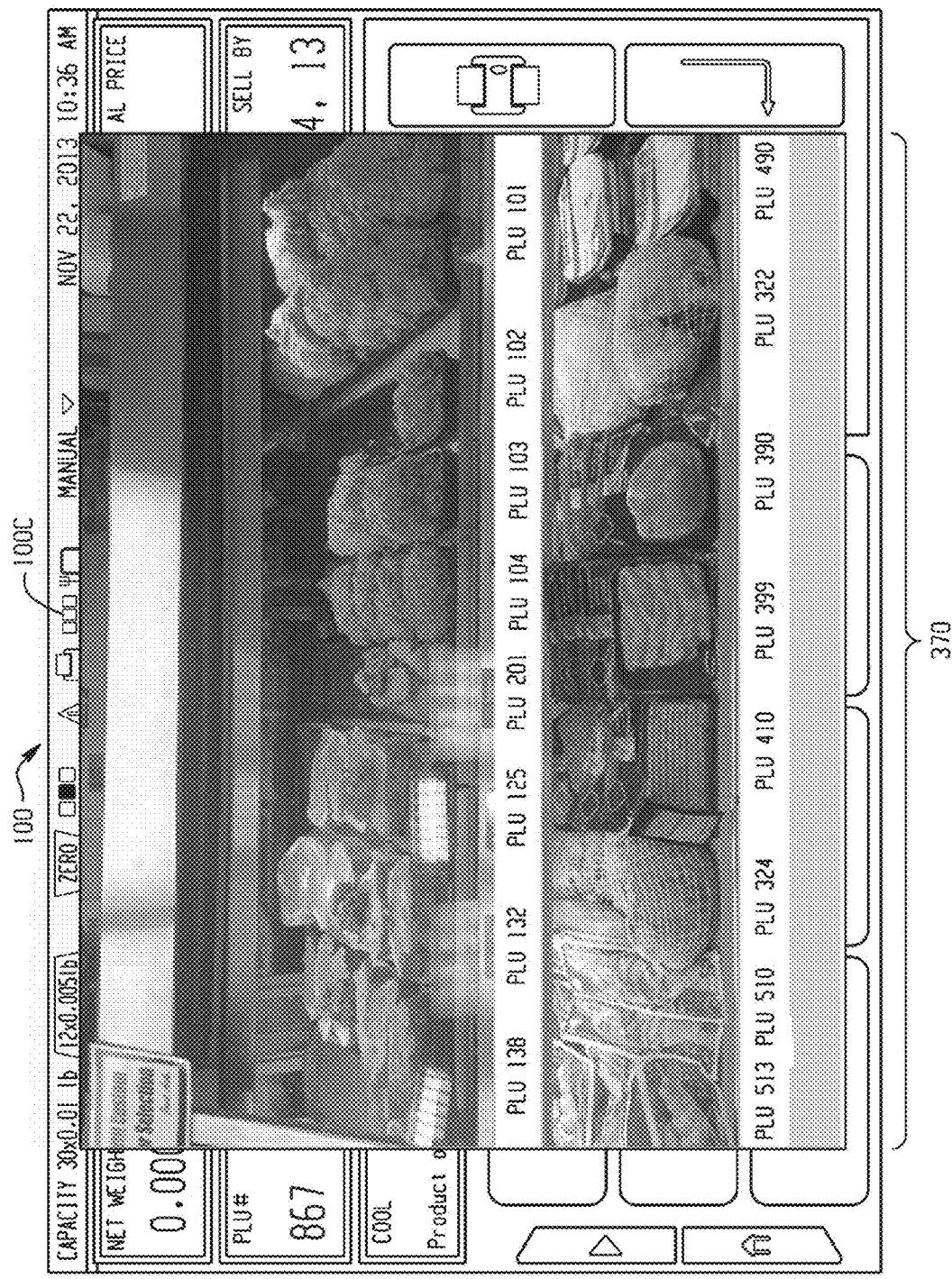
FIG. 44 shows a screen view with a planogram image pop-up window.
Figure 48:
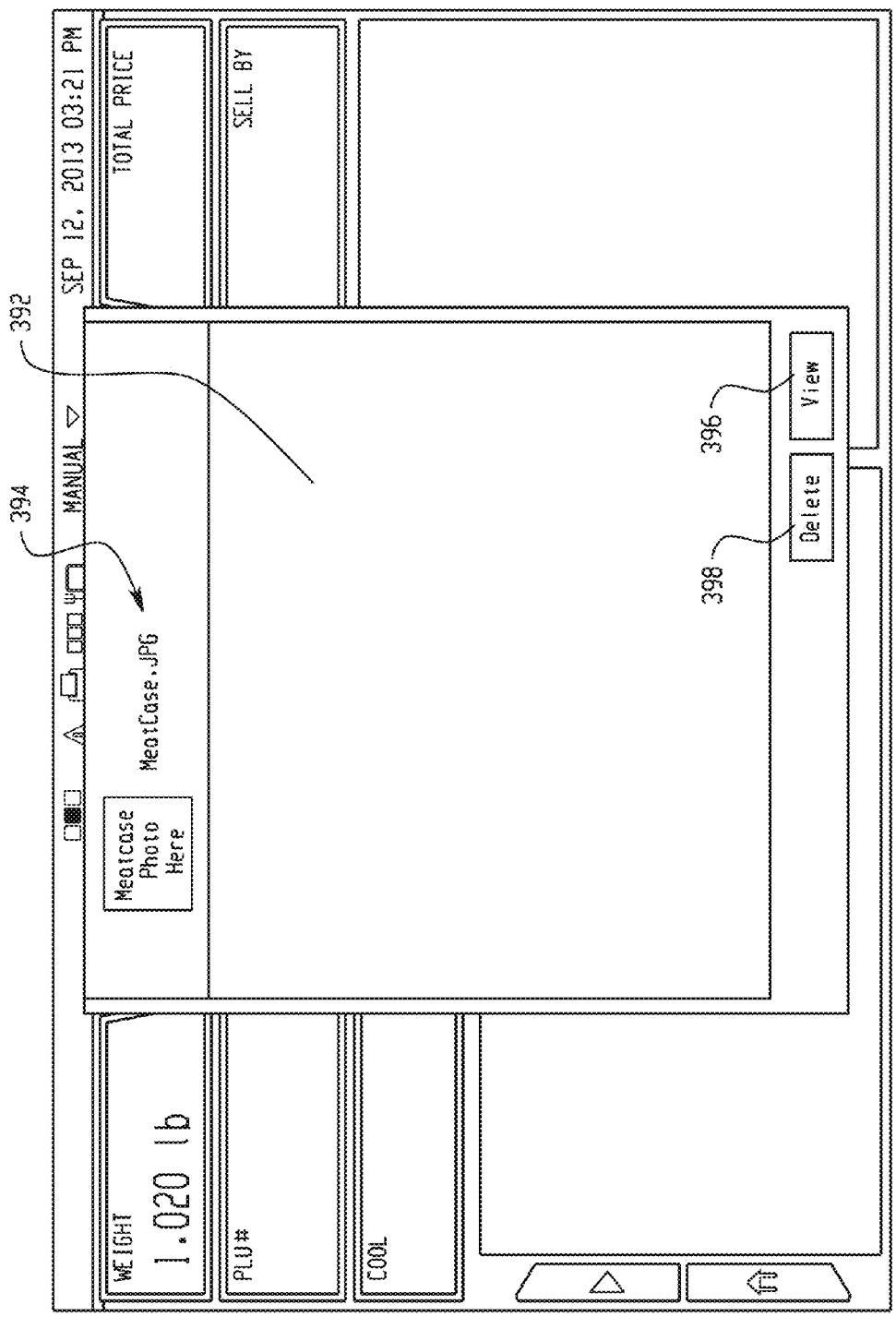
FIG. 48 shows a screen view with a planogram selection pop-up window.

The Planogram icon 100C will flash (e.g., red) when a new planogram image first becomes available. Touching the icon 100C will cause a pop-up window 392 to be displayed per FIG. 48. This window shows one or more product area planogram options that are available for display, as per 394. Selecting a planogram option 394 highlights or otherwise sets the planogram option 394 as the active option, and then selecting the View button 396 will cause a planogram image for that active option to be displayed per FIG. 44 showing a large planogram image window 370. This feature can enable store management (e.g., corporate headquarters of a chain) to send new planogram photos or diagrams directly to the scale, allowing for immediate communication to the operator and a providing close visual to enable reset of a counter display. Tapping outside the window 370 will close the window. The icon will revert to constant white (e.g., not flashing) after the image window 370 has been viewed, but the planogram image will still remain available for later viewing. In order to remove a specific planogram option, that option is selected in window 392 and then the Delete button 398 is selected. Tapping outside the window 392 will closed the window.

Figure 45:
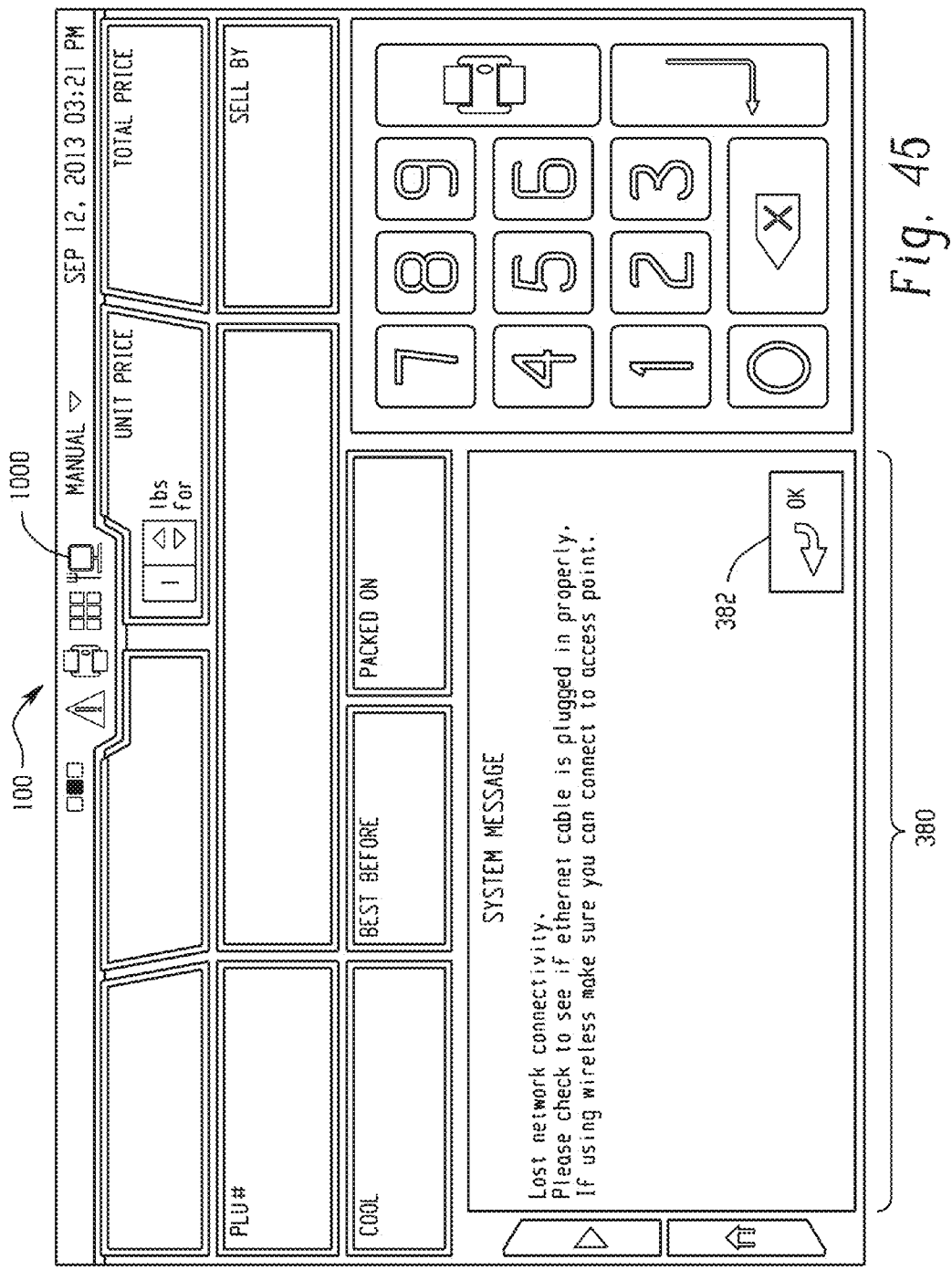
FIG. 45 shows a screen view with a network alert pop-up window.
Figure 46:
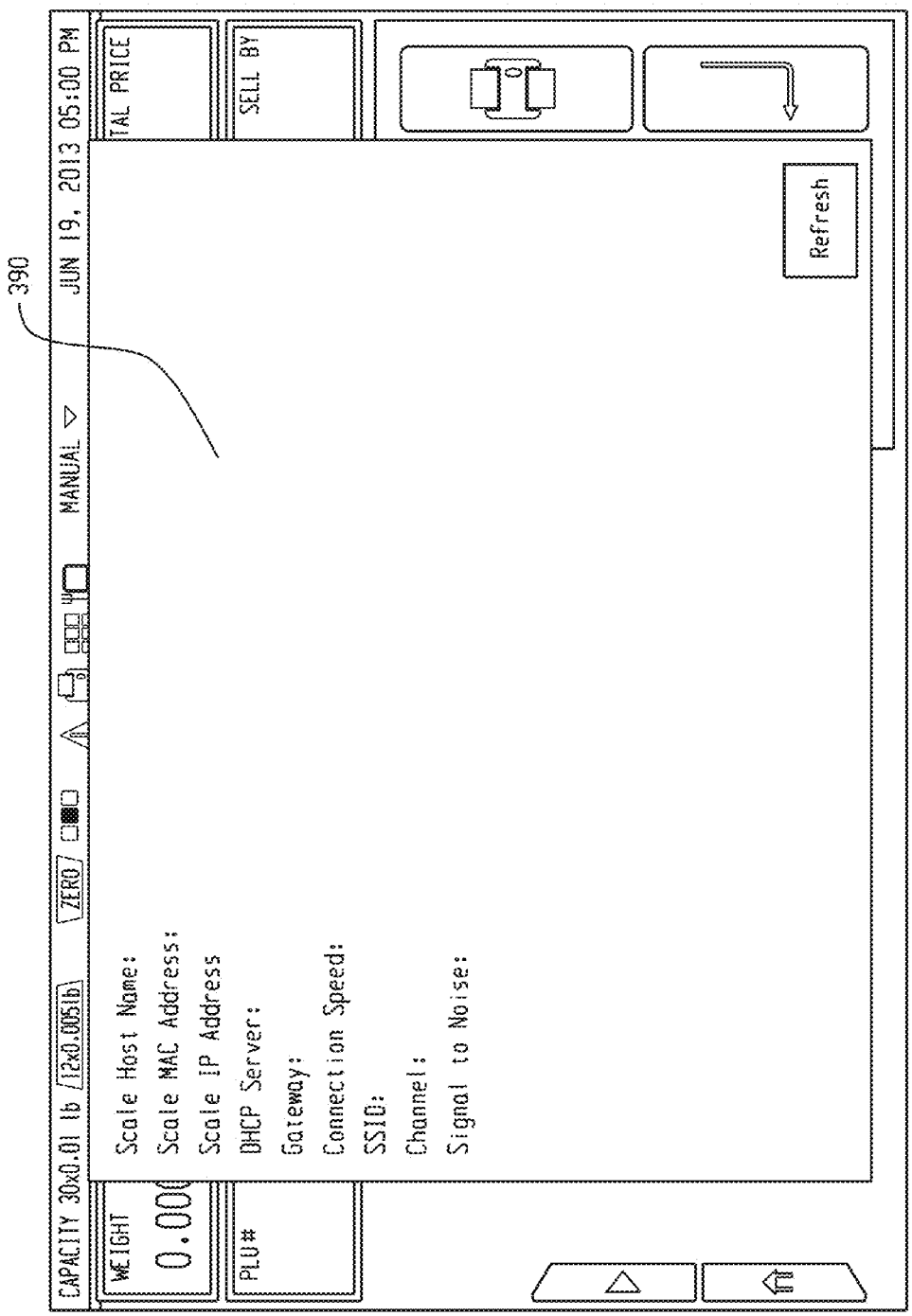
FIG. 46 shows a screen view with a network settings pop-up window when there is no network connection.
Figure 47:
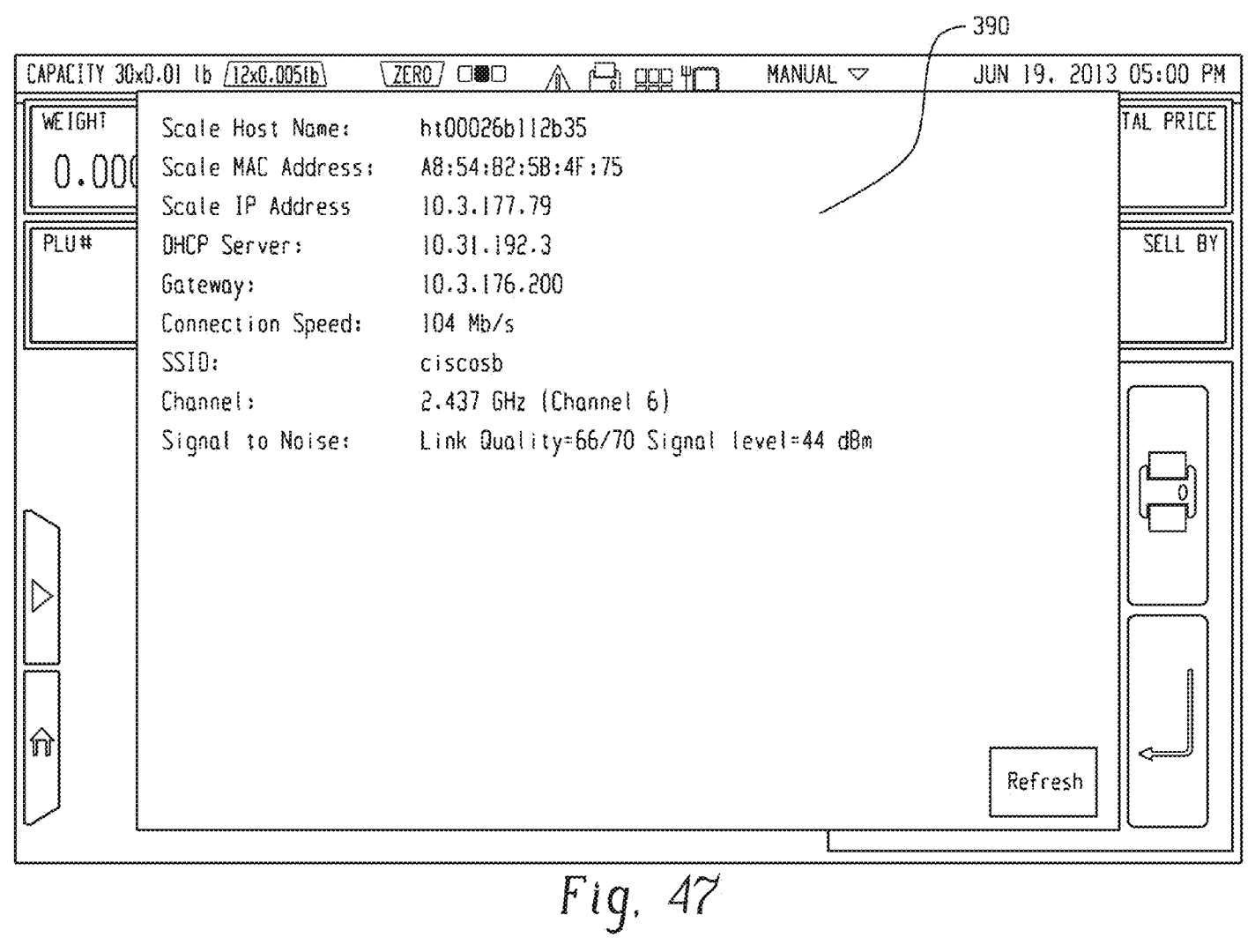

The Network Connectivity icon 100D will either display a hard wired icon or will show bar strength for a wireless connection. When the scale loses network connection and goes off-line, the network connection icon will flash red and an initial system message will appear as per FIG. 45 showing the system message window 380. The operator must select the okay button 382 for this message to disappear, but the icon will remain active (flashing) until network connectivity is regained. Pressing the icon 100D, either when active (flashing) or inactive (not flashing) causes a pop-up window to display network attributes will be displayed. By way of example, FIG. 46 represents a pop-up window 390 when there is no network connection (e.g., the settings are all blank/have no data) and FIG. 47 shows the pop-up window 390 when there is a network connection, with exemplary setting details/data shown. The information in the pop-up window 390 can be useful for troubleshooting purposes.

Thus, the alert indicator features of the scale provide a straightforward and readily accessible manner for operators to be made aware of and track alert messages. Even on the interface screen views that include multiple fields useful for performing item weigh and price operations, the plurality of alert icons 100A-100D are also presented, each alert icon associated with a particular notification type. Each alert icon is selectively displayed in either an active state (e.g., flashing red) or an inactive state (e.g., constant white), depending upon whether the notification type associated with the alert icon does or does not exist. The alert icons 100A-100D are displayed adjacent each other in a group to facilitate operator viewing, creating the alert indicator section 100 of the screen views. Notably, the alert indicator section 100 is positioned centrally along a width of the interface screen view and along a perimeter (e.g., upper in the illustrated embodiment) of the interface screen view to facilitate operator viewing. When a given one of the alert icons is being displayed in the active state, selection of the icon causes alert notification message information to be displayed (e.g., in a pop-up message window).

Notably, the planogram icon feature provides a desirable method of reorganizing a food product display area within a food retail sales establishment. The scale displays the planogram alert icon on the operator interface in an active state to notify the operator of an available planogram update. The operator selects the planogram alert icon to access an image of a desired layout of food product for the food product display area is then displayed. The operator then utilizes the image to adjust the food product display area to match the desired layout presented in the image. As per FIG. 44, the image may include both PLU number data and a product depiction for each food product in the desired layout. In certain embodiments, the scale may even permit the operator to print the image utilizing a printer associated with the scale.

As indicated above, multiple planogram options may be made available for display to the operator, enabling multiple product display areas to be adjusted. In such an operation, the operator selects the planogram access icon to cause display of multiple planogram options on the operator interface. The operator then selects (e.g., by touching the option and then hitting the View button) a first planogram option (which could be any of the planogram options displayed) to cause display of a first image of a desired layout of food product for a first food product display area. The operator then utilizes the first image to adjust the first food product display area to correspond to the desired layout presented in the first image. The operator then selects a second planogram option to cause display of a second image of a desired layout of food product for a second food product display area. The operator utilizing the second image to adjust the second food product display area to correspond to the desired layout presented in the second image. The process may be repeated for whatever number of planogram options are available. The operator may delete each planogram option after completion of any needed display area adjustments.

It is to be clearly understood that the above description is intended by way of illustration and example only, is not intended to be taken by way of limitation, and that other changes and modifications are possible.

What is claimed is:

1. A scale comprising:
   a weigh station for receiving items to be weighed;
   an operator interface configured to display information associated with scale operations, the operator interface comprising a touch-sensitive display;
   a controller operably coupled to the operator interface to effect display of information thereon, the controller configured to vary brightness of the touch-sensitive display in order to extend operating life of the touch-sensitive display,
   wherein the controller is configured to effect a normal brightness setting during operator interaction with the touch-sensitive display and a dimmed brightness setting that is implemented after a set time period without operator interaction with the touch-sensitive display,
   wherein the controller is configured such that, during the dimmed brightness setting, multiple selectable icons or fields for triggering respective predefined actions if selected are still displayed on the touch-sensitive display in visible form and remain live and ready for operator selection such that upon operator selection of any one of the selectable icons or fields during the dimmed brightness setting the respective predefined action associated with the one of the selectable icons or fields is carried out by the controller.

2. The scale of claim 1 wherein the controller is configured such that, during the dimmed brightness setting and upon operator selection of the one of the selectable icons or fields, the selection is automatically captured to trigger the respective predefined action associated with the one of the selectable icons or fields and a transition to the normal brightness setting is automatically effected.

3. The scale of claim 1 wherein the controller is configured such that, during the dimmed brightness setting and upon detection of item placement on the weighing station, a transition to the normal brightness setting is automatically effected.

4. The scale of claim 3 wherein the controller is configured to detect item placement on the weighing station by an output change of a load cell associated with the weighing station.

5. The scale of claim 1, wherein the dimmed brightness setting is a first dimmed brightness setting and the set time period is a first set time period, the controller is configured to effect a second dimmed brightness setting that is implemented after a second set time period without any operator interaction with the touch screen display, the second dimmed brightness setting being less bright than the first dimmed brightness setting, the second set time period being longer than the first set time period.

6. The scale of claim 1, wherein the controller is configured to effect a multi-tier dimming operation that includes transition to the dimmed brightness setting after the set time period and shut down of the display after a further time period, upon shutdown of the display no selectable icons are live.

7. The scale of claim 1 wherein the controller is configured to permit adjustment, via the operator interface, of one or more of the normal brightness setting, the dimmed brightness setting or the set time period.

* * * * *